US012338030B2

(12) United States Patent
Brunner et al.

(10) Patent No.: US 12,338,030 B2
(45) Date of Patent: *Jun. 24, 2025

(54) UTILITY ASSEMBLY AND COUPLING MECHANISM

(71) Applicants: Milwaukee Electric Tool Corporation, Brookfield, WI (US); Keter Plastic LTD., Herzelyia (IL)

(72) Inventors: Yaron Brunner, Kibbutz Gvat (IL); Grant T. Squiers, Cudahy, WI (US); Christopher S. Hoppe, Midvale, UT (US); Steven W. Hyma, Milwaukee, WI (US)

(73) Assignees: Milwaukee Electric Tool Corporation, Brookfield, WI (US); Keter Plastic LTD., Herzelyia (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,415

(22) Filed: Apr. 5, 2024

(65) Prior Publication Data

US 2024/0253858 A1    Aug. 1, 2024

Related U.S. Application Data

(63) Continuation of application No. 18/330,972, filed on Jun. 7, 2023, now Pat. No. 11,952,167, which is a
(Continued)

(51) Int. Cl.
*B25H 3/02* (2006.01)
*A45C 5/14* (2006.01)
(Continued)

(52) U.S. Cl.
CPC ............ *B65D 21/0223* (2013.01); *A45C 5/14* (2013.01); *A45C 7/005* (2013.01); *A45C 13/02* (2013.01);
(Continued)

(58) Field of Classification Search
CPC ......... A45C 5/14; A45C 7/005; A45C 7/0045; A45C 13/02; A45F 3/10; B25H 1/04;
(Continued)

(56) References Cited

U.S. PATENT DOCUMENTS

| 495,537 A | 4/1893 | Westerman |
| 509,839 A | 11/1893 | Bowley |

(Continued)

FOREIGN PATENT DOCUMENTS

| CN | 2608238 | 3/2004 |
| CN | 200947356 | 9/2007 |

(Continued)

OTHER PUBLICATIONS

Inter Partes Review No. 2021-00373, "Petition for Inter Partes Review of U.S. Pat. No. 10,583,962," filed Jan. 5, 2021, 198 pages.
(Continued)

*Primary Examiner* — Gideon R Weinerth
(74) *Attorney, Agent, or Firm* — Reinhart Boerner Van Deuren s.c.

(57) ABSTRACT

The present disclosure concerns a coupling mechanism for detachably attaching two or more utility modules to one another, utility assemblies, mobile carriers and other attachable modules and articles.

20 Claims, 48 Drawing Sheets

Related U.S. Application Data continuation of application No. 18/051,749, filed on Nov. 1, 2022, now Pat. No. 11,794,952, which is a continuation of application No. 17/884,230, filed on Aug. 9, 2022, which is a continuation of application No. 17/064,371, filed on Oct. 6, 2020, now Pat. No. 11,427,382, which is a continuation of application No. 16/752,441, filed on Jan. 24, 2020, now Pat. No. 11,008,136, which is a continuation of application No. 16/216,724, filed on Dec. 11, 2018, now Pat. No. 10,583,962, which is a continuation of application No. 15/826,232, filed on Nov. 29, 2017, now Pat. No. 10,703,534, which is a continuation of application No. PCT/IL2017/050481, filed on Apr. 30, 2017.

(60) Provisional application No. 62/459,076, filed on Feb. 15, 2017, provisional application No. 62/330,334, filed on May 2, 2016.

(51) Int. Cl.
| | |
|---|---|
| *A45C 7/00* | (2006.01) |
| *A45C 13/02* | (2006.01) |
| *A45F 3/10* | (2006.01) |
| *B25H 1/04* | (2006.01) |
| *B25H 3/00* | (2006.01) |
| *B62B 1/00* | (2006.01) |
| *B62B 1/14* | (2006.01) |
| *B65D 21/00* | (2006.01) |
| *B65D 21/02* | (2006.01) |
| *B62B 5/06* | (2006.01) |

(52) U.S. Cl.
CPC .............. *A45F 3/10* (2013.01); *B25H 1/04* (2013.01); *B25H 3/02* (2013.01); *B25H 3/021* (2013.01); *B62B 1/14* (2013.01); *B65D 21/0209* (2013.01); *B65D 21/0228* (2013.01); *A45C 7/0045* (2013.01); *B25H 3/023* (2013.01); *B62B 5/067* (2013.01); *B65D 2255/00* (2013.01); *B65H 2701/533* (2013.01)

(58) Field of Classification Search
CPC .......... B25H 3/02; B25H 3/021; B25H 3/023; B62B 1/14; B62B 5/067; B65D 21/0209; B65D 21/0228; B65D 21/0223; B65D 2255/00; B65H 2701/533
USPC ........................................ 220/4.27
See application file for complete search history.

(56) References Cited

U.S. PATENT DOCUMENTS

| | | | |
|---|---|---|---|
| 1,081,378 | A | 12/1913 | Freeman |
| 1,084,360 | A | 1/1914 | Rahm |
| 2,042,387 | A | 5/1936 | Cobb |
| 2,103,106 | A | 12/1937 | Yurkovitch |
| 2,124,541 | A | 7/1938 | Cassey |
| 2,210,235 | A | 8/1940 | Filbert |
| 2,372,845 | A | 4/1945 | Nelson |
| 2,386,343 | A | 10/1945 | Regenhardt |
| 2,430,200 | A | 11/1947 | Wilson |
| 2,472,363 | A | 6/1949 | Blackinton |
| 2,588,009 | A | 3/1952 | Jones |
| 2,733,076 | A | 1/1956 | Burnett |
| 2,939,613 | A | 6/1960 | Herman et al. |
| 2,970,358 | A | 2/1961 | Elsner |
| 3,117,692 | A | 1/1964 | Carpenter et al. |
| 3,201,035 | A | 8/1965 | Martin et al. |
| 3,225,865 | A | 12/1965 | Downey |
| 3,338,452 | A | 8/1967 | Oakley |
| 3,370,236 | A | 2/1968 | Walker |
| 3,402,954 | A | 9/1968 | Hans |
| 3,423,786 | A | 1/1969 | Arias, Jr. et al. |
| 3,424,334 | A | 1/1969 | Goltz |
| 3,506,321 | A | 4/1970 | Hampel |
| 3,514,170 | A | 5/1970 | Shewchuk |
| 3,552,817 | A | 1/1971 | Marcolongo |
| 3,567,298 | A | 3/1971 | Ambaum et al. |
| 3,685,866 | A | 8/1972 | Patenaude |
| 3,743,372 | A | 7/1973 | Ruggerone |
| D232,798 | S | 9/1974 | Roche et al. |
| 3,835,623 | A | 9/1974 | Kline |
| 3,851,936 | A | 12/1974 | Muller |
| 3,935,613 | A | 2/1976 | Kaneko |
| 3,974,898 | A | 8/1976 | Tullis et al. |
| 3,999,818 | A | 12/1976 | Schankler |
| 4,122,925 | A | 10/1978 | Schultheiss |
| 4,168,076 | A | 9/1979 | Johnson |
| 4,243,279 | A | 1/1981 | Ackeret |
| 4,303,367 | A | 12/1981 | Bott |
| 4,367,615 | A | 1/1983 | Feldman |
| 4,389,133 | A | 6/1983 | Oberst |
| 4,564,732 | A | 1/1986 | Lancaster et al. |
| D285,986 | S | 10/1986 | Huang |
| 4,660,725 | A | 4/1987 | Fishman et al. |
| 4,673,070 | A | 6/1987 | Ambal |
| 4,735,107 | A | 4/1988 | Winkie |
| 4,805,859 | A | 2/1989 | Hudson |
| 4,817,237 | A | 4/1989 | Murphy |
| 4,929,973 | A | 5/1990 | Nakatani |
| 4,971,201 | A | 11/1990 | Sathre |
| 5,035,389 | A | 7/1991 | Wang |
| 5,035,445 | A | 7/1991 | Poulin |
| D319,016 | S | 8/1991 | Kahl |
| 5,098,235 | A | 3/1992 | Svetlik et al. |
| D325,324 | S | 4/1992 | Kahl |
| 5,105,947 | A | 4/1992 | Wise |
| D326,815 | S | 6/1992 | Meisner et al. |
| 5,154,291 | A | 10/1992 | Sur |
| 5,240,264 | A | 8/1993 | Williams |
| 5,244,300 | A | 9/1993 | Perreira |
| D340,167 | S | 10/1993 | Kahl |
| 5,282,554 | A | 2/1994 | Thomas |
| 5,301,829 | A | 4/1994 | Chrisco |
| 5,325,966 | A | 7/1994 | Chang |
| 5,356,038 | A | 10/1994 | Banks |
| 5,356,105 | A | 10/1994 | Andrews |
| D352,208 | S | 11/1994 | Brookshire |
| 5,375,709 | A | 12/1994 | Petro |
| 5,429,235 | A | 7/1995 | Chen |
| 5,429,260 | A | 7/1995 | Vollers |
| 5,433,416 | A | 7/1995 | Johnson |
| D361,511 | S | 8/1995 | Dickinson et al. |
| 5,454,634 | A | 10/1995 | Herbst et al. |
| 5,538,213 | A | 7/1996 | Brown |
| 5,595,228 | A | 1/1997 | Meisner et al. |
| 5,608,603 | A | 3/1997 | Su |
| 5,622,296 | A | 4/1997 | Pirhonen et al. |
| 5,628,443 | A | 5/1997 | Deutsch |
| 5,653,366 | A | 8/1997 | Liserre |
| 5,664,292 | A | 9/1997 | Chen |
| D395,533 | S | 6/1998 | Morison et al. |
| 5,775,046 | A | 7/1998 | Fanger et al. |
| 5,797,617 | A | 8/1998 | Lin |
| 5,850,996 | A | 12/1998 | Liang |
| 5,890,613 | A | 4/1999 | Williams |
| 5,906,381 | A | 5/1999 | Hovatter |
| 5,951,037 | A | 9/1999 | Hsieh |
| 5,957,421 | A | 9/1999 | Barbour |
| D415,393 | S | 10/1999 | Kei |
| 5,988,473 | A | 11/1999 | Hagan et al. |
| D420,860 | S | 2/2000 | Golichowski et al. |
| 6,036,071 | A | 3/2000 | Hartmann et al. |
| 6,050,660 | A | 4/2000 | Gurley |
| 6,082,539 | A | 7/2000 | Lee |
| 6,082,687 | A | 7/2000 | Kump et al. |
| 6,085,925 | A | 7/2000 | Chung |
| 6,098,858 | A | 8/2000 | Laugesen |
| 6,109,627 | A | 8/2000 | Be |
| 6,123,344 | A | 9/2000 | Clegg |

(56) References Cited

U.S. PATENT DOCUMENTS

| | | |
|---|---|---|
| 6,131,926 A | 10/2000 | Harlan |
| 6,161,983 A | 12/2000 | Berger |
| 6,176,559 B1 | 1/2001 | Tiramani et al. |
| D437,484 S | 2/2001 | Tiramani et al. |
| D437,669 S | 2/2001 | Blason et al. |
| 6,305,498 B1 | 10/2001 | Itzkovitch |
| 6,311,881 B1 | 11/2001 | Kamiya |
| 6,347,847 B1 | 2/2002 | Tiramani et al. |
| 6,354,759 B1 | 3/2002 | Leicht |
| 6,367,631 B1 | 4/2002 | Steigerwald |
| 6,371,320 B2 | 4/2002 | Sagol |
| 6,371,321 B1 | 4/2002 | Lee |
| 6,371,424 B1 | 4/2002 | Shaw |
| D456,972 S | 5/2002 | Blason et al. |
| 6,431,580 B1 | 8/2002 | Kady |
| 6,497,395 B1 | 12/2002 | Croker |
| 6,547,347 B2 | 4/2003 | Saito |
| 6,601,930 B2 | 8/2003 | Tiramani et al. |
| 6,619,772 B2 | 9/2003 | Dierbeck |
| 6,637,707 B1 | 10/2003 | Gates |
| 6,641,013 B2 | 11/2003 | Oise |
| 6,666,362 B1 | 12/2003 | LeTrudet |
| 6,889,838 B2 | 5/2005 | Meier et al. |
| 6,945,546 B2 | 9/2005 | Guirlinger |
| 6,948,691 B2 | 9/2005 | Brock et al. |
| 6,983,946 B2 | 1/2006 | Sullivan et al. |
| 7,007,903 B2 | 3/2006 | Turner |
| 7,044,484 B2 | 5/2006 | Wang |
| 7,066,475 B2 | 6/2006 | Barnes |
| 7,077,372 B2 | 7/2006 | Moran |
| D525,789 S | 8/2006 | Hosking |
| D527,225 S | 8/2006 | Krieger et al. |
| 7,090,085 B1 | 8/2006 | Vicendese et al. |
| 7,121,417 B2 | 10/2006 | Magnusson et al. |
| 7,147,243 B2 | 12/2006 | Kady |
| 7,152,752 B2 | 12/2006 | Kurtenbach |
| D536,580 S | 2/2007 | Krieger et al. |
| 7,172,164 B2 | 2/2007 | Fueling et al. |
| 7,219,969 B2 | 5/2007 | Bezzubov |
| 7,263,742 B2 | 9/2007 | Valentini |
| 7,350,648 B2 | 4/2008 | Gerstner et al. |
| 7,367,571 B1 | 5/2008 | Nichols |
| 7,416,193 B1 | 8/2008 | Barnett |
| 7,503,569 B2 | 3/2009 | Duvigneau |
| 7,658,887 B2 | 2/2010 | Hovatter |
| 7,690,856 B2 | 4/2010 | Mortensen |
| 7,757,913 B2 | 7/2010 | Fichera |
| 7,779,764 B2 | 8/2010 | Naidu et al. |
| 7,780,026 B1 | 8/2010 | Zuckerman |
| 7,837,165 B2 | 11/2010 | Stone |
| 7,841,144 B2 | 11/2010 | Pervan |
| D630,851 S | 1/2011 | Landau et al. |
| 8,028,845 B2 | 10/2011 | Himes |
| D649,350 S | 11/2011 | Shitrit |
| D649,783 S | 12/2011 | Brunner |
| D653,832 S | 2/2012 | Vilkomirski et al. |
| 8,132,819 B2 | 3/2012 | Landau |
| 8,177,463 B2 | 5/2012 | Walker |
| D661,858 S | 6/2012 | Lifshitz et al. |
| 8,191,910 B2 | 6/2012 | Landau et al. |
| D663,952 S | 7/2012 | Crevling et al. |
| D664,354 S | 7/2012 | Crevling et al. |
| D668,869 S | 10/2012 | Yamamoto et al. |
| 8,292,244 B2 | 10/2012 | Okada |
| D674,605 S | 1/2013 | Vilkomirski et al. |
| 8,448,829 B2 | 5/2013 | Watanabe |
| 8,454,033 B2 | 6/2013 | Tsai |
| 8,459,495 B2 | 6/2013 | Koenig |
| 8,505,729 B2 | 8/2013 | Sosnovsky et al. |
| 8,567,796 B2 | 10/2013 | Bar-Erez et al. |
| 8,590,704 B2 | 11/2013 | Koenig et al. |
| 8,602,217 B2 | 12/2013 | Sosnovsky et al. |
| 8,640,913 B2 | 2/2014 | Berendes |
| 8,657,307 B2 | 2/2014 | Lifshitz |
| 8,677,661 B2 | 3/2014 | Michels |
| D701,696 S | 4/2014 | Shitrit et al. |
| 8,689,396 B2 | 4/2014 | Wolfe |
| 8,714,355 B2 | 5/2014 | Huang |
| 8,740,010 B1 | 6/2014 | Page |
| 8,789,325 B2 | 7/2014 | Verhaeghe |
| 8,813,960 B2 | 8/2014 | Fjelland |
| 8,851,282 B2 | 10/2014 | Brunner |
| 8,875,888 B2 | 11/2014 | Koenig |
| 8,894,160 B1 | 11/2014 | Christensen |
| 8,925,752 B2 | 1/2015 | Smith |
| 8,974,139 B2 | 3/2015 | Saul |
| 8,979,100 B2 | 3/2015 | Bensman et al. |
| 8,985,922 B2 | 3/2015 | Neumann |
| 9,089,964 B2 | 7/2015 | Cheng |
| D738,105 S | 9/2015 | Shitrit |
| D738,106 S | 9/2015 | Shitrit |
| D738,622 S | 9/2015 | Sabbag et al. |
| 9,132,543 B2 | 9/2015 | Bar-Erez |
| D753,394 S | 4/2016 | Brunner |
| D753,395 S | 4/2016 | Brunner |
| D753,396 S | 4/2016 | Brunner |
| D753,982 S | 4/2016 | Guirlinger |
| 9,375,835 B1 | 6/2016 | Lin |
| D765,974 S | 9/2016 | Tonelli et al. |
| 9,447,804 B2 | 9/2016 | Andersson et al. |
| D770,179 S | 11/2016 | Menirom |
| 9,506,489 B2 | 11/2016 | Ko |
| 9,511,491 B2 | 12/2016 | Brunner |
| D777,426 S | 1/2017 | Dahl |
| 9,551,367 B1 | 1/2017 | Shieh |
| 9,566,990 B2 | 2/2017 | Bar-Erez |
| D784,089 S | 4/2017 | Furneaux et al. |
| 9,616,562 B2 | 4/2017 | Hoppe |
| 9,643,629 B2 | 5/2017 | Bar-Erez et al. |
| D790,221 S | 6/2017 | Yahav et al. |
| 9,701,443 B2 | 7/2017 | Wang |
| 9,725,209 B1 | 8/2017 | Ben-Gigi |
| 9,776,651 B2 | 10/2017 | Huang |
| D803,631 S | 11/2017 | Min et al. |
| 9,850,029 B2 | 12/2017 | Brunner |
| D806,483 S | 1/2018 | Stanford et al. |
| 9,872,562 B2 | 1/2018 | Brunner |
| 9,888,752 B2 | 2/2018 | Den Boer et al. |
| D814,187 S | 4/2018 | Caglar |
| D815,831 S | 4/2018 | Tonelli |
| D816,334 S | 5/2018 | Brunner |
| 10,017,134 B2 | 7/2018 | Pickens et al. |
| D826,510 S | 8/2018 | Brunner |
| RE47,022 E | 9/2018 | Sosnovsky et al. |
| D828,671 S | 9/2018 | Cope et al. |
| D831,352 S | 10/2018 | Brunner |
| 10,106,180 B2 | 10/2018 | Bar-Erez et al. |
| D833,744 S | 11/2018 | Yahav et al. |
| 10,138,917 B2 | 11/2018 | Koch |
| D836,995 S | 1/2019 | Carey et al. |
| D839,681 S | 2/2019 | Evron et al. |
| 10,222,172 B2 | 3/2019 | Melville |
| D837,515 S | 4/2019 | Shpitzer |
| D845,080 S | 4/2019 | Jacobsen |
| D845,081 S | 4/2019 | Jacobsen |
| 10,286,542 B2 | 5/2019 | Wolle et al. |
| D857,387 S | 8/2019 | Shpitzer |
| 10,406,387 B2 | 9/2019 | Krepel et al. |
| 10,434,638 B1 | 10/2019 | Tsai |
| D871,013 S | 12/2019 | Liu |
| D873,085 S | 1/2020 | DeFrancia |
| D876,833 S | 3/2020 | Brunner et al. |
| 10,583,962 B2 | 3/2020 | Brunner et al. |
| 10,603,783 B2 | 3/2020 | Brocket et al. |
| D880,252 S | 4/2020 | Jacobsen |
| D880,951 S | 4/2020 | Jacobsen |
| D883,752 S | 5/2020 | Carey et al. |
| D887,788 S | 6/2020 | Meda et al. |
| D888,422 S | 6/2020 | Yang |
| D888,503 S | 6/2020 | Meda et al. |
| D891,193 S | 6/2020 | Stanford et al. |
| D891,195 S | 7/2020 | Zhou |
| 10,703,534 B2 | 7/2020 | Brunner et al. |
| D891,875 S | 8/2020 | Olson |

(56) References Cited

U.S. PATENT DOCUMENTS

| | | |
|---|---|---|
| D892,565 S | 8/2020 | Astle et al. |
| 10,750,833 B2 | 8/2020 | Burchia |
| D895,375 S | 9/2020 | Hurley, Jr. |
| D895,966 S | 9/2020 | Brunner et al. |
| D895,967 S | 9/2020 | Brunner et al. |
| D896,517 S | 9/2020 | Brunner et al. |
| D896,518 S | 9/2020 | Brunner et al. |
| D897,103 S | 9/2020 | Brunner et al. |
| 10,758,065 B2 | 9/2020 | Penalver, Jr. |
| D898,320 S | 10/2020 | Brunner et al. |
| 10,793,172 B2 | 10/2020 | Brunner |
| 10,829,269 B2 | 11/2020 | Gonitianer et al. |
| 10,894,314 B2 | 1/2021 | Hocine et al. |
| 10,933,501 B2 | 3/2021 | Bisson |
| 10,962,218 B2 | 3/2021 | Plato et al. |
| 10,981,696 B2 | 4/2021 | Brunner et al. |
| D917,977 S | 5/2021 | Brunner et al. |
| D918,584 S | 5/2021 | Brunner et al. |
| D919,296 S | 5/2021 | Brunner et al. |
| 11,008,136 B2 | 5/2021 | Brunner et al. |
| D920,671 S | 6/2021 | Brunner et al. |
| 11,027,883 B1 | 6/2021 | Brunner et al. |
| D923,935 S | 7/2021 | Brunner et al. |
| 11,059,631 B1 | 7/2021 | Brunner et al. |
| 11,066,089 B2 | 7/2021 | Brunner |
| 11,124,347 B2 | 9/2021 | Chen |
| D932,186 S | 10/2021 | Brunner et al. |
| 11,155,382 B1 | 10/2021 | Cai |
| D936,030 S | 11/2021 | Lee et al. |
| 11,192,690 B1 | 12/2021 | Brunner et al. |
| D941,020 S | 1/2022 | Brunner et al. |
| 11,230,410 B2 | 1/2022 | Brunner |
| 11,253,037 B2 | 2/2022 | Bomer |
| 11,283,117 B2 | 3/2022 | Polakowski et al. |
| 11,338,959 B2 | 5/2022 | Hoppe et al. |
| 11,385,055 B2 | 7/2022 | Millane |
| 11,426,859 B2 | 8/2022 | Squiers et al. |
| D967,693 S | 10/2022 | Brunner |
| 11,464,335 B2 | 10/2022 | Brunner et al. |
| 11,510,486 B2 | 11/2022 | Adams |
| 11,529,985 B2 | 12/2022 | Brunner et al. |
| 11,530,716 B2 | 12/2022 | Bastian et al. |
| 11,554,898 B2 | 1/2023 | Brunner et al. |
| 11,612,998 B1 | 3/2023 | Byington |
| 11,638,992 B2 | 5/2023 | Jessop |
| 11,840,269 B2 | 12/2023 | Brunner |
| D1,014,967 S * | 2/2024 | Lam .................. D3/294 |
| D1,014,968 S * | 2/2024 | Lam .................. D3/294 |
| 11,936,197 B2 * | 3/2024 | Cholst ............... B60L 53/30 |
| 11,952,167 B2 | 4/2024 | Brunner |
| 11,964,632 B2 | 4/2024 | Rutman |
| 12,064,863 B1 | 8/2024 | Tsai |
| 12,077,202 B2 * | 9/2024 | Williams ............ B25H 3/00 |
| 12,179,956 B2 * | 12/2024 | Camp ................. B65D 21/023 |
| 12,187,491 B2 * | 1/2025 | Squiers ............... B65D 21/086 |
| 12,226,066 B2 * | 2/2025 | Reiland ............... A47L 9/0036 |
| 12,233,530 B2 * | 2/2025 | Blumenthal ........ B25H 1/06 |
| 2002/0000440 A1 | 1/2002 | Sagal et al. |
| 2002/0030425 A1 | 3/2002 | Tiramani et al. |
| 2002/0125072 A1 | 9/2002 | Levy |
| 2002/0171228 A1 | 11/2002 | Kady |
| 2003/0075468 A1 | 4/2003 | Story et al. |
| 2003/0094392 A1 | 5/2003 | Meier et al. |
| 2003/0094393 A1 | 5/2003 | Sahm, III |
| 2003/0115715 A1 | 6/2003 | Valentini |
| 2003/0139080 A1 | 7/2003 | Lafragette et al. |
| 2003/0146589 A1 | 8/2003 | Jarko et al. |
| 2003/0184034 A1 | 10/2003 | Pfeiffer |
| 2003/0205877 A1 | 11/2003 | Verna et al. |
| 2004/0074725 A1 | 4/2004 | Shih |
| 2004/0103494 A1 | 6/2004 | Valentini |
| 2004/0149754 A1 | 8/2004 | Diamant |
| 2004/0195793 A1 | 10/2004 | Sullivan et al. |
| 2004/0206656 A1 | 10/2004 | Dubois et al. |
| 2004/0256529 A1 | 12/2004 | Richter |
| 2005/0015928 A1 | 1/2005 | Arsenault et al. |
| 2005/0062244 A1 | 3/2005 | Guirlinger |
| 2005/0104308 A1 | 5/2005 | Barnes |
| 2005/0139745 A1 | 6/2005 | Liao |
| 2005/0242144 A1 | 11/2005 | Panosian et al. |
| 2006/0006770 A1 | 1/2006 | Valentini |
| 2006/0027475 A1 | 2/2006 | Gleason et al. |
| 2006/0038367 A9 | 2/2006 | Ferraro |
| 2006/0076261 A1 | 4/2006 | Kurtenbach |
| 2006/0119060 A1 | 6/2006 | Sullivan et al. |
| 2006/0120797 A1 | 6/2006 | Mortensen |
| 2006/0165482 A1 | 7/2006 | Olberding |
| 2006/0186624 A1 | 8/2006 | Kady |
| 2006/0254946 A1 | 11/2006 | Becklin |
| 2007/0006542 A1 | 1/2007 | Duke |
| 2007/0012694 A1 | 1/2007 | Duvigneau |
| 2007/0045505 A1 | 3/2007 | Chen |
| 2007/0068757 A1 | 3/2007 | Tan |
| 2007/0090616 A1 | 4/2007 | Tompkins |
| 2007/0138041 A1 | 6/2007 | Welsh |
| 2007/0145700 A1 | 6/2007 | Ambrose et al. |
| 2007/0194543 A1 | 8/2007 | Duvigneau |
| 2007/0273114 A1 | 11/2007 | Katz |
| 2008/0060953 A1 | 3/2008 | Ghassan |
| 2008/0104921 A1 | 5/2008 | Pervan |
| 2008/0115312 A1 | 5/2008 | DiPasquale et al. |
| 2008/0121547 A1 | 5/2008 | Dur et al. |
| 2008/0134607 A1 | 6/2008 | Pervan |
| 2008/0169667 A1 | 7/2008 | Siniarski et al. |
| 2008/0169739 A1 | 7/2008 | Goldenberg |
| 2008/0271280 A1 | 11/2008 | Fuchs et al. |
| 2008/0277221 A1 | 11/2008 | Josefson |
| 2008/0280523 A1 | 11/2008 | Bishop |
| 2008/0296443 A1 | 12/2008 | Lunitz et al. |
| 2008/0308369 A1 | 12/2008 | Louis |
| 2009/0026901 A1 | 1/2009 | Nies, III et al. |
| 2009/0044827 A1 | 2/2009 | Zilber et al. |
| 2009/0071990 A1 | 3/2009 | Jardine et al. |
| 2009/0127146 A1 | 5/2009 | Krebs et al. |
| 2009/0145790 A1 | 6/2009 | Panosian |
| 2009/0145866 A1 | 6/2009 | Panosian et al. |
| 2009/0145913 A1 | 6/2009 | Panosian et al. |
| 2009/0178946 A1 | 7/2009 | Patstone et al. |
| 2009/0236482 A1 | 9/2009 | Winig et al. |
| 2009/0288970 A1 | 11/2009 | Katz et al. |
| 2010/0052276 A1 | 3/2010 | Brunner |
| 2010/0139566 A1 | 6/2010 | Lopuszanski |
| 2010/0147642 A1 | 6/2010 | Andochick |
| 2010/0176261 A1 | 7/2010 | Chen et al. |
| 2010/0219193 A1 | 9/2010 | Becklin |
| 2010/0224528 A1 | 9/2010 | Madsen |
| 2010/0254757 A1 | 10/2010 | Saul |
| 2011/0049824 A1 | 3/2011 | Bar-Erez et al. |
| 2011/0073516 A1 | 3/2011 | Zelinskiy |
| 2011/0127736 A1 | 6/2011 | Oliver |
| 2011/0139665 A1 | 6/2011 | Madsen |
| 2011/0139777 A1 | 6/2011 | Sosnovsky et al. |
| 2011/0155613 A1 | 6/2011 | Koenig et al. |
| 2011/0174939 A1 | 7/2011 | Taylor |
| 2011/0181008 A1 | 7/2011 | Bensman |
| 2011/0220531 A1 | 9/2011 | Meether et al. |
| 2011/0260588 A1 | 10/2011 | Lin |
| 2012/0036724 A1 | 2/2012 | Walters |
| 2012/0073995 A1 | 3/2012 | Parker |
| 2012/0074022 A1 | 3/2012 | McTavish et al. |
| 2012/0074158 A1 | 3/2012 | Lafleur |
| 2012/0080432 A1 | 4/2012 | Bensman et al. |
| 2012/0152944 A1 | 6/2012 | Vilkomirski et al. |
| 2012/0160886 A1 | 6/2012 | Henny et al. |
| 2012/0180250 A1 | 7/2012 | Ricklefsen et al. |
| 2012/0207571 A1 | 8/2012 | Scott |
| 2012/0292213 A1 | 11/2012 | Brunner |
| 2012/0326406 A1 | 12/2012 | Lifshitz |
| 2013/0024468 A1 | 1/2013 | Kocsis |
| 2013/0031731 A1 | 2/2013 | Hess |
| 2013/0031732 A1 | 2/2013 | Hess et al. |
| 2013/0068903 A1 | 3/2013 | O'Keene |
| 2013/0121783 A1 | 5/2013 | Kelly |
| 2013/0127129 A1 | 5/2013 | Bensman et al. |

(56) References Cited

U.S. PATENT DOCUMENTS

| | | |
|---|---|---|
| 2013/0146551 A1 | 6/2013 | Simpson et al. |
| 2013/0154218 A1 | 6/2013 | Tiilikainen |
| 2013/0206139 A1 | 8/2013 | Krepel et al. |
| 2013/0223971 A1 | 8/2013 | Grace, IV |
| 2013/0239509 A1 | 9/2013 | Wang |
| 2014/0062042 A1 | 3/2014 | Wagner et al. |
| 2014/0069832 A1 | 3/2014 | Roehm |
| 2014/0076759 A1 | 3/2014 | Roehm et al. |
| 2014/0123478 A1 | 5/2014 | Gylander et al. |
| 2014/0161518 A1 | 6/2014 | Ko |
| 2014/0166516 A1 | 6/2014 | Martinez |
| 2014/0197059 A1 | 7/2014 | Evans et al. |
| 2014/0205373 A1 | 7/2014 | Andersson et al. |
| 2014/0265440 A1 | 9/2014 | Chen et al. |
| 2015/0014949 A1 | 1/2015 | Dittman |
| 2015/0034515 A1 | 2/2015 | Monyak et al. |
| 2015/0151427 A1 | 6/2015 | Ben-Gigi |
| 2015/0274362 A1 | 10/2015 | Christopher et al. |
| 2015/0310842 A1 | 10/2015 | Coburn et al. |
| 2015/0376917 A1 | 12/2015 | Brunner |
| 2016/0023349 A1 | 1/2016 | Hoppe et al. |
| 2016/0130034 A1 | 5/2016 | Kuhls |
| 2016/0144500 A1 | 5/2016 | Chen |
| 2016/0168880 A1 | 6/2016 | Phelan |
| 2016/0213115 A1 | 7/2016 | Gonitianer et al. |
| 2016/0221177 A1 | 8/2016 | Reinhart |
| 2017/0120679 A1 | 5/2017 | Naiva |
| 2017/0121056 A1 | 5/2017 | Wang |
| 2017/0138382 A1 | 5/2017 | Ko |
| 2017/0143090 A1 | 5/2017 | Naiva |
| 2017/0158216 A1 | 6/2017 | Yahav et al. |
| 2017/0165828 A1 | 6/2017 | Fleischmann |
| 2017/0166352 A1 | 6/2017 | Hoppe |
| 2017/0174392 A1 | 6/2017 | De Loynes |
| 2017/0217464 A1 | 8/2017 | Bar-erez et al. |
| 2017/0239808 A1 | 8/2017 | Hoppe |
| 2017/0257958 A1 | 9/2017 | Sabbag et al. |
| 2017/0266804 A1 | 9/2017 | Kinskey |
| 2017/0318927 A1 | 11/2017 | Kraus et al. |
| 2017/0349013 A1 | 12/2017 | Gronholm |
| 2018/0031019 A1 | 2/2018 | Sjostedt et al. |
| 2018/0044059 A1 | 2/2018 | Brunner |
| 2018/0099405 A1 | 4/2018 | Reinhart |
| 2018/0127007 A1 | 5/2018 | Kravchenko |
| 2018/0153312 A1 | 6/2018 | Buck et al. |
| 2018/0161975 A1 | 6/2018 | Brunner |
| 2018/0186513 A1 | 7/2018 | Brunner |
| 2018/0213934 A1 | 8/2018 | Wolle et al. |
| 2018/0220758 A1 | 8/2018 | Burchia |
| 2018/0229889 A1 | 8/2018 | Li |
| 2018/0290288 A1 | 10/2018 | Brunner |
| 2019/0001482 A1 | 1/2019 | Wolle et al. |
| 2019/0002004 A1 | 1/2019 | Brunner |
| 2019/0031222 A1 | 1/2019 | Takyar et al. |
| 2019/0039781 A1 | 2/2019 | Kogel |
| 2019/0106244 A1 | 4/2019 | Brunner et al. |
| 2019/0168376 A1 | 6/2019 | Brocket et al. |
| 2019/0225371 A1 | 7/2019 | Hoppe et al. |
| 2020/0029543 A1 | 1/2020 | Householder |
| 2020/0055534 A1 | 2/2020 | Hassell |
| 2020/0063776 A1 | 2/2020 | Bastian et al. |
| 2020/0078929 A1 | 3/2020 | Liu |
| 2020/0146447 A1 | 5/2020 | Brendel et al. |
| 2020/0147781 A1 | 5/2020 | Squiers et al. |
| 2020/0165036 A1 | 5/2020 | Squiers et al. |
| 2020/0223585 A1 | 7/2020 | Brunner et al. |
| 2020/0243925 A1 | 7/2020 | Polakowski et al. |
| 2020/0299027 A1 | 9/2020 | Brunner et al. |
| 2020/0346819 A1 | 11/2020 | Kogel et al. |
| 2020/0383507 A1 | 12/2020 | Cox |
| 2021/0025706 A1 | 1/2021 | Millane |
| 2021/0031975 A1 | 2/2021 | Brunner et al. |
| 2021/0039831 A1 | 2/2021 | Brunner et al. |
| 2021/0094600 A1 | 4/2021 | Brunner et al. |
| 2021/0104909 A1 | 4/2021 | Mantych |
| 2021/0104914 A1 | 4/2021 | Cholst |
| 2021/0154824 A1 | 5/2021 | Barton |
| 2021/0155373 A1 | 5/2021 | Cai |
| 2021/0187725 A1 | 6/2021 | Brunner |
| 2021/0221561 A1 | 7/2021 | Davidian et al. |
| 2021/0267368 A1 | 9/2021 | Bruins |
| 2021/0316909 A1 | 10/2021 | Vargo et al. |
| 2021/0360803 A1 | 11/2021 | Semon et al. |
| 2022/0097926 A1 | 3/2022 | Whitmire et al. |
| 2022/0117393 A1 | 4/2022 | Jenkins et al. |
| 2022/0240671 A1 | 8/2022 | Blumenthal et al. |
| 2022/0258324 A1 | 8/2022 | Blumenthal et al. |
| 2022/0369781 A1 | 11/2022 | Brunner et al. |
| 2022/0402113 A1 | 12/2022 | Brunner et al. |
| 2023/0027343 A1 | 1/2023 | Zheng et al. |
| 2023/0036215 A1 | 2/2023 | Williams et al. |
| 2023/0115200 A1 | 4/2023 | Barton |
| 2023/0136626 A1 | 5/2023 | Cai et al. |
| 2023/0150725 A1 | 5/2023 | Baron |
| 2023/0182281 A1 | 6/2023 | Keller |
| 2023/0202025 A1* | 6/2023 | Chen ........................ B25H 3/02 206/503 |
| 2023/0232954 A1* | 7/2023 | Williams ............. A45C 13/385 190/108 |
| 2023/0234211 A1 | 7/2023 | Adams |
| 2023/0301429 A1* | 9/2023 | Braun ........................ B25H 3/04 |
| 2023/0411975 A1 | 12/2023 | Roberts |
| 2024/0010390 A1 | 1/2024 | Braun |
| 2024/0025204 A1* | 1/2024 | Goodwin ................. B44D 3/14 |
| 2024/0034378 A1 | 2/2024 | Squiers |
| 2024/0150071 A1* | 5/2024 | Panosian ............ B65D 21/0213 |
| 2024/0150079 A1 | 5/2024 | Panosian |
| 2024/0150094 A1* | 5/2024 | Panosian ................... B62B 1/26 |
| 2024/0190612 A1* | 6/2024 | Christopher ....... B65D 21/0228 |
| 2024/0208040 A1* | 6/2024 | Coons .................... B25H 3/023 |
| 2024/0227156 A1* | 7/2024 | Panosian ................... B25H 3/04 |
| 2024/0270445 A1* | 8/2024 | Brunner ............. B65D 21/0209 |
| 2024/0351744 A1* | 10/2024 | Tonelli ...................... A45C 5/03 |
| 2024/0359311 A1* | 10/2024 | Chen ...................... B25H 3/027 |
| 2024/0409279 A1* | 12/2024 | Brunner ............... B65D 25/282 |
| 2025/0002212 A1* | 1/2025 | Noble ................. B65D 21/0224 |
| 2025/0035143 A1* | 1/2025 | Braun ................... A47B 95/00 |

FOREIGN PATENT DOCUMENTS

| | | |
|---|---|---|
| CN | 101068661 | 11/2007 |
| CN | 102137795 | 7/2011 |
| CN | 102248523 | 11/2011 |
| CN | 102469899 | 5/2012 |
| CN | 102608238 | 7/2012 |
| CN | 102834035 | 12/2012 |
| CN | 302371147 | 3/2013 |
| CN | 103118578 | 5/2013 |
| CN | 103659777 | 3/2014 |
| CN | 204161752 | 2/2015 |
| DE | 3510307 | 9/1986 |
| DE | 9313802 | 12/1993 |
| DE | 4415638 | 11/1995 |
| DE | 29708343 | 7/1997 |
| DE | 19750543 | 5/1999 |
| DE | 20218996 | 3/2003 |
| DE | 102004057870 | 6/2006 |
| DE | 202011002617 | 4/2011 |
| DE | 102010003754 | 10/2011 |
| DE | 102010003756 | 10/2011 |
| DE | 102012106482 | 1/2014 |
| DE | 102012220837 | 5/2014 |
| DE | 202014103695 | 10/2014 |
| DE | 102013008630 | 11/2014 |
| DE | 202015105053 | 10/2016 |
| DE | 202015005752 | 11/2016 |
| DE | 102015112204 | 2/2017 |
| DE | 102015013053 | 4/2017 |
| DE | 402018201520 | 5/2018 |
| EM | 000705231-0001 | 4/2007 |
| EM | 002419283-0001 | 3/2014 |
| EP | 0916302 | 5/1999 |
| EP | 1018473 | 7/2000 |
| EP | 1321247 | 6/2003 |

(56) References Cited

FOREIGN PATENT DOCUMENTS

| | | |
|---|---|---|
| EP | 1428764 | 6/2004 |
| EP | 1724069 A2 | 11/2006 |
| EP | 1819487 | 8/2007 |
| EP | 2289671 | 3/2011 |
| EP | 2338650 A2 | 6/2011 |
| EP | 2346741 | 7/2011 |
| EP | 2456341 | 5/2012 |
| EP | 2555660 | 2/2013 |
| EP | 2555661 | 2/2013 |
| EP | 2537641 B1 | 9/2016 |
| EP | 2338650 B1 | 10/2016 |
| EP | 2805799 | 11/2016 |
| EP | 3141354 | 3/2017 |
| GB | 694707 | 7/1953 |
| GB | 2047181 B | 2/1983 |
| GB | 2110076 | 6/1983 |
| GB | 2211486 | 7/1989 |
| GB | 2330521 | 4/1999 |
| GB | 2406331 | 3/2005 |
| GB | 2413265 | 10/2005 |
| GB | 2449934 | 12/2008 |
| JP | 2003194020 A | 7/2003 |
| JP | D1180963 | 8/2003 |
| JP | 1276744 | 7/2006 |
| JP | D1395115 | 8/2010 |
| JP | D1395116 | 8/2010 |
| JP | D1455321 | 11/2012 |
| JP | 2013022972 | 2/2013 |
| JP | 2013022976 | 2/2013 |
| JP | 1477050 | 8/2013 |
| JP | D1503434 | 7/2014 |
| JP | D1625407 | 2/2019 |
| JP | D1665028 | 8/2020 |
| KR | 30-0271616 | 2/2000 |
| KR | 30-0320243 | 6/2002 |
| KR | 3008066040000 | 7/2015 |
| KR | 3008422360000 | 3/2016 |
| KR | 3008496000000 | 4/2016 |
| KR | 3008599650000 | 6/2016 |
| KR | 3008812960000 | 11/2016 |
| KR | 3009995990000 | 3/2019 |
| TW | 206875 | 5/1993 |
| TW | I324578 | 5/2010 |
| TW | 135074 | 6/2010 |
| TW | 168686 | 7/2015 |
| TW | 174412 | 3/2016 |
| TW | D192092 | 8/2018 |
| WO | WO2005/045886 | 5/2005 |
| WO | WO2007/121746 | 11/2007 |
| WO | WO07121745 | 11/2007 |
| WO | WO07121746 | 11/2007 |
| WO | WO2007121745 A1 | 11/2007 |
| WO | WO2009/140965 | 11/2009 |
| WO | WO09140965 | 11/2009 |
| WO | WO2011/009480 | 1/2011 |
| WO | WO11009480 | 1/2011 |
| WO | WO2011/131213 | 10/2011 |
| WO | WO2012/000497 | 1/2012 |
| WO | WO2013/026084 | 2/2013 |
| WO | WO13026084 | 2/2013 |
| WO | WO2014/125484 | 8/2014 |
| WO | WO2014/125488 | 8/2014 |
| WO | WO14125488 | 8/2014 |
| WO | WO2016142935 | 9/2016 |
| WO | WO2017028845 | 2/2017 |
| WO | WO2017191628 | 11/2017 |
| WO | WO2017/212840 | 12/2017 |
| WO | WO17212840 | 12/2017 |

OTHER PUBLICATIONS

Exhibit 1001 in Petition for Inter Partes Review of U.S. Pat. No. 10,583,962, filed Jan. 5, 2021, 64 pages.
Exhibit 1002 in Petition for Inter Partes Review of U.S. Pat. No. 10,583,962, filed Jan. 5, 2021, 75 pages.
Exhibit 1003 in Petition for Inter Partes Review of U.S. Pat. No. 10,583,962, filed Jan. 5, 2021, 13 pages.
Exhibit 1004 in Petition for Inter Partes Review of U.S. Pat. No. 10,583,962, filed Jan. 5, 2021, 18 pages.
Exhibit 1005 in Petition for Inter Partes Review of U.S. Pat. No. 10,583,962, filed Jan. 5, 2021, 9 pages.
Exhibit 1006 in Petition for Inter Partes Review of U.S. Pat. No. 10,583,962, filed Jan. 5, 2021, 176 pages.
Exhibit 1007 in Petition for Inter Partes Review of U.S. Pat. No. 10,583,962, filed Jan. 5, 2021, 22 pages.
Exhibit 1008 in Petition for Inter Partes Review of U.S. Pat. No. 10,583,962, filed Jan. 5, 2021, 6 pages.
Exhibit 1009 in Petition for Inter Partes Review of U.S. Pat. No. 10,583,962, filed Jan. 5, 2021, 24 pages.
Exhibit 1010 in Petition for Inter Partes Review of U.S. Pat. No. 10,583,962, filed Jan. 5, 2021, 19 pages.
Exhibit 1011 in Petition for Inter Partes Review of U.S. Pat. No. 10,583,962, filed Jan. 5, 2021, 26 pages.
Exhibit 1012 in Petition for Inter Partes Review of U.S. Pat. No. 10,583,962, filed Jan. 5, 2021, 3 pages.
Exhibit 1013 in Petition for Inter Partes Review of U.S. Pat. No. 10,583,962, filed Jan. 5, 2021, 168 pages.
Exhibit 1014 in Petition for Inter Partes Review of U.S. Pat. No. 10,583,962, filed Jan. 5, 2021, Part A pp. 1-166 of 481 pages.
Exhibit 1014 in Petition for Inter Partes Review of U.S. Pat. No. 10,583,962, filed Jan. 5, 2021, Part B pp. 167-320 of 481 pages.
Exhibit 1014 in Petition for Inter Partes Review of U.S. Pat. No. 10,583,962, filed Jan. 5, 2021, Part C pp. 321-481 of 481 pages.
Exhibit 1015 in Petition for Inter Partes Review of U.S. Pat. No. 10,583,962, filed Jan. 5, 2021, 6 pages.
Exhibit 1016 in Petition for Inter Partes Review of U.S. Pat. No. 10,583,962, filed Jan. 5, 2021, 242 pages.
Exhibit 1017 in Petition for Inter Partes Review of U.S. Pat. No. 10,583,962, filed Jan. 5, 2021, 6 pages.
Exhibit 1018 in Petition for Inter Partes Review of U.S. Pat. No. 10,583,962, filed Jan. 5, 2021, 250 pages.
Exhibit 1019 in Petition for Inter Partes Review of U.S. Pat. No. 10,583,962, filed Jan. 5, 2021, 44 pages.
Exhibit 1020 in Petition for Inter Partes Review of U.S. Pat. No. 10,583,962, filed Jan. 5, 2021, 5 pages.
Exhibit 1021 in Petition for Inter Partes Review of U.S. Pat. No. 10,583,962, filed Jan. 5, 2021, 1 page.
Exhibit 1022 in Petition for Inter Partes Review of U.S. Pat. No. 10,583,962, filed Jan. 5, 2021, 1 page.
Exhibit 1023 in Petition for Inter Partes Review of U.S. Pat. No. 10,583,962, filed Jan. 5, 2021, 24 pages.
Exhibit 1024 in Petition for Inter Partes Review of U.S. Pat. No. 10,583,962, filed Jan. 5, 2021, 28 pages.
"Blitz Box—Portable Storage Box / Shelf," The Green Head Finds Cool New Stuff, https://www.thegreenhead.com/2013/03/blitz-box-portable-storage-box-shelf.php, Per Wayback, website dates back to Feb. 15, 2015, 5 pages.
"BluCave Universal Storage System," BATAVIA Tools to Build, https://batavia.eu/blucave-storage-system/, believed to be available at least as early as Nov. 29, 2017, 5 pages.
"Dewalt TSTAK Carrier Trolley," ITS, https://www.its.co.uk/pd/171229-Dewalt-TSTAK-Carrier-Trolley-_DEW171229.htm, Per Wayback, website dates back to May 2, 2015, 2 pages.
"DeWalt TSTAK Vac Rack (Suits DW DWV902M & DWV900L) DWV9500-XJ," Get Tools Direct, https://www.gettoolsdirect.com.au/dewalt-tstak-vac-rack-suits-dwv902m-and-dwv9001-dwv9500-xj.html, believed to be available at least as early as Nov. 29, 2017, 4 pages.
"Hopkins FloTool 91002 Rhino Box with Mount," Amazon.com, https://www.amazon.com/exec/obidos/ASIN/B003K15F31/20140000-20, believed to be available at least as early as Nov. 29, 2017, 7 pages.
"Tool Skool, TSTAK Phase 2 Upgrades | TSTAK Carts—First Look—Tool Skool," YouTube, Sep. 7, 2013, https://www.youtube.com/watch?v=jb06y6J1dr4&feature=youtu.be&t=197, 1 page.

(56) References Cited

OTHER PUBLICATIONS

Batavia Gmbh, BluCave Storage System, https://protect-us.mimecast.com/s/5XIGCR6KypcgJnlKi9EDoim?domain=batavia.eu, believed to be available at least as early as Nov. 29, 2017, 7 pages.
BluCave Video, https://www.youtube.com/watch?v=Sw7fQQPwoOtY&feature=youtu.be&t=32, believed to be available at least as early as Nov. 29, 2017.
International Search Report and Written Opinion for International Application No. PCT/IL2019/050689, dated Aug. 23, 2019, 21 pages.
International Search Report and Written Opinion for International Application No. PCT/US2018/033161, dated Aug. 6, 2018, 14 pages.
International Search Report and Written Opinion for International Application No. PCT/US2018/044629, dated Jan. 9, 2019, 22 pages.
International Search Report and Written Opinion for International Application No. PCT/US2019/014940, dated Jul. 26, 2019, 7 pages.
International Search Report and Written Opinion for International Application No. PCT/IL2020/050433, dated Jun. 21, 2020, 14 pages.
Sortimo Logistix, "Mobile Sortimente", brochure, believed to be available at least as early as Nov. 29, 2017, 17 pages.
Stuart, "Ryobi ToolBlox Tool Cabinet System!," TOOLGUYD, Sep. 18, 2014, https://toolguyd.com/ryobi-toolblox-cabinets/, 23 pages.
Stuart, "Sys-Cart Base, a Systainer Mounting Platform," TOOLGUYD, Jul. 28, 2014, https://toolguyd.com/systainer-sys-cart-mounting-base/, 11 pages.
Vertak, https://www.alibaba.com/product-detail/Vertak-global-patented-multi-funciton-portable_60217794260.html, believed to be available at least as early as Nov. 29, 2017.
Non-Final Rejection issued Apr. 12, 2018, in U.S. Appl. No. 15/826,201. (16 Pages).
Respondent's Notice of Prior Art, Investigation No. 337-TA-1409, dated Oct. 29, 2024, 11 pages.
Inter Partes Review No. 2024-01400, "Petition for Inter Partes Review of U.S. Pat. No. 11,365,026" Filed Sep. 17, 2024, 147 pages.
Exhibit 1001 in "Petition for Inter Partes Review of U.S. Pat. No. 11,365,026" Filed Sep. 17, 2024, 66 pages.
Exhibit 1002 in "Petition for Inter Partes Review of U.S. Pat. No. 11,365,026" Filed Sep. 17, 2024, 324 pages.
Exhibit 1003 in "Petition for Inter Partes Review of U.S. Pat. No. 11,365,026" Filed Sep. 17, 2024, 139 pages.
Exhibit 1004 in "Petition for Inter Partes Review of U.S. Pat. No. 11,365,026" Filed Sep. 17, 2024, 17 pages.
Exhibit 1005 in "Petition for Inter Partes Review of U.S. Pat. No. 11,365,026" Filed Sep. 17, 2024, 9 pages.
Exhibit 1006 in "Petition for Inter Partes Review of U.S. Pat. No. 11,365,026" Filed Sep. 17, 2024, 21 pages.
Exhibit 1007 in "Petition for Inter Partes Review of U.S. Pat. No. 11,365,026" Filed Sep. 17, 2024, 16 pages.
Exhibit 1008 in "Petition for Inter Partes Review of U.S. Pat. No. 11,365,026" Filed Sep. 17, 2024, 31 pages.
Exhibit 1009 in "Petition for Inter Partes Review of U.S. Pat. No. 11,365,026" Filed Sep. 17, 2024, 6 pages.
Exhibit 1010 in "Petition for Inter Partes Review of U.S. Pat. No. 11,365,026" Filed Sep. 17, 2024, 4 pages.
Exhibit 1011 in "Petition for Inter Partes Review of U.S. Pat. No. 11,365,026" Filed Sep. 17, 2024, 16 pages.
Exhibit 1012 in "Petition for Inter Partes Review of U.S. Pat. No. 11,365,026" Filed Sep. 17, 2024, 8 pages.
Exhibit 1013 in "Petition for Inter Partes Review of U.S. Pat. No. 11,365,026" Filed Sep. 17, 2024, 19 pages.
Exhibit 1014 in "Petition for Inter Partes Review of U.S. Pat. No. 11,365,026" Filed Sep. 17, 2024, 35 pages.
Exhibit 1015 in "Petition for Inter Partes Review of U.S. Pat. No. 11,365,026" Filed Sep. 17, 2024, 11 pages.
Exhibit 1016 in "Petition for Inter Partes Review of U.S. Pat. No. 11,365,026" Filed Sep. 17, 2024, 193 pages.
Exhibit 1017 in "Petition for Inter Partes Review of U.S. Pat. No. 11,365,026" Filed Sep. 17, 2024, 29 pages.
Exhibit 1018 in "Petition for Inter Partes Review of U.S. Pat. No. 11,365,026" Filed Sep. 17, 2024, 15 pages.
Exhibit 1019 in "Petition for Inter Partes Review of U.S. Pat. No. 11,365,026" Filed Sep. 17, 2024, 19 pages.
Exhibit 1020 in "Petition for Inter Partes Review of U.S. Pat. No. 11,365,026" Filed Sep. 17, 2024, 18 pages.
Exhibit 1021 in "Petition for Inter Partes Review of U.S. Pat. No. 11,365,026" Filed Sep. 17, 2024, 313 pages.
Exhibit 1030 in "Petition for Inter Partes Review of U.S. Pat. No. 11,365,026" Filed Sep. 17, 2024, 95 pages.
Exhibit 1031 in "Petition for Inter Partes Review of U.S. Pat. No. 11,365,026" Filed Sep. 17, 2024, 5 pages.
Exhibit 1032 in "Petition for Inter Partes Review of U.S. Pat. No. 11,365,026" Filed Sep. 17, 2024, 19 pages.
Inter Partes Review No. 2024-01401, "Petition for Inter Partes Review of U.S. Pat. No. 11,794,952" Filed Sep. 17, 2024, 165 pages.
Exhibit 1001 in "Petition for Inter Partes Review of U.S. Pat. No. 11,794,952" Filed Sep. 17, 2024, 67 pages.
Exhibit 1002 Part 1 in "Petition for Inter Partes Review of U.S. Pat. No. 11,794,952" Filed Sep. 17, 2024, 227 pages.
Exhibit 1002 Part 2 in "Petition for Inter Partes Review of U.S. Pat. No. 11,794,952" Filed Sep. 17, 2024, 278 pages.
Exhibit 1003 in "Petition for Inter Partes Review of U.S. Pat. No. 11,794,952" Filed Sep. 17, 2024, 168 pages.
Exhibit 1004 in "Petition for Inter Partes Review of U.S. Pat. No. 11,794,952" Filed Sep. 17, 2024, 17 pages.
Exhibit 1005 in "Petition for Inter Partes Review of U.S. Pat. No. 11,794,952" Filed Sep. 17, 2024, 9 pages.
Exhibit 1006 in "Petition for Inter Partes Review of U.S. Pat. No. 11,794,952" Filed Sep. 17, 2024, 21 pages.
Exhibit 1007 in "Petition for Inter Partes Review of U.S. Pat. No. 11,794,952" Filed Sep. 17, 2024, 16 pages.
Exhibit 1008 in "Petition for Inter Partes Review of U.S. Pat. No. 11,794,952" Filed Sep. 17, 2024, 31 pages.
Exhibit 1009 in "Petition for Inter Partes Review of U.S. Pat. No. 11,794,952" Filed Sep. 17, 2024, 6 pages.
Exhibit 1010 in "Petition for Inter Partes Review of U.S. Pat. No. 11,794,952" Filed Sep. 17, 2024, 4 pages.
Exhibit 1011 in "Petition for Inter Partes Review of U.S. Pat. No. 11,794,952" Filed Sep. 17, 2024, 16 pages.
Exhibit 1012 in "Petition for Inter Partes Review of U.S. Pat. No. 11,794,952" Filed Sep. 17, 2024, 8 pages.
Exhibit 1013 in "Petition for Inter Partes Review of U.S. Pat. No. 11,794,952" Filed Sep. 17, 2024, 19 pages.
Exhibit 1014 in "Petition for Inter Partes Review of U.S. Pat. No. 11,794,952" Filed Sep. 17, 2024, 35 pages.
Exhibit 1015 in "Petition for Inter Partes Review of U.S. Pat. No. 11,794,952" Filed Sep. 17, 2024, 11 pages.
Exhibit 1016 in "Petition for Inter Partes Review of U.S. Pat. No. 11,794,952" Filed Sep. 17, 2024, 193 pages.
Exhibit 1017 in "Petition for Inter Partes Review of U.S. Pat. No. 11,794,952" Filed Sep. 17, 2024, 29 pages.
Exhibit 1018 in "Petition for Inter Partes Review of U.S. Pat. No. 11,794,952" Filed Sep. 17, 2024, 15 pages.
Exhibit 1019 in "Petition for Inter Partes Review of U.S. Pat. No. 11,794,952" Filed Sep. 17, 2024, 19 pages.
Exhibit 1020 in "Petition for Inter Partes Review of U.S. Pat. No. 11,794,952" Filed Sep. 17, 2024, 18 pages.
Exhibit 1021 in "Petition for Inter Partes Review of U.S. Pat. No. 11,794,952" Filed Sep. 17, 2024, 313 pages.
Exhibit 1022 in "Petition for Inter Partes Review of U.S. Pat. No. 11,794,952" Filed Sep. 17, 2024, 324 pages.
Exhibit 1023 in "Petition for Inter Partes Review of U.S. Pat. No. 11,794,952" Filed Sep. 17, 2024, 5 pages.
Exhibit 1024 in "Petition for Inter Partes Review of U.S. Pat. No. 11,794, 952" Filed Sep. 17, 2024, 7 pages.
Exhibit 1025 in "Petition for Inter Partes Review of U.S. Pat. No. 11,794,952" Filed Sep. 17, 2024, 15 pages.
Exhibit 1026 in "Petition for Inter Partes Review of U.S. Pat. No. 11,794,952" Filed Sep. 17, 2024, 37 pages.

(56) References Cited

OTHER PUBLICATIONS

Exhibit 1027 in "Petition for Inter Partes Review of U.S. Pat. No. 11,794,952" Filed Sep. 17, 2024, 7 pages.
Exhibit 1028 in "Petition for Inter Partes Review of U.S. Pat. No. 11,794,952" Filed Sep. 17, 2024, 33 pages.
Exhibit 1030 in "Petition for Inter Partes Review of U.S. Pat. No. 11,794,952" Filed Sep. 17, 2024, 95 pages.
Exhibit 1031 in "Petition for Inter Partes Review of U.S. Pat. No. 11,794,952" Filed Sep. 17, 2024, 5 pages.
Exhibit 1032 in "Petition for Inter Partes Review of U.S. Pat. No. 11,794,952" Filed Sep. 17, 2024, 60 pages.
Inter Partes Review No. 2024-01400, "Decision Granting Institution of Inter Partes Review," dated Apr. 8, 2025, 72 pages.
Inter Partes Review No. 2024-01401, "Decision Granting Institution of Inter Partes Review," dated Apr. 8, 2025, 81 pages.

\* cited by examiner

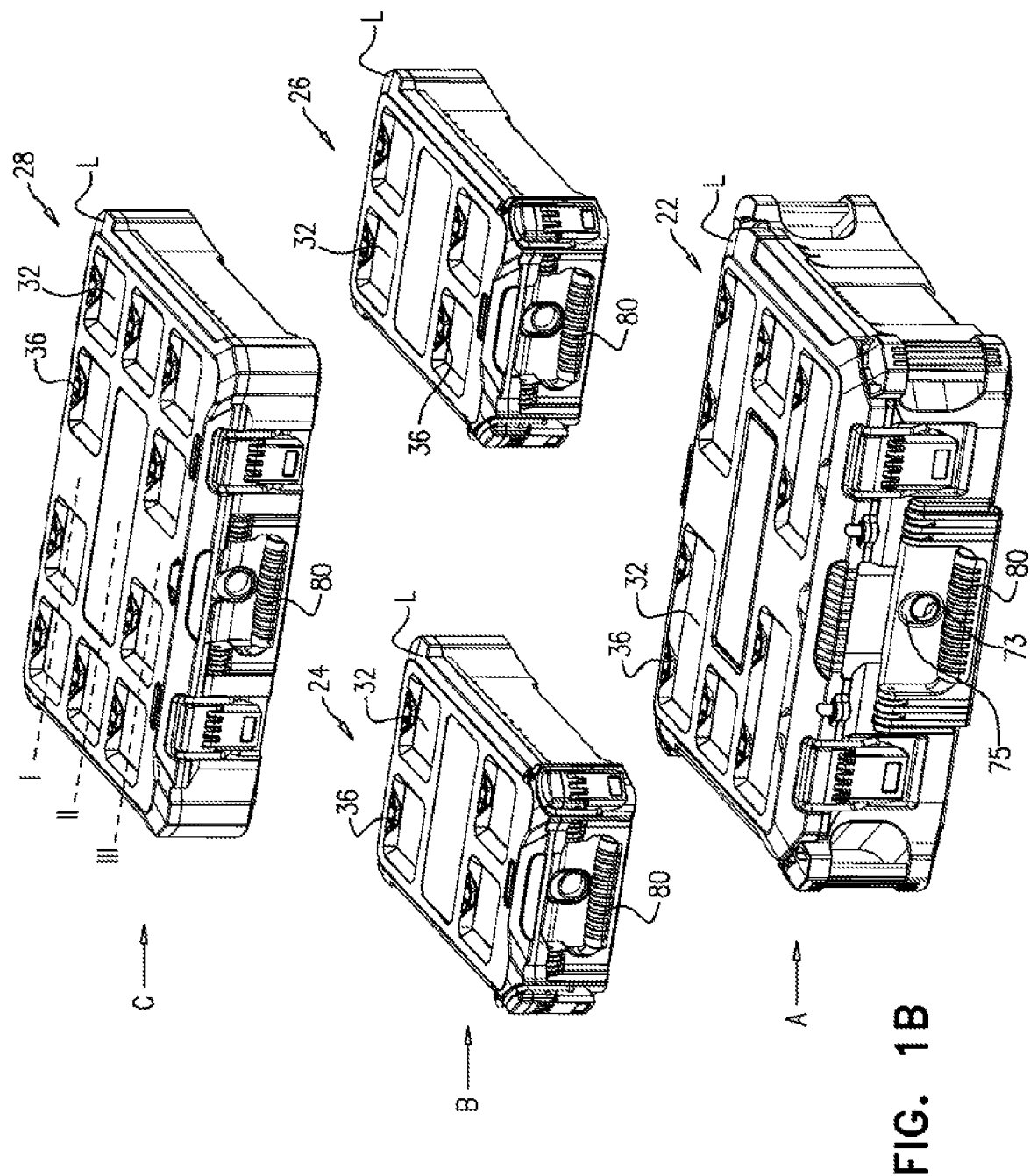

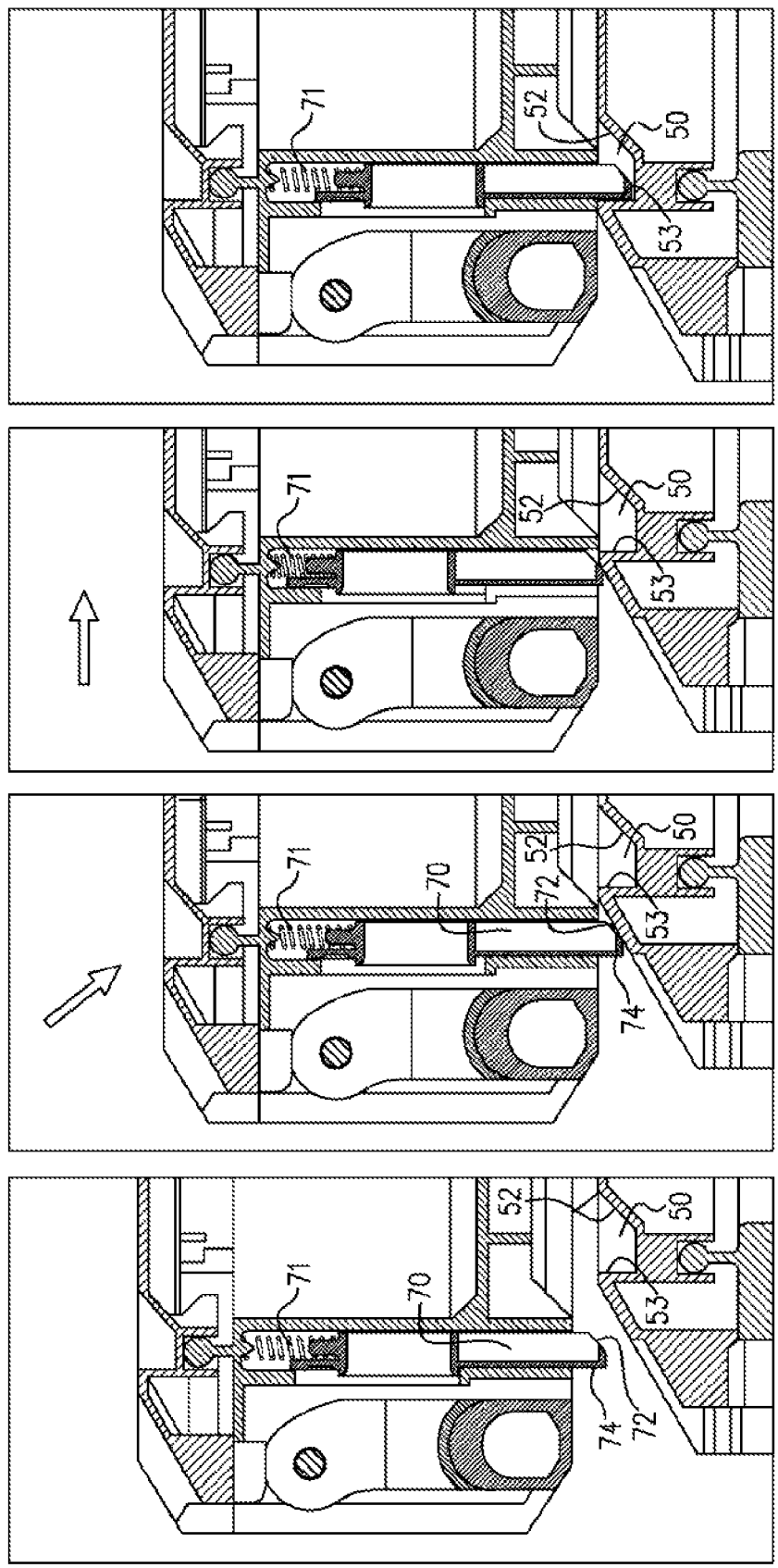

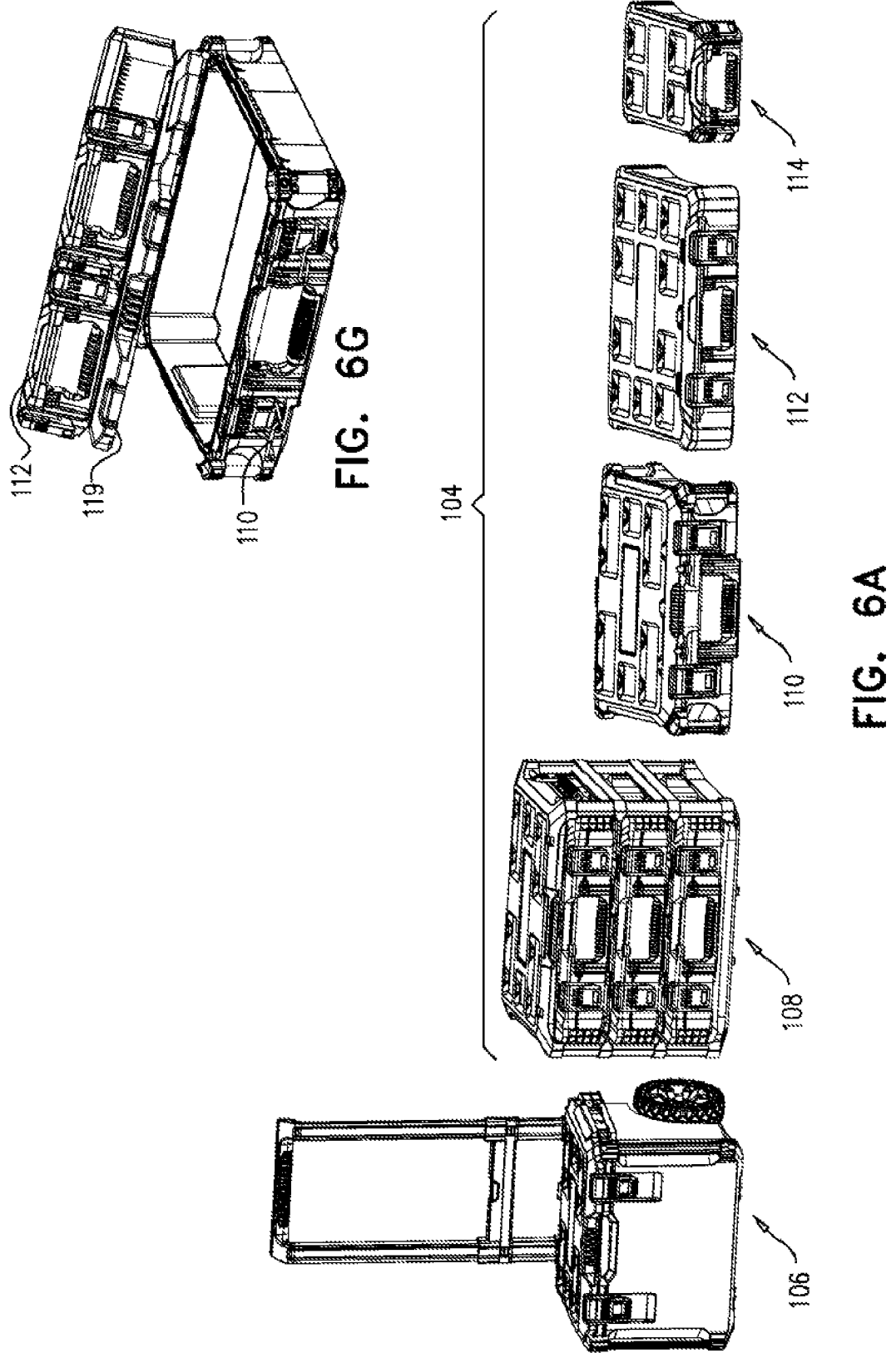

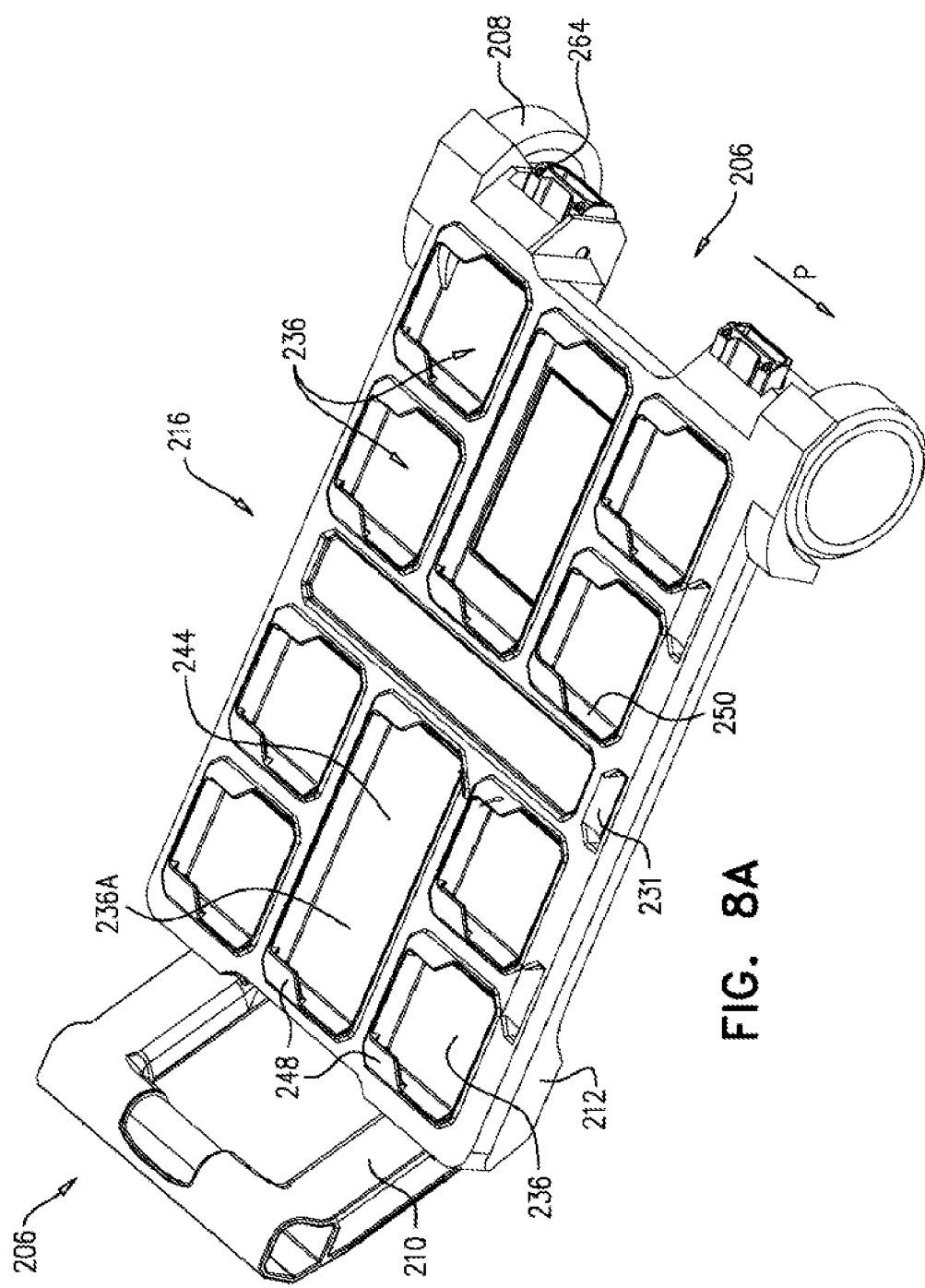

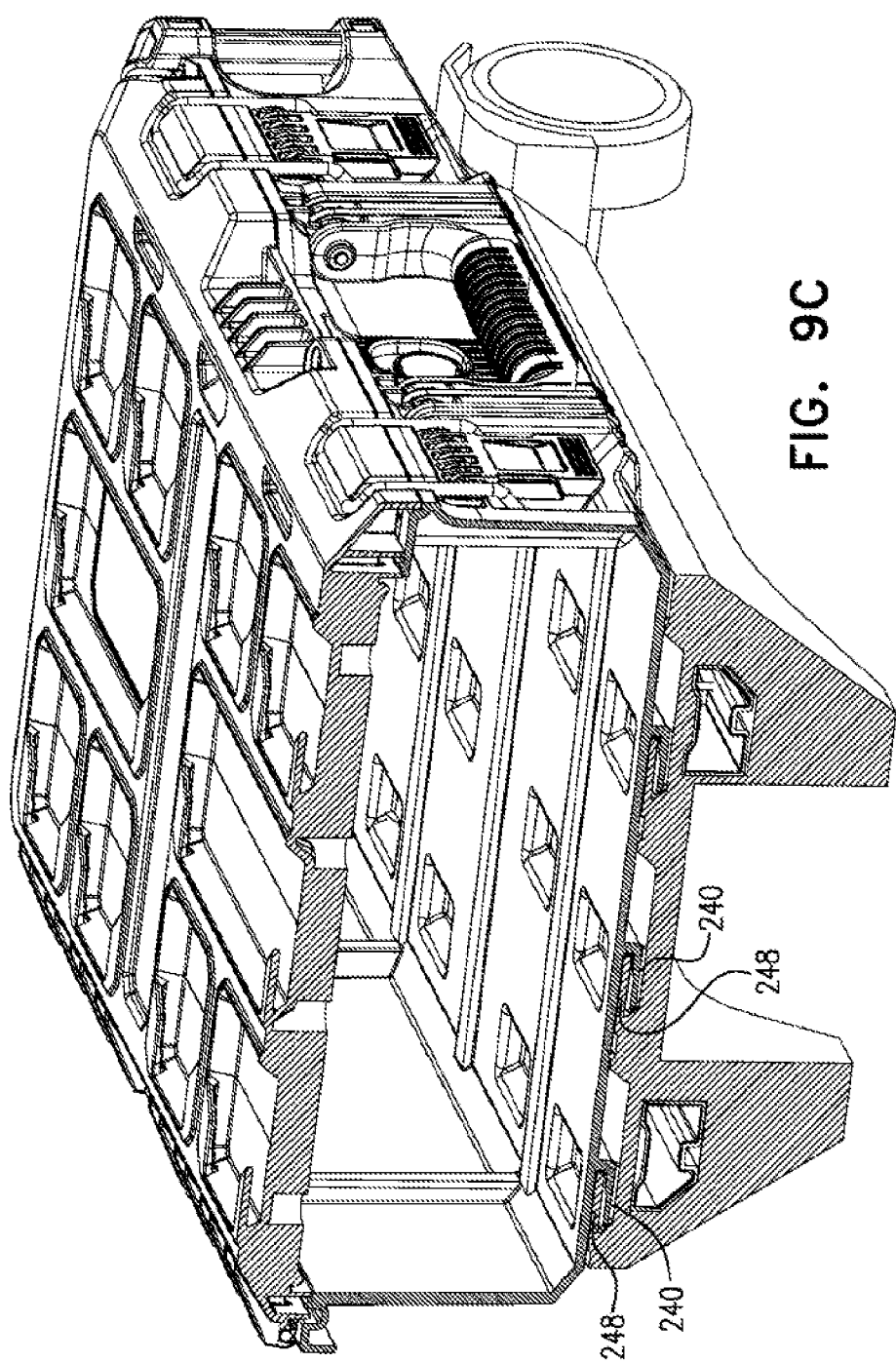

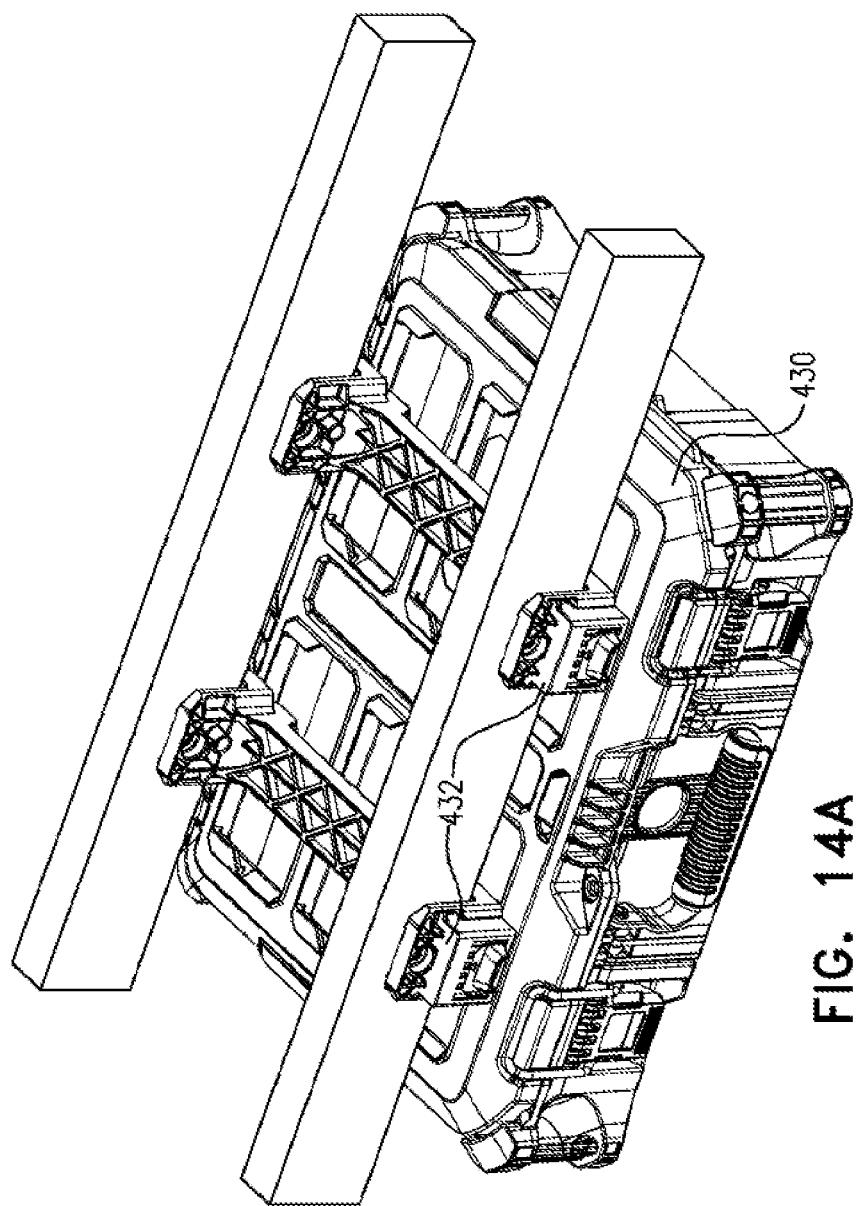

UTILITY ASSEMBLY AND COUPLING MECHANISM

CROSS-REFERENCE TO RELATED PATENT APPLICATIONS

This application is a continuation of U.S. application Ser. No. 18/330,972, filed Jun. 7, 2023, which is a continuation of U.S. application Ser. No. 18/051,749, filed Nov. 1, 2022, now U.S. Pat. No. 11,794,952, which is a continuation of U.S. application Ser. No. 17/884,230, filed Aug. 9, 2022, which is a continuation of U.S. application Ser. No. 17/064,371, filed Oct. 6, 2020, now U.S. Pat. No. 11,427,382, which is a continuation of U.S. application Ser. No. 16/752,441, filed Jan. 24, 2020, now U.S. Pat. No. 11,008,136, which is a continuation of U.S. application Ser. No. 16/216,724, filed Dec. 11, 2018, now U.S. Pat. No. 10,583,962, which is a continuation of U.S. application Ser. No. 15/826,232, filed Nov. 29, 2017, now U.S. Pat. No. 10,703,534, which is a continuation of International Application No. PCT/IL2017/050481, filed Apr. 30, 2017, which claims priority to U.S. Provisional Application No. 62/459,076, filed Feb. 15, 2017 and to U.S. Provisional Application No. 62/330,334, filed May 2, 2016, each of which are incorporated herein by reference in their entireties.

TECHNOLOGICAL FIELD

The present disclosure is directed to a container assembly and more specifically to a utility assembly comprising two or more detachably attachable utility modules. The disclosure is further concerned with a coupling mechanism facilitating detachably attaching the utility modules to one another.

The term 'utility module' is used hereinafter in its broad meaning and is meant to denote a variety of articles such as, storage containers, travel luggage, tool boxes, organizers, compacted work benches, cable storage, tools (e.g. hand tools, power generators and power sources), communication modules, carrying platforms, locomotion platforms, etc., of any shape and size, and wherein any utility module can be detachably attached to any other utility module.

The term 'utility assembly' as used herein denotes any set of utility modules configured for articulation to one another, either as a stationary unit or locomotive.

GENERAL DESCRIPTION

A first aspect of the disclosure concerns a coupling mechanism configured for readily detachably attaching any first article to any second article, wherein any first article and any second article can be any utility module.

The coupling mechanism comprises a male coupler at a face of one of the first utility module and the second utility module, and a female coupler at a face of the other one of the first utility module and the second utility module, said female coupler has a depressed locking location configured with at least one locking rib extending above a depressed surface and along a sliding path, and having an open edge facing in a first sense; said male coupler has a projecting locking location disposed in register with said depressed locking location and configured with at least one locking tongue extending along said engaging sliding path at a second sense, opposite to said first sense, and configured for arresting engagement at a space between said locking rib and depressed surface, the coupling mechanism further comprises at least one locking member for arresting the first utility module with respect to said second utility module and preventing sliding displacement along said sliding path.

The arrangement is such that at a locked position of a utility assembly the at least one locking tongue of the male coupler engages below said at least one locking rib of the female coupler and the at least one locking member is engaged, thus preventing any respective displacement between the first utility module and the second utility module, and retaining the coupling mechanism at an engaged and locked position.

The term 'first utility module' as used herein denotes any utility module bearing at least one second utility module over a first surface thereof. The second utility module of a utility assembly may comprise three or more stages of utility modules, and functions as first utility module with respect to a third stage utility module mounted thereover and serving in turn as a second utility module.

According to certain embodiments, one or more female couplers are configured at the top face of the first utility module, and one or more male couplers are configured at the bottom face of the second utility module The disclosed subject-matter is directed to a utility module configured with at least one of a male coupling mechanism and a female coupling mechanism of the disclosure, a module assembly comprising one or more utility modules of the aforementioned type and a set of utility modules of the aforementioned type.

According to a configuration of the first aspect, there is provide a utility assembly comprising at least a first utility module and at least a second utility module, and comprising a coupling mechanism configured between the first utility module and the second utility module; said coupling mechanism comprising at one of a top face of the first utility module and a bottom face of the second utility module one or more depressed locking locations each configured with a locking rib, and at least one locking latch arresting location; and the other one of said top face of the first utility module and a bottom face of the second utility module comprises one or more projecting portions each configured with a locking tongue disposed in register with said one or more depressed locking locations, and at least one locking latch disposed in register with said at least one locking latch arresting location.

The arrangement is such that, at a locked position, the bottom face of the second utility module at least partially rests over the top face of the first utility module, and the one or more projecting tongues are arrested by the corresponding one or more locking ribs, and the at least one locking latch is arrested by corresponding at least one locking latch arresting location, thereby preventing sliding displacement between the first utility module and the second utility module, and further wherein disengaging the second utility module from the first utility module is facilitated by disengaging the at least one locking latch from the at least one locking latch arresting location.

Locking engagement between the second utility module and the first utility module is obtained when the one or more depressed locking locations and the one or more projecting portions are disposed behind one another (though not necessarily aligned).

According to a particular configuration of the coupling mechanism, the one or more depressed locking locations and the one or more locking latch arresting locations are configured at the top face of the first utility module, and the one or more projecting portions and the at least one locking latch are configured at the bottom face of the second utility module. According to this configuration, locking between the first utility module and the second utility module is obtained by positioning the second utility module over the second utility module such that one or more locking tongues of the projecting portions engages with one or more respective locking ribs of the depressed locking locations, and wherein the locking latch interlocks with the respective locking latch arresting location.

The arrangement being such that the attaching engagement between the second utility module and the first utility module takes place when the one or more locking tongues and the corresponding one or more respective locking ribs are engaged, thereby preventing vertical separation between the utility modules (i.e. preventing lifting of the second utility module of the first utility module), and further when the locking latch is arrested by the respective locking latch arresting location, thereby preventing sliding displacement of the utility modules one with respect to the other (i.e. sliding displacement of the second module over the first module).

Disengaging the second utility module from the first utility module can be facilitated only after disengaging the locking latch from said locking latch arresting location.

According to a second aspect of the disclosure there is disclosed a coupling mechanism for a utility assembly comprising at least a first utility module and at least a second utility module, said coupling mechanism is configured between the first utility module and the second utility module and comprises at one of a top face of the first utility module and a bottom face of the second utility module with at least one depressed locking location configured with a locking rib, and at least one locking latch arresting location; and the other one of said top face of the first utility module and a bottom face of the second utility module comprises at least one projecting portion with a locking tongue disposed in register with said at least one depressed locking location, and at least one locking latch disposed in register with said at least one locking latch arresting location; and wherein at a locked position the bottom face at least partially rests over the top face, and the at least one projecting tongue is arrested by the corresponding at least one locking rib and the at least one locking latch is arrested by corresponding at least one locking latch arresting location, and further wherein disengaging the second utility module from the first utility module is facilitated by disengaging the at least one locking latch from the at least one locking latch arresting location.

Engaging the first and second utility modules into the locked position is provided by sliding the second utility module with respect to the first utility module along a sliding path defined by at least one of said at least one locking rib and said at least one locking tongue.

According to one particular configuration the at least one locking rib extends substantially parallel to the sliding path and according to another configuration the at least one locking rib extends substantially perpendicular and intersects the sliding path. A third aspect of the present disclosure is directed to a utility module being a mobile carrier unit and comprising at least one carrier engagement surface, compatible for interlocking engagement in a detachable manner with a first engagement surface of a utility module.

The term carrier unit as used herein denotes any kind of propelled cart configured for detachably attaching and carrying load. The carrier unit may be a hand cart, a mobile tool cart, a mobile workshop, traveling luggage cart, a trolley, etc.

With particular reference to the third aspect, the carrier engagement surface can be larger than the utility module's first engagement surface corresponding with it. In this case, several utility modules may be interlocked simultaneously upon one carrier unit. According to one configuration there is disclosed a carrier unit comprising a manipulating arrangement, a locomotion system, and an engagement surface comprising one or more engaging elements. The carrier unit is designated for detachable interlocking engagement with one or more utility modules, each comprising a first engagement surface configured with one or more first engaging elements compatible for detachable interlocking engagement with the carrier engaging elements.

According to yet configuration there is disclosed an assembly comprising a carrier unit comprising an engagement surface comprising one or more engaging elements, and at least one utility module configured with at least one first engagement surface comprising one or more first engaging elements compatible for detachable interlocking engagement with the carrier unit's engaging elements.

According to a modification of this aspect, there is also provided a container unit comprising a top member configured with a second engagement surface of the utility module, said top member, according to one example constitutes a cover of the utility module.

The arrangement is such that a container unit can be readily and easily applied over and interlockingly articulated to a carrier unit, or over a utility module configured with a second engagement surface mimicking the first engagement surface second engagement surface mimicking the first engagement surface of the carrier unit.

Engagement between the carrier unit and the container, and further between two containers, is facilitated by any locking mechanism of the disclosure hereinabove and hereinafter.

According to a specific example, there is a latching mechanism, wherein the first engaging elements of the carrier unit are configured for interlocking engagement with engaging elements of the mating surface of the respective utility module. The latching mechanism may assume various configurations, e.g. male-female couplings, dovetail couplings, and the like. The arrangement being such that only a minor displacement is required in order to lockingly mount, and respectively detach, a utility module over the carrier unit.

According to one specific configuration, the detachable interlocking engagement mechanism between the carrier engaging elements and the utility module's first engaging elements is a dovetail engagement mechanism, comprising laterally projecting shoulders configured on one of the carrier engagement surfaces and the first engagement surface of a utility module, and a shoulder receiving recess configured on the other one of one of the carrier engagement surfaces and the first engagement surface of a utility module; where said laterally projecting shoulders are configured for sliding engagement with said shoulder receiving recess.

According to a particular configuration, one or both of the carrier engagement surfaces and the first engagement surface of a respective utility module are configured with depressions, each accommodating respective laterally projecting locking shoulders. Said dovetail engagement mechanism members constitute said engaging elements, wherein said carrier engaging elements comprise one of said dovetail engagement members, while the utility module's first engaging element comprises the respective said dovetail engagement member.

According to another configuration, the detachable interlocking engagement mechanism between the carrier engaging elements and the utility module's first engaging elements is an undercut engagement mechanism, comprising lateral projections configured on one of the carrier engagement surfaces and the first engagement surface of a container unit, and a receiving recess configured on the other one of one of the carrier engagement surfaces and the first engagement surface of a utility module; where said lateral projections are configured for engagement with said receiving recess.

Interlocking engagement of the utility module and the carrier unit takes place by placing the first engagement surface of a utility module over the carrier engagement surface, such that the utility module's first engaging elements are disposed shifted over the respective carrier engaging elements of the carrier unit, and are then slidingly shifted to obtain sliding interlocking engagement therebetween.

The detachable interlocking engagement mechanism may further comprise a locking mechanism configured for preventing unintentional detaching of the slidingly engaging elements once they are fully interlocked, i.e. to prevent detaching of the utility module from the carrier unit or from another utility module.

According to one configuration, the locking mechanism, comprises a locking pin that is configured for snapingly protruding from one of the engagement surfaces into a designated nook on the other engagement surface. This prevents the engaging surfaces from sliding relatively to each other, and by that it prevents said engaging elements from being slidingly separated once interlocked.

According to one configuration, the carrier engagement surface of the carrier unit constitutes a top wall of the carrier unit, when the carrier unit is balanced horizontally to the ground, and wherein the utility module's first engagement surface constitutes a bottom wall of the container unit, when the utility module is balanced horizontally to the ground. The utility module can further comprise a second engagement surface constituting its top wall, or a cover, when the utility module is balanced horizontally to the ground. The second engagement surface of the utility module simulates the carrier engagement surface as it is compatible for engaging with another utility module's first engagement surface.

Any one or more of the following features, designs and configurations, can be implemented in a utility module, a utility assembly, locking mechanism, and the carrier unit and assembly according to the present disclosure, individually or in various combinations thereof:

- A single locking rib can extend at rear end of a depressed locking location (i.e. the female coupler may comprise a single locking rib) and substantially perpendicular to the sliding path;
- Two locking ribs can extend at side edges of a depressed locking location (i.e. the female coupler may comprise two locking ribs) and disposed substantially parallel to the sliding path;
- Two locking ribs can each extend at a respective side edge of two neighboring depressed locking locations, said locking ribs disposed substantially parallel to the sliding path;
- The utility assembly can be modular wherein a top face of a first utility module can interlock with a bottom face of a second utility module disposed thereover in a substantially fully overlapping relation, or with a bottom face of at least one second utility module only partially overlapping therewith;
- A second utility module overlapping a significant portion of a first utility module can be configured with a single release latch for displacing several locking latches articulated therewith;
- Two or more second utility modules can be mounted over a first utility module, each being independently detachable attachable over the first utility module;
- The at least one second utility module is configured for snap-type locking over the first utility module;
- A release latch for displacing the locking latch into disengagement from the locking latch arresting location can be disposed at a front face of the respective second utility module;
- The at least one locking latch and the at least one locking latch arresting location can be disposed at a front portion of the respective utility modules;
- At least one of the first utility module and the second utility module are configured with a gliding surface facilitating displacement and positioning the respective second utility module at the locking position with respect to the first utility module;
- The gliding surface reduces tolerances between the projecting portion and the depressed locking location receiving same;
- One or both of the locking tongue and locking rib can be configured with a slanting surface at corresponding orientation, along the sliding path, for reducing or substantially elimination tolerance therebetween;
- One or both of a front edge of the projecting portion and a corresponding front edge of the depressed locking location can be slanted for gliding positioning of the second utility module into true locking position over the first utility module;
- The locking latch can be configured for displacement in a direction substantially normal to a respective face of a utility module;
- The locking latch can be spring biased and configured for normally projecting from a face of the respective first or second utility module;
- The locking latch can be manipulable to be opened through an opening configured at a front wall of the respective utility module;
- Corners of the utility modules can be reinforced;
- One or more of the utility modules can be a container module, and the utility assembly can be a container assembly/tool caddy;
- The container module can be compartmented and can be configured with sub-containers and sub-compartments;
- The top face of the container module can be configured as a lid or as a functional component of the container module;
- A lid of a second container can be opened also when articulated and locked in position over a first container;
- A lid of a first container can be opened also when a second container is articulated and locked in position thereabove;
- At least one of the container modules can be a locomoting container and can be configured with an arrangement for locomoting said container module. Where the locomoting container is attached to other container modules it can facilitate for locomoting the utility assembly;
- The container modules can be configured with carrying arrangement disposed at any one or more of its faces. According to a particular configuration, a front face of the container modules is configured with a carrying handle and according to another configuration side faces of the container modules can be configured with a carrying handle;
- Examples of utility modules can be any one or more of a cooler box, a workpiece grip, a power supply (e.g. power bank, generator), hand tools, power tools, a locomotive platform (e.g. a work dolly), powered or not, a tactical unit (e.g. military gear, scientific equipment, communications equipment, personal gear, outdoor gear, etc.);

A tool caddy can be configured with a carrying handle (e.g. telescopic);

A utility module can be a soft-shell container with at least a rigid face portion configured with a male/female coupler;

The utility module can be an interface coupling module, i.e. functions only as a coupling interface;

The interface coupling module can be attached to a surface of any element or object and by different arrangements, fixedly or detachably;

The interface coupling module can be a cargo interface module for a utility vehicle, so as to attach one or more utility modules to the vehicle;

The cargo interface module can be a bed cargo module, a roof rack module, etc.;

The interface coupling module can be a surface mount for attaching utility modules, e.g. a floor mount, wall mount, wall rack, etc.;

The interface coupling module can be a tool mount/rack;

The interface coupling module can be belt mount for mounting of utility modules (e.g. a hand tool) to a workers belt;

The interface coupling module can be an interface mount module for coupling two utility modules to one another, e.g. for articulating two utility modules, both configured with a similar male coupler or a female coupler, and wherein the interface mount module is configured at both faces with another of male coupler or a female coupler;

The interface coupling module can be a back pack carrying module, for facilitating attachment and carrying of utility modules;

A top face of a utility module can be configured with a carrying handle, said carrying handle displaceable between a stowed position and a carrying position, wherein at the stowed position said carrying handle at least partially extends within a niche and does not to interfere with the coupling mechanism;

The carrier unit may include one or more auxiliary engagement surfaces positioned on an exterior face of the carrier unit. For example, an auxiliary engagement surface can be configured at a bottom face of the carrier unit;

The carrier unit may include a second engagement surface simulating/mimicking the first engagement surface of the utility module;

A utility module may be configured with one or more auxiliary first and second engagement surfaces;

The carrier engagement surface may be a connectivity platform detachably attached to the exterior surface of the carrier unit, facilitating a cart unit or a carrier unit according to the present disclosure;

One or both of the utility module's first and second engagement surfaces may be detachably attached to an exterior surface of the utility module;

The carrier engagement surface and the utility module's first engagement surface may be like elements;

The utility module's first and second engagement surfaces may be like elements;

The carrier unit's engaging elements and the utility module's first engaging elements may be similar elements;

One engagement surface may include several engaging elements and one locking mechanism;

The coupling mechanism is configured for spontaneous displacement into locking engagement within a locking receptacle, wherein manual interference is required only for unlocking the locking mechanism and detaching a utility module from a respective utility module or carrier unit;

The coupling mechanism can be a spring biased locking pin, normally projecting from a respective engagement surface;

One or both of the carrier unit and the utility module may further include a locking mechanism designated to prevent unintentional separation of the engagement surfaces while they are interlocked;

The locking mechanism is manipulable between an unlocked position in which said engagement surfaces may slide upon each other, and a locked state in which the engagement surfaces may not slide upon each other;

The locking mechanism may be configured with a biasing mechanism for snap arresting at least at its locked state;

The locking mechanism may be configured with a manually operated activating portion for switching between said unlocked and locked positions.

The carrier unit may be assembled together with other carrier units the same way it's assembled with the utility modules;

The locomotion system of the carrier unit may comprise a wheel system (e.g. axially fixed roller wheels, swivel wheels, etc.), a sliding platform, caterpillar tracks, etc;

The locomotion system of the carrier unit comprises, according to a particular example, several fixed axis wheels, wherein the perimeter of said wheels is tangent with a base edge of the carrier unit;

At an assembled configuration, where one or more utility modules are attached to the carrier unit, the assembly can be positioned vertically wherein a side face of the one or more containers rest over a supporting surface. According to a particular example, at this position the carrier unit and container assembly are configured with stability members for retaining their stability while positioned vertically to the ground;

The carrier unit may be stable while positioned horizontally to the ground, by a support system projecting from a bottom face thereof. The support system may comprise friction enhancing surfaces to restrict displacement of the assembly while placed over a bearing surface;

The carrier unit may be foldable to a more compact configuration;

The carrier unit may comprise an external storage box detachably interconnectable to its exterior walls;

The carrier unit may comprise a power supply detachably interconnectable to its exterior walls;

The carrier unit's transporting system may be motorized while powered via said power supply;

The carrier unit may further include a locking mechanism to insure interlocking connection of the engagement surfaces;

The container unit may comprise non-rigid portions;

The carrier unit may comprise at least one manipulating arrangement, configurable between a stowed position in which the manipulating arrangement is retracted, and a manipulating position in which the manipulating arrangement is extracted. The manipulating arrangement may be a telescopic or foldable handle;

The manipulating arrangement may be a gripping handle, a D-grip handle, a T-grip handle, a flexible strap, etc.

EMBODIMENTS

The present disclosure also encompasses embodiment as defined in the following numbered phrases. It should be noted that these numbered embodiments intended to add to this disclosure and is not intended in any way to be limiting.

1. A coupling mechanism configured for readily detachably attaching a first utility module to a second utility module, the coupling mechanism comprising a male coupler at a face of one of the first utility module and the second utility module, and a female coupler at a face of the other one of the first utility module and the second utility module, said female coupler having a depressed locking location configured with at least one locking rib extending above a depressed surface and along a sliding path, and having an open edge facing in a first sense; said male coupler having a projecting locking location disposed in register with said depressed locking location and configured with at least one locking tongue extending along said engaging sliding path at a second sense, opposite to said first sense, and configured for arresting engagement at a space between said locking rib and depressed surface, the coupling mechanism further comprises at least one locking member for arresting the first utility module with respect to said second utility module and preventing sliding displacement along said sliding path.

2. The coupling mechanism of embodiment 1, wherein said female coupler is configured at the top face of the first utility module, and the male coupler is configured at the bottom face of the second utility module.

3. The coupling arrangement of embodiment 1 or 2, wherein the at least one locking rib extends substantially parallel to the sliding path.

4. The coupling arrangement of embodiment 1 or 2, wherein the at least one locking rib extends substantially perpendicular and intersects the sliding path.

5. The coupling arrangement of embodiment 1 or 2, wherein the female coupler comprises a single locking rib extends at rear end of a depressed locking location and substantially perpendicular to the sliding path.

6. The coupling arrangement of embodiment 1 or 2, wherein the female coupler comprises two locking ribs extend at side edges of a depressed locking location and disposed substantially parallel to the sliding path.

7. The coupling arrangement of embodiment 1 or 2, wherein the female coupler comprises two locking ribs each extend at a respective side edge of two neighboring depressed locking locations, said locking ribs disposed substantially parallel to the sliding path.

8. A coupling mechanism for a utility assembly that comprises at least a first utility module and at least a second utility module, said coupling mechanism is configured between the first utility module and the second utility module; one of a top face of the first utility module and a bottom face of the second utility module comprises at least one depressed locking location configured with a locking rib, and at least one locking latch arresting location; and the other one of said top face of the first utility module and a bottom face of the second utility module comprises at least one projecting portion with a locking tongue disposed in register with said at least one depressed locking location, and at least one locking latch disposed in register with said at least one locking latch arresting location; and wherein at a locked position the bottom face at least partially rests over the top face, and the at least one projecting tongue is arrested by the corresponding at least one locking rib and the at least one locking latch is arrested by corresponding at least one locking latch arresting location, and further wherein disengaging the second utility module from the first utility module is facilitated by disengaging the at least one locking latch from the at least one locking latch arresting location, such that engaging the first and second utility modules into the locked position is provided by sliding the second utility module with respect to the first utility module along a sliding path defined by at least one of said at least one locking rib and said at least one locking tongue.

9. The coupling arrangement of embodiment 8, wherein the at least one locking rib extends substantially parallel to the sliding path.

10. The coupling arrangement of embodiment 8, wherein the at least one locking rib extends substantially perpendicular and intersects the sliding path.

11. The coupling arrangement of embodiment 8, wherein a single locking rib extends at rear end of a depressed locking location and substantially perpendicular to the sliding path.

12. The coupling arrangement of embodiment 8, wherein two locking ribs extend at side edges of a depressed locking location and disposed substantially parallel to the sliding path.

13. The coupling arrangement of embodiment 8, wherein two locking ribs each extend at a respective side edge of two neighboring depressed locking locations, said locking ribs disposed substantially parallel to the sliding path.

14. The coupling arrangement of any one of embodiments 8 to 13, further comprising a release latch for displacing the locking latch into disengagement from the locking latch arresting location can be disposed at a front face of the respective second utility module.

15. The coupling arrangement of any one of embodiments 8 to 14, wherein the at least one locking latch and the at least one locking latch arresting location are disposed at a front portion of the respective utility modules.

16. The coupling arrangement of any one of embodiments 8 to 15, wherein the locking latch is configured for displacement in a direction substantially normal to a respective face of a utility module.

17. The coupling arrangement of any one of embodiments 8 to 16, wherein locking latch is spring biased and configured for normally projecting from a face of the respective first or second utility module.

18. The coupling arrangement of any one of embodiments 8 to 17, wherein the locking latch is manipulable to be opened through an opening configured at a front wall of the respective utility module.

19. The coupling arrangement of any one of embodiments 1 to 18, wherein one or both of the locking tongue and locking rib are configured with a slanting surface at corresponding orientation along the sliding path.

20. The coupling arrangement of any one of embodiments 1 to 19, wherein one or both of a front edge of the projecting portion (or the projecting locking location) and a corresponding front edge of the depressed locking location are slanted for gliding positioning of the second utility module into locking position over the first utility module.

21. The coupling mechanism of any one of embodiments 1 to 20, wherein the first utility module is configured for detachably attaching one or more second utility modules thereto.

22. A coupling mechanism for a utility assembly comprising at least a first utility module and at least a second utility module, said coupling mechanism is configured between the first utility module and the second utility module and comprises at one of a top face of the first utility module and a bottom face of the second utility module with at least one depressed locking location configured with a locking rib, and at least one locking latch arresting location; and the other one of said top face of the first utility module and a bottom face of the second utility module comprises at least one projecting portion with a locking tongue disposed in register with said at least one depressed locking location, and at least one locking latch disposed in register with said at least one locking latch arresting location; and wherein at a locked position the bottom face at least partially rests over the top face, and the at least one projecting tongue is arrested by the corresponding at least one locking rib and the at least one locking latch is arrested by corresponding at least one locking latch arresting location, and further wherein disengaging the second utility module from the first utility module is facilitated by disengaging the at least one locking latch from the at least one locking latch arresting location.

23. A utility assembly comprising at least a first utility module and at least a second utility module, and comprising a coupling mechanism according to any one of embodiments 1 to 21, the coupling mechanism being configured between the first utility module and the second utility module.

24. A utility assembly comprising at least a first utility module and at least a second utility module, and comprising a coupling mechanism for readily detachably attaching the first and second utility modules, the coupling mechanism being configured between the first utility module and the second utility module; said coupling mechanism comprising at one of a top face of the first utility module and a bottom face of the second utility module one or more depressed locking locations each configured with a locking rib, and at least one locking latch arresting location; and the other one of said top face of the first utility module and a bottom face of the second utility module comprises one or more projecting portions each configured with a locking tongue disposed in register with said one or more depressed locking locations, and at least one locking latch disposed in register with said at least one locking latch arresting location; such that at a locked position, the bottom face of the second utility module at least partially rests over the top face of the first utility module, and the one or more projecting tongues are arrested by the corresponding one or more locking ribs, and the at least one locking latch is arrested by corresponding at least one locking latch arresting location, thereby preventing sliding displacement between the first utility module and the second utility module, and disengaging the second utility module from the first utility module is facilitated by disengaging the at least one locking latch from the at least one locking latch arresting location.

25. The utility assembly of embodiment 24, wherein the first and second utility modules are in a locking engagement when said one or more depressed locking locations and the one or more projecting portions are disposed behind one another.

26. The utility assembly of embodiment 24 or 25, wherein said one or more depressed locking locations and said one or more locking latch arresting locations are configured at the top face of the first utility module, and the one or more projecting portions and the at least one locking latch are configured at the bottom face of the second utility module.

27. The utility assembly of any one of embodiments 24 to 26, wherein at least one second utility module is configured for snap-type locking over the first utility module.

28. The utility assembly of any one of embodiments 24 to 27 wherein engaging the first and second utility modules into the locked position is provided by sliding the second utility module with respect to the first utility module along a sliding path defined by at least one of said at least one locking rib and said at least one locking tongue.

29. The utility assembly of any one of embodiments 24 to 28, wherein the at least one locking rib extends substantially parallel to the sliding path.

30. The utility assembly of embodiment 29, wherein the at least one locking rib extends substantially perpendicular and intersects the sliding path.

31. The utility assembly of embodiment 29, wherein a single locking rib extends at rear end of a depressed locking location and substantially perpendicular to the sliding path.

32. The utility assembly of embodiment 29 wherein two locking ribs extend at side edges of a depressed locking location and disposed substantially parallel to the sliding path.

33. The utility assembly of embodiment 29, wherein two locking ribs each extend at a respective side edge of two neighboring depressed locking locations, said locking ribs disposed substantially parallel to the sliding path.

34. The utility assembly of any one of embodiments 24 to 33, wherein a top face of a first utility module interlocks with a bottom face of a second utility module disposed thereover in a substantially fully overlapping relation, or with a bottom face of at least one second utility module only partially overlapping therewith.

35. The utility assembly of any one of embodiments 24 to 33, wherein the second utility module overlaps a significant portion of a first utility module and is configured with a single release latch for displacing several locking latches articulated therewith.

36. The utility assembly of any one of embodiments 24 to 35, further comprising a release latch for displacing the locking latch into disengagement from the locking latch arresting location can be disposed at a front face of the respective second utility module.

37. The utility assembly of any one of embodiments 24 to 36, wherein the locking latch is configured for displacement in a direction substantially normal to a respective face of a utility module.

38. The utility assembly of any one of embodiments 24 to 37, wherein the locking latch is spring biased and configured for normally projecting from a face of the respective first or second utility module.

39. The utility assembly of any one of embodiments 24 to 38, wherein two or more second utility modules can be mounted over a first utility module, each being independently detachable attachable over the first utility module.

40. The utility assembly of any one of embodiments 24 to 39, wherein at least one of the first utility module and the second utility module are configured with a gliding surface facilitating displacement and positioning the respective second utility module at the locking position with respect to the first utility module.

41. The utility assembly of any one of embodiments 24 to 40, wherein one or more of the utility modules is a container module, and the utility assembly is a container assembly or a tool caddy.

42. The utility assembly of embodiment 41, wherein the container module is compartmented and optionally configured with sub-containers and sub-compartments.

43. The utility assembly of embodiment 41 or 42, wherein a top face of the container module is configured as a lid or as a functional component of the container module.

44. The utility assembly of any one of embodiments 41 to 43, wherein the container modules is a locomoting container, configured with an arrangement for locomoting said utility assembly.

45. The utility assembly of any one of embodiments 41 to 44, wherein the container modules is configured with a carrying arrangement disposed at any one or more of its faces, optionally being a carrying handle.

46. The utility assembly of any one of embodiments 24 to 40, wherein one or more of the utility modules is a soft-shell container with at least a rigid face portion.

47. The utility assembly of any one of embodiments 24 to 40, wherein said first utility module is a mobile carrier unit.

48. The utility assembly of any one of embodiments 24 to 47, further comprising a locking mechanism for preventing unintentional separation of the modules while they are interlocked.

49. The utility assembly of any one of embodiments 24 to 48, wherein the first utility module is configured for detachably attaching at least two second utility modules thereto.

50. A mobile carrier unit comprising at least one carrier engagement surface, compatible for interlocking engagement in a detachable manner with a first engagement surface of a utility module, said carrier engagement surface having (i) one or more depressed locking locations each configured with a locking rib and at least one locking latch arresting location, configured for engagement with said first engagement surface of a utility module that comprises at least one locking latch and one or more projecting portions, each projecting portion being configured with a locking tongue, or (ii) at least one locking latch and one or more projecting portions each configured with a locking tongue for engagement with said first engagement surface of a utility module that comprises one or more depressed locking locations, each depressed locking locations configured with a locking rib and at least one locking latch arresting location.

51. The mobile carrier unit of embodiment 50, wherein once associated with the utility module, said locking tongue becomes disposed in register with said one or more depressed locking locations, and at least one locking latch become disposed in register with said at least one locking latch arresting location.

52. The mobile carrier unit of embodiment 50 or 51, configured for detachable interlocking engagement with one or more utility modules, each utility module comprising a first engagement surface.

53. The mobile carrier unit of any one of embodiments 50 to 52, further comprising at least one of a manipulating arrangement and a locomotion system.

54. An assembly comprising a mobile carrier unit of any one of embodiments 50 to 53 having at least one carrier engagement surface, and at a least one utility module having a first engagement surface, the utility module being detachably interlocked with the mobile carrier unit by engaging said first engagement surface with said carrier engagement surface.

55. The assembly of embodiment 54, wherein the mobile carrier unit and the at least one utility module are detachably interlocked with one another by a dovetail engagement mechanism, that comprises laterally projecting shoulders configured on one of the carrier engagement surfaces and the first engagement surface of a utility module, and a shoulder receiving recess configured on the other one of one of the carrier engagement surfaces and the first engagement surface of a utility module; where said laterally projecting shoulders are configured for sliding engagement with said shoulder receiving recess.

56. The assembly of embodiment 55, wherein one or both of the carrier engagement surfaces and the first engagement surface of a respective utility module are configured with depressions, each accommodating respective laterally projecting locking shoulders.

57. The assembly of embodiment 54, wherein the mobile carrier unit and the at least one utility module are detachably interlocked with one another by an undercut engagement mechanism, comprising lateral projections configured on one of the carrier engagement surfaces and the first engagement surface of a container unit, and a receiving recess configured on the other one of one of the carrier engagement surfaces and the first engagement surface of a utility module; where said lateral projections are configured for engagement with said receiving recess, such that interlocking engagement of the utility module and the carrier unit takes place by placing the first engagement surface of a utility module over the carrier engagement surface, such that the utility module's first engaging elements are disposed shifted over the respective carrier engaging elements of the carrier unit, and are then slidingly shifted to obtain sliding interlocking engagement therebetween.

58. The assembly of any one of embodiments 54 to 57, further comprising a locking mechanism configured for preventing unintentional detaching of the utility module from the carrier unit.

59. The assembly of embodiment 58, wherein the locking mechanism comprises a locking pin that is configured for snapingly protruding from one of the engagement surfaces into a designated nook on the other engagement surface.

60. An interface coupling module comprising at least one engagement surface, compatible for interlocking engagement in a detachable manner with a first engagement surface of a utility module, said interface coupling module comprising an engagement surface having (i) one or more depressed locking locations each configured with a locking rib and at least one locking latch arresting location, configured for engagement with said first engagement surface of a utility module that comprises at least one locking latch and one or more projecting portions, each projecting portion being configured with a locking tongue, or (ii) at least one locking latch and one or more projecting portions each configured with a locking tongue for engagement with said first engagement surface of a utility module that comprises one or more depressed locking locations, each depressed locking locations configured with a locking rib and at least one locking latch arresting location 61. The interface coupling module of embodiment 60, being configured for detachable or fixed attachment to a surface of an object.

62. The interface coupling module of embodiment 60 or 61, being a cargo interface module for a utility vehicle configured for attaching one or more utility modules to the vehicle.

63. The interface module of embodiment 60 or 61, being a surface mount for attaching utility modules 64. The interface module of embodiment 60 or 61, being a tool mount or a tool rack.

65. The interface module of embodiment 60 or 61, being a belt mount for mounting of utility modules to a workers belt;

66. The interface module of embodiment 60 or 61, being an interface mount module for coupling two utility modules to one another.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which: FIGS. 1A to 6G are directed to a first example of a locking mechanism, wherein:

FIG. 1A is a top perspective view of a container assembly according to an example of the present disclosure;

FIG. 1B is an exploded perspective view of the container assembly of FIG. 1A;

FIGS. 4A to 4D are consecutive steps illustrating locking engagement of the locking latch of the second container with the respective locking latch arresting location of the first container;

FIGS. 6A to 6G are various combinations of a modular container assembly according to examples of the present disclosure.

FIGS. 7A to 12C are directed to a carrier unit and another example of a locking mechanism, wherein:

FIG. 7A is container carrier assembly according to an example of the disclosure, illustrating a top, left perspective view of a container unit, mounted on top of a carrier unit;

FIG. 8A is a top, left perspective view of a carrier unit, illustrating the carrier engagement surface in further detail;

FIG. 9C is a close-up view of FIG. 9B;

FIG. 12C illustrates the utility module apart from the container and flipped, so as to expose the mating coupling mechanism.

FIGS. 13A-13D, 14A-14C, 15A-15B, 16A-16B, 17, 18A-18C, and 19-24 are different embodiments and configurations of utility modules and utility assemblies according examples of this disclosure.

DETAILED DESCRIPTION OF EMBODIMENTS

Figure 1A:
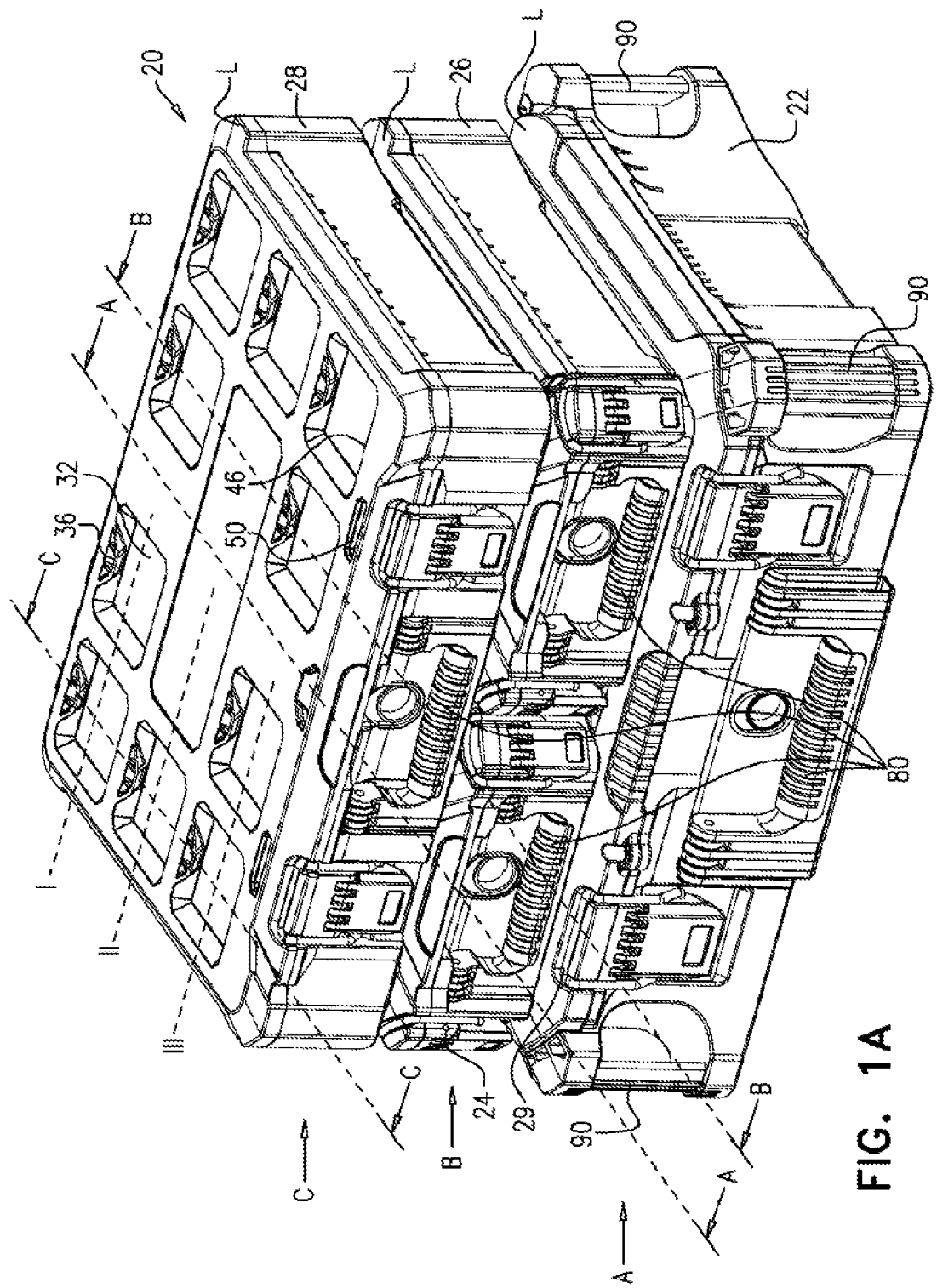
Figure 1C:
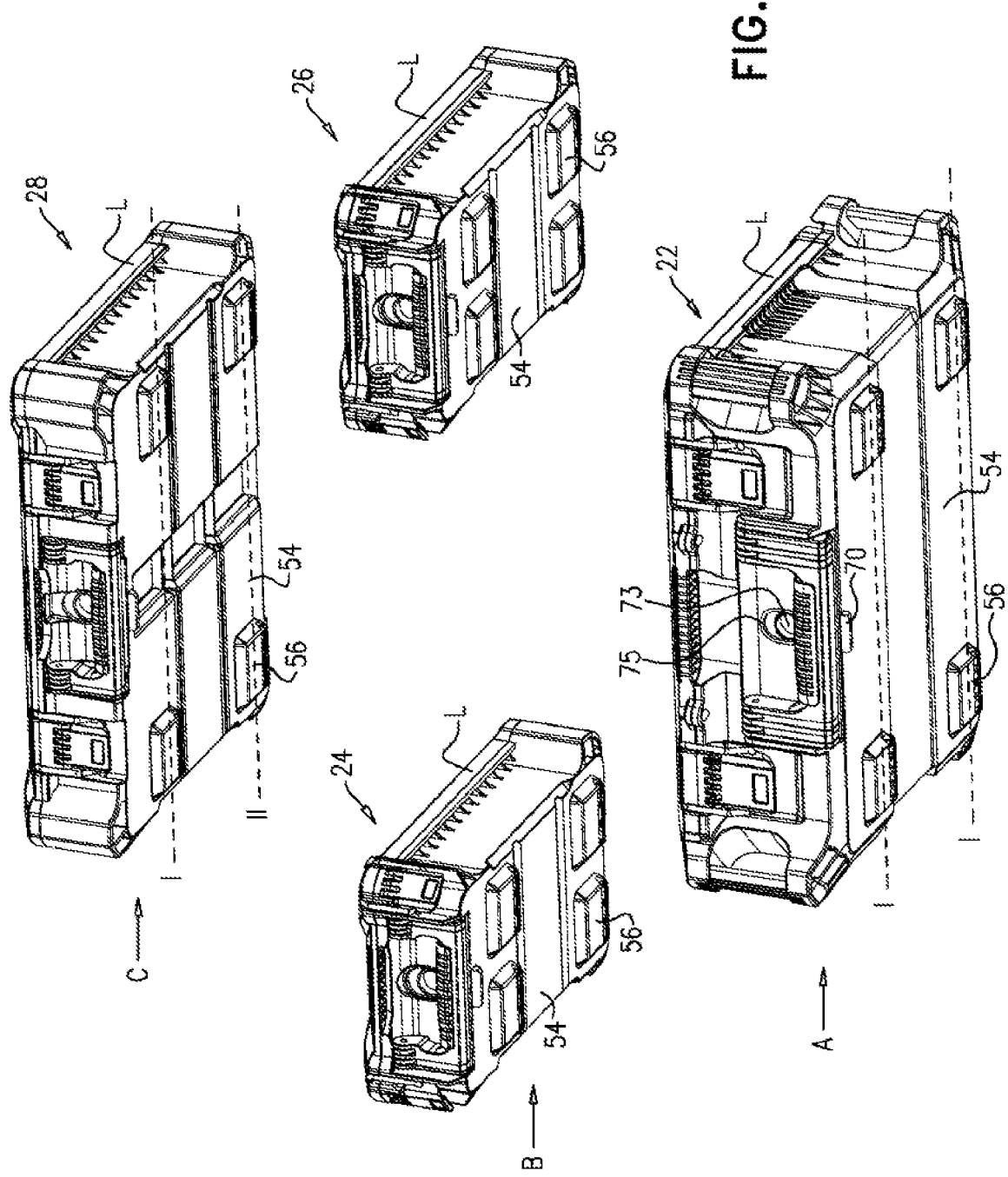
FIG. 1C is a bottom, front perspective view of FIG. 1B.
Figure 1D:
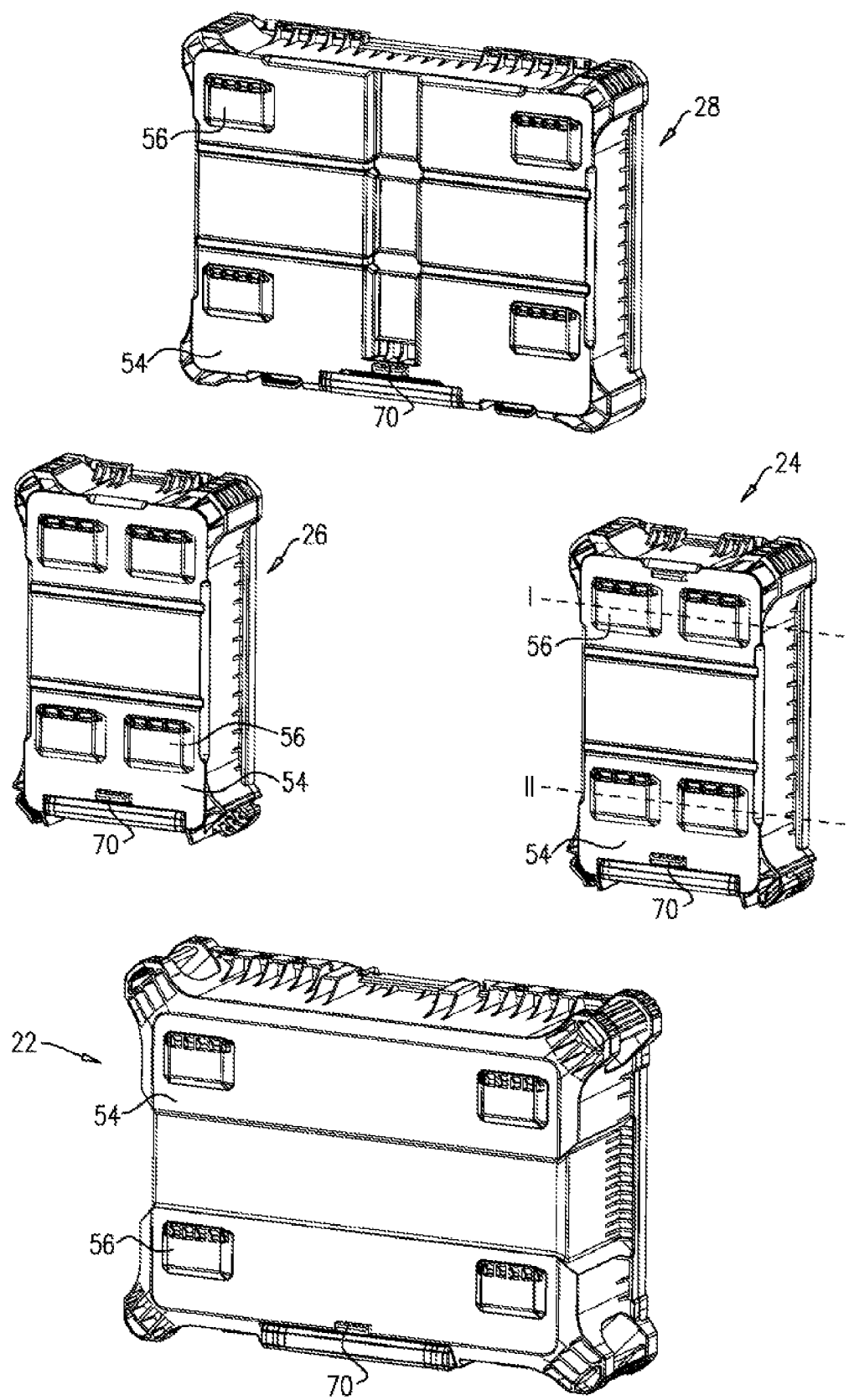
FIG. 1D is a bottom, rear perspective view of FIG. 1B.
Figure 2A:
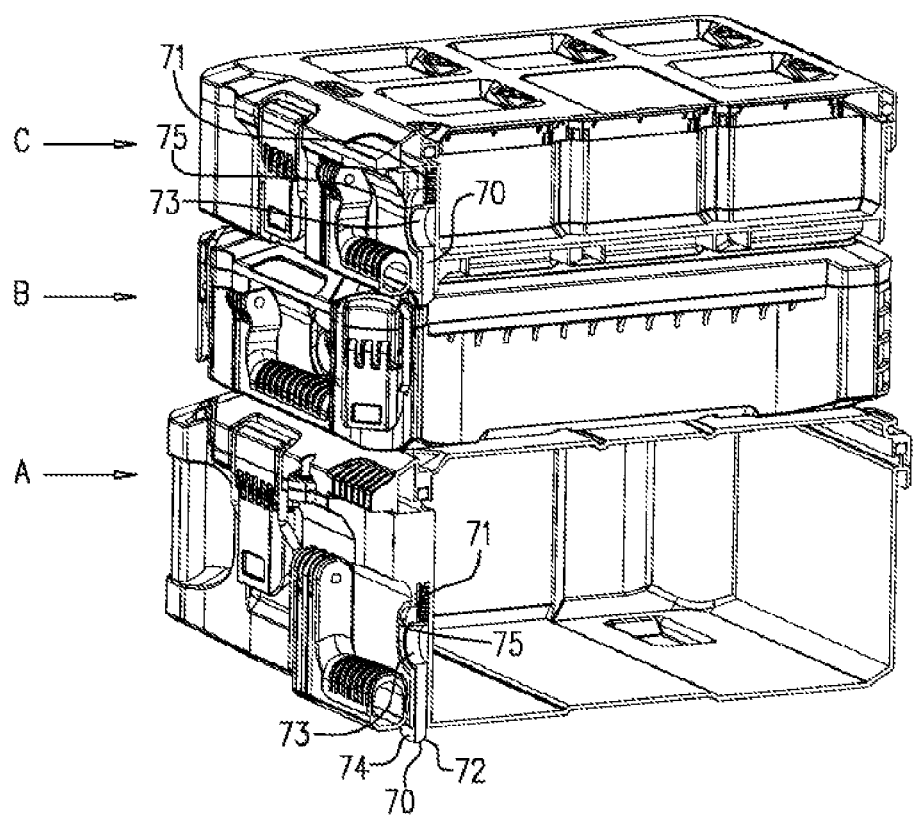
FIG. 2A is a sectioned portion along line A-A in FIG. 1A.
Figure 2B:
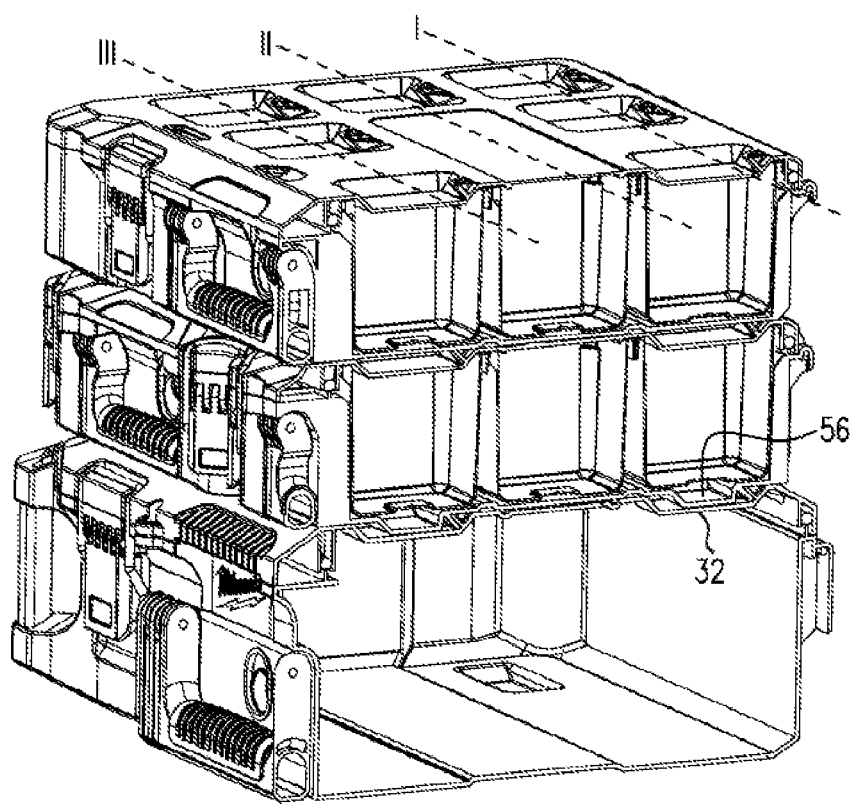
FIG. 2B is a sectioned portion along line B-B in FIG. 1A.
Figure 2C:
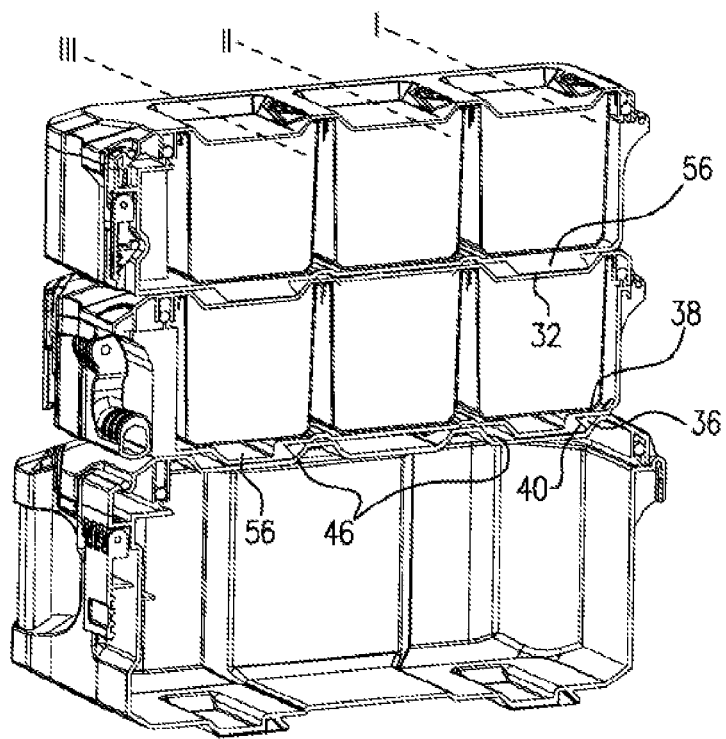
FIG. 2C is a sectioned portion along line C-C in FIG. 1A.

Reference is first being made to FIGS. 1A to 6G, directed to a first configuration of a coupling mechanism. For sake of convenience the utility modules are exemplified as containers and respectively the utility assembly is illustrates as a tool caddy. It is however appreciated that the utility modules can be of any type, shape or size, as discussed hereinabove and as will be exemplified below.

Attention is first directed to FIGS. 1A to 4D, illustrating a container assembly generally designated 20, comprising four containers 22, 24, 26 and 28 disposed in a triple stage configuration, the stages designated A, B and C. In the illustrated example containers 24 and 26 of the second stage are half-size and overlap the footprint of the first stage container 22 and the third stage container 28, wherein the first container 22 is for example a hand tool container and containers 24 to 28 are organizers or the like.

The term 'first container' as used herein denotes a container bearing over a top face thereof at least one other container, said at least one other container denoted herein as a 'second container'. It is thus appreciated that a second container of a container assembly comprising three or more stages of containers' serves as second container when referred to the first stage container, and as a first container when referred to a third stage container mounted thereover. Accordingly, in the illustrated example of FIGS. 1A-2C, container 22 is a first container and containers 24 and 26 are second containers, whilst they function as first containers when discussing locking arrangement with respect to third stage container 28.

Each of the containers is configured with a lid L constituting a top face of the respective container, said lids being pivotally attached and securely articulated to the respective container through a toggle locking latch 29. Each top face (see FIG. 1B) is configured with several depressed locking locations 32 and it is seen that the at least two depressed locking locations are disposed behind one another along imaginary lines I, II and III (though not necessarily aligned).

Each such depressed locking location is in turn configured with a laterally projecting locking rib 36 extending from a rear portion of the depressed locking location 32 towards a front face of the container. The locking rib 36 has a flat top surface 38 substantially flush with a top surface of the respective lid L, and a slanting bottom surface 40. A front portion 46 of the depressed locking location 32 is slanted too, in the same orientation as bottom surface 40 (i.e. substantially parallel thereto).

Furthermore, the top face, namely lid L of the containers, is configured with at least one locking latch arresting location in the form of a recess 50 disposed at a front portion of the respective top face and configured with a slanted rear wall portion 52 and a right angled front wall portion 53.

A bottom face 54 of each container 22, 24, 26 and 28 is configured with several projecting portions 56, extending in register with the depressed locking locations 32, and it is seen that the at least two projecting portions 56 are disposed behind one another along the imaginary lines I, II and III (though not necessarily aligned).

Each projecting portions 56 is configured with a locking tongue 60 laterally projecting rearwards and having a slanted surface 62 corresponding with slanting surface 40 of locking rib 36. Also, a front portion 66 of the projecting portions 56 slants substantially parallel to the slanted surface 62 of the locking tongue 60.

It is essential that the at least two depressed locking locations 32 and the at least two projecting portions 56 be disposed behind one another (though not necessarily aligned), as exemplified by imaginary lines I, II and III (though not necessarily aligned).

A plunger-like locking latch 70 is disposed at a front portion of each container, said locking latch 70 disposed in register with the recesses 50 and configured with a slanting rear wall portion 72 and a right angled front wall portion 74, corresponding with the sloping wall portions of the recesses 50. The locking latch 70 has an elongate finger engaging aperture 73 (FIG. 2A) accessible through an aperture 75 formed in register at a front wall face of the respective second container, said locking latch 70 being normally biased to project under force of coiled spring 71, such that the locking latch 70 is axially displaceable between a projecting, locked position and a temporary retracted position during transition into the locked position.

The locking latch 70 is typically single-handedly manipulable between its locking position and its releasing position, such that manipulation of the locking latch to disengage it from the locking latch arresting location 50 can be easily facilitated using one hand simultaneously with gripping the carrying handle 80. As seen in FIGS. 1A-2C, manipulating the finger engaging aperture 73, being part of locking latch 70, is disposed opposite to and at finger-reach distance from the carrying handle 80 when the handle is at its carrying position tilted upwards. This enables a grab, release and go detachment of the second utility module from the first utility module in a simple single-handed operation.

Figure 3A:
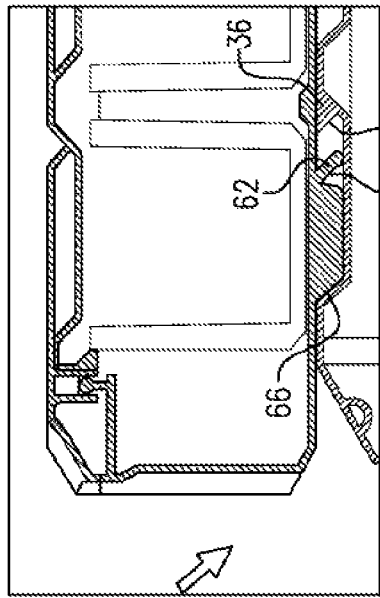
FIGS. 3A to 3D are consecutive steps illustrating locking engagement of the locking tongue of the second container with the respective locking rib of the first container.
Figure 3B:
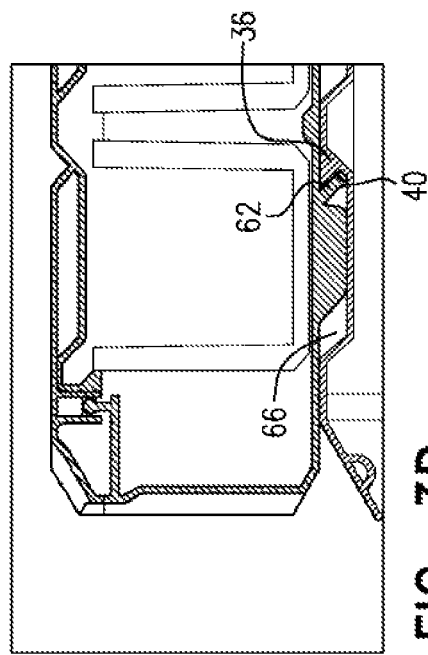
Figure 3C:
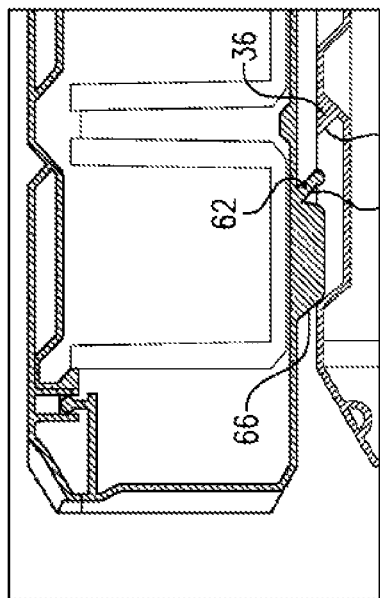
Figure 3D:
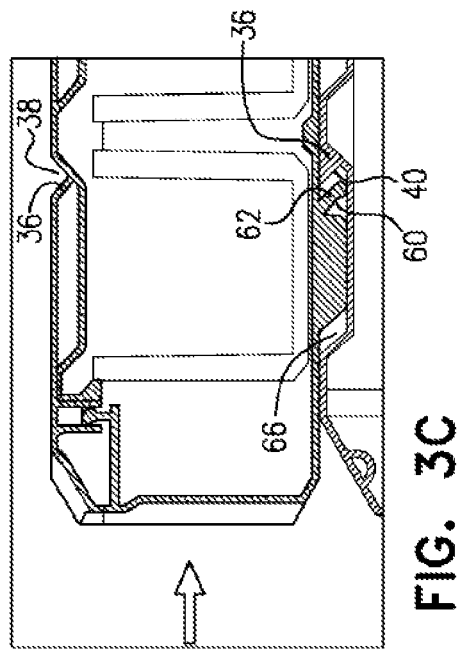

When it is required to detachably attach a second container over a first container, the former is placed over the later (FIG. 3A), placing the projecting portions 56 within the depressed locking location 32 (FIG. 3B) with the locking tongues 60 engaging below and being gradually arrested by the respective locking ribs 36 arresting is obtained (FIG. 3C) until complete arresting is obtained (FIG. 3D). Simultaneously, as the locking tongues 60 arrest by the locking ribs 36, the locking latch 70 of the second container slides into the locking latch arresting location (recess 50) and finally snaps into locking engagement therewith. It is noted (FIGS. 4A to 4D) that first (FIGS. 4B and 4C) the locking latch 70 displaces upwards against the biasing effect of spring 71, and when the second container reaches the final locking position over the first container, the locking latch 70 plunges into arresting position within the recess 50.

At the locked position the second container is attached over the top face of the first container, such that they can be moved as an integrated unit. Detaching of a second container from a first container is easily facilitated by unlocking, obtained by displacing the locking latch 70 upwards against the biasing effect of spring 71, whereby the second container can be displaced with respect to the first container and detached therefrom.

As further seen in FIGS. 1A-4D, each of the containers 22, 24, 26 and 28, is configured at a front face thereof with a tiltable carrying handle 80, for carrying a respective container or the entire container assembly 20. Also seen, some of the containers can be configured with fender-like protectors 90 at their corners.

Figure 5A:
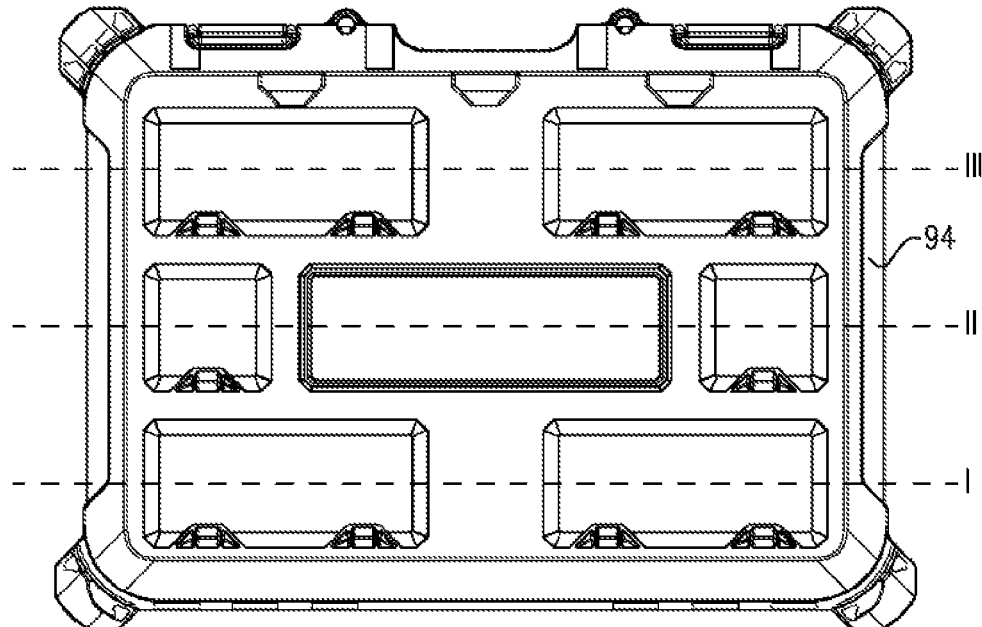
FIGS. 5A to 5E schematically demonstrate modularity of a container assembly according to the disclosure.
Figure 5B:
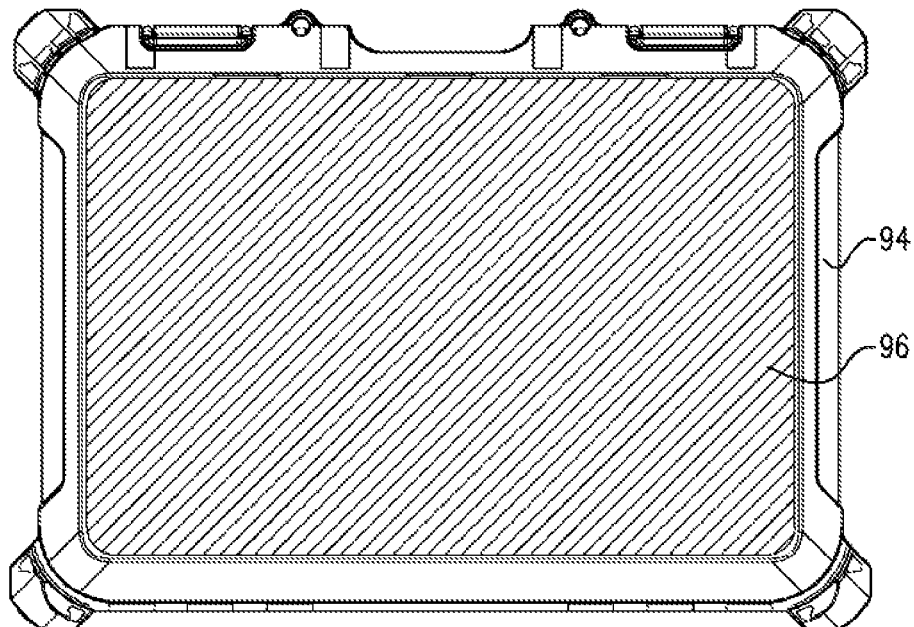
Figure 5C:
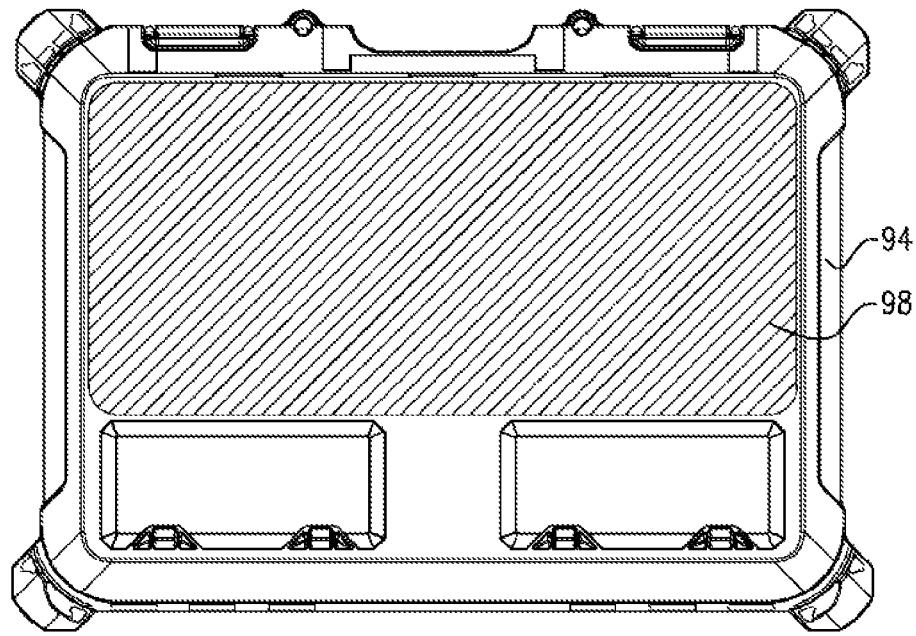
Figure 5D:
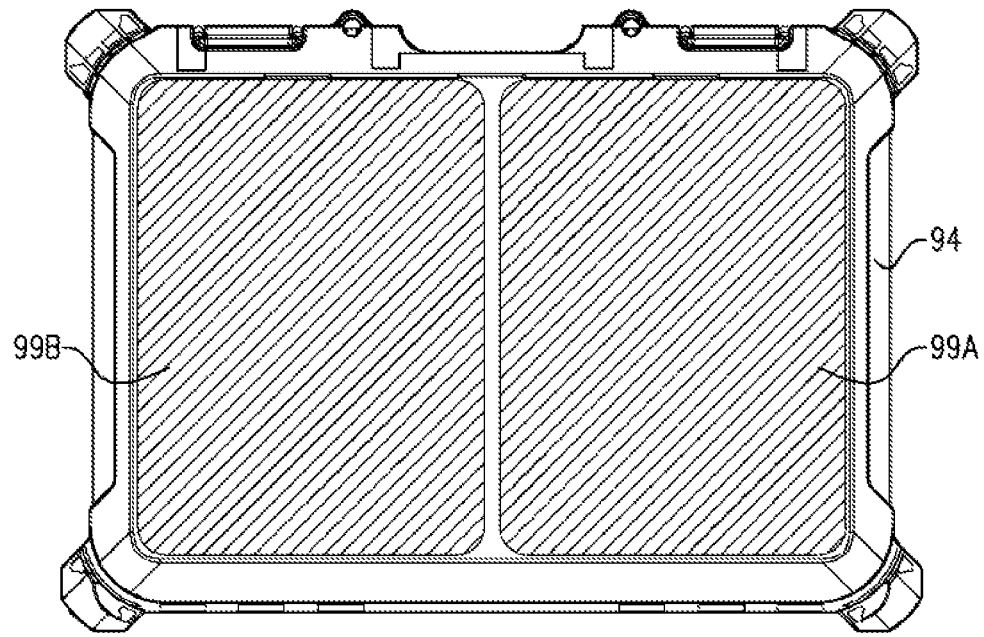
Figure 5E:
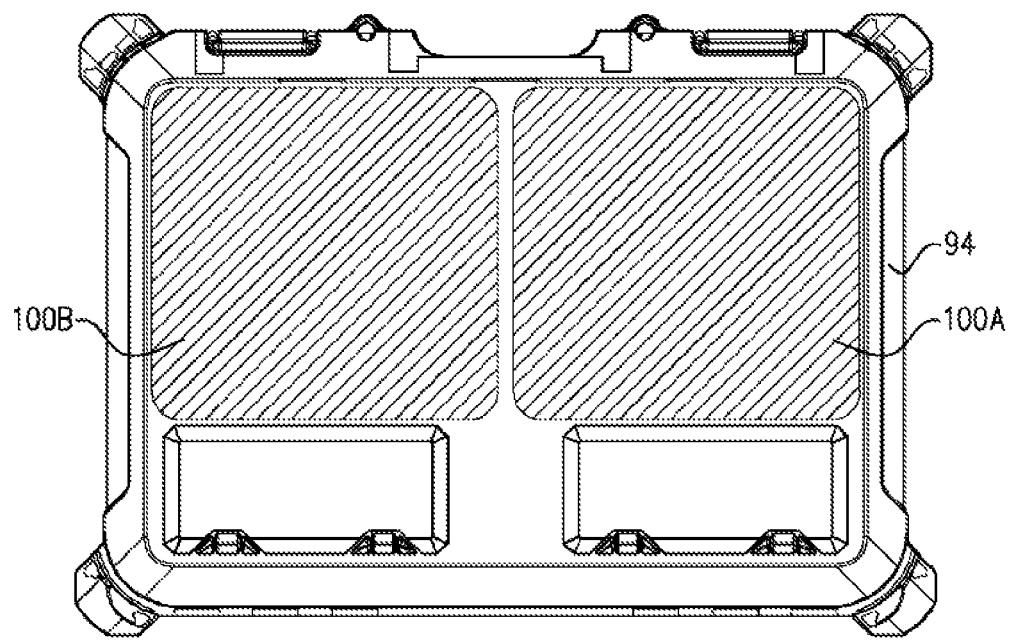

Further attention is now directed to FIGS. 5A to 5E demonstrating examples of modularity of a container assembly according to the disclosure. FIG. 5A is a planner top view of a first container 94 and FIGS. 5B to 5E illustrate second containers superimposed over the first container 94. In FIG. 5B a second container 96 is substantially as big as the first container 94, i.e. having the same footprint. In FIG. 5C a second container 98 is as wide as the first container 94, however narrower in depth, and disposed at a front portion of the first container. In FIG. 5D two second containers 99A and 99B are mounted over the first container 94 and occupy substantially the entire footprint thereof, whereby each of containers 99A and 99B is independently attachable and detachable from the first container 94, as exemplified hereinabove. In FIG. 5E two second containers 100A and 100B are positioned over the first container 94, occupying the entire width though narrower in depth and extending from a front portion of the first container 94.

Figure 6B:
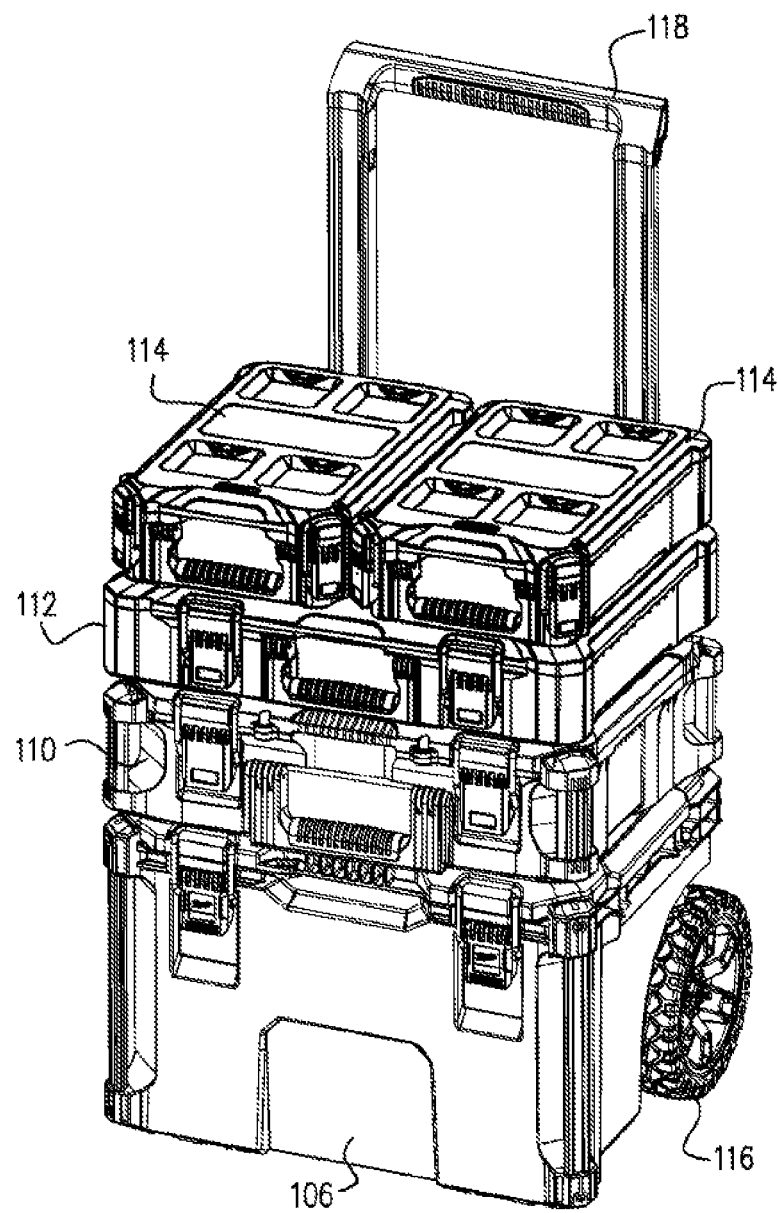

Turning now to FIGS. 6A to 6G, there are illustrated several examples of container assemblies, subassemblies and their components. FIG. 6A illustrates a disassembled container assembly collectively designated 104 and comprising a base container 106, a chest of drawers module 108 comprising three drawers, a tool caddy module 110, a compartmented storage module 112 and a half-sized compartmented storage module 114 (typically two of which). It is noted that the base container is configured for locomoting and comprises at a rear thereof wheels 116 and a telescopic handle 118.

Figure 6C:
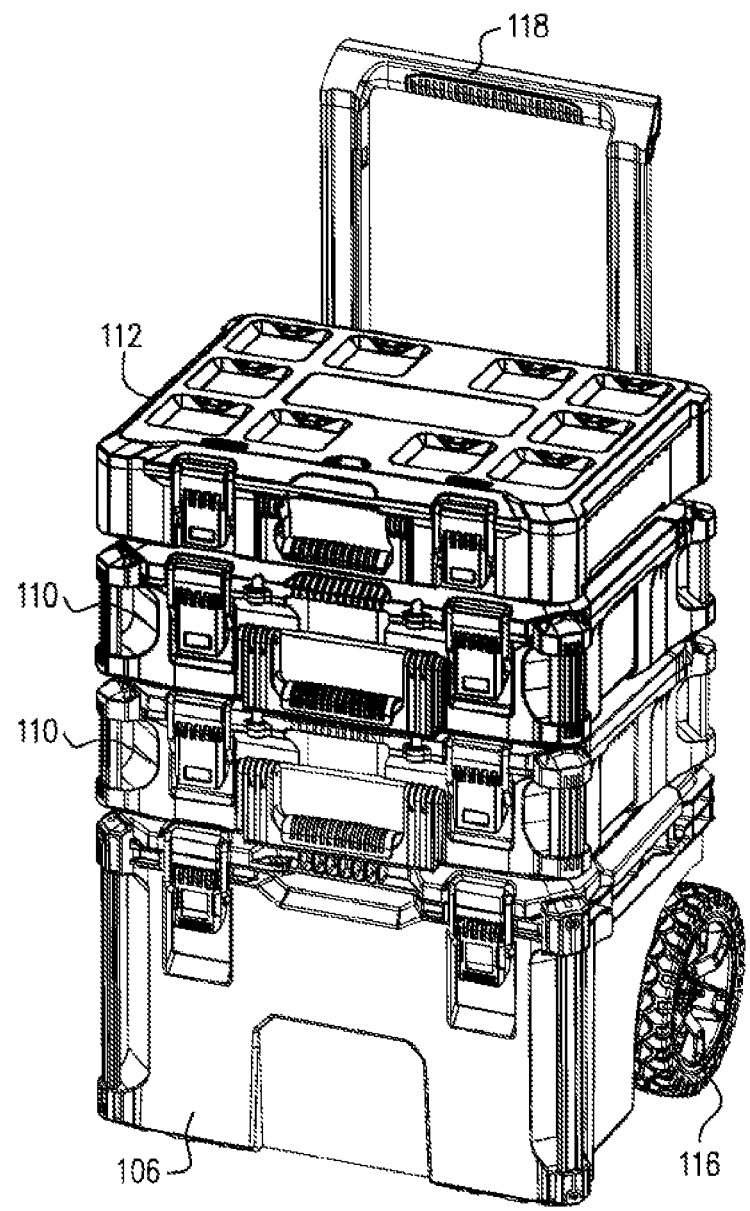
Figure 6D:
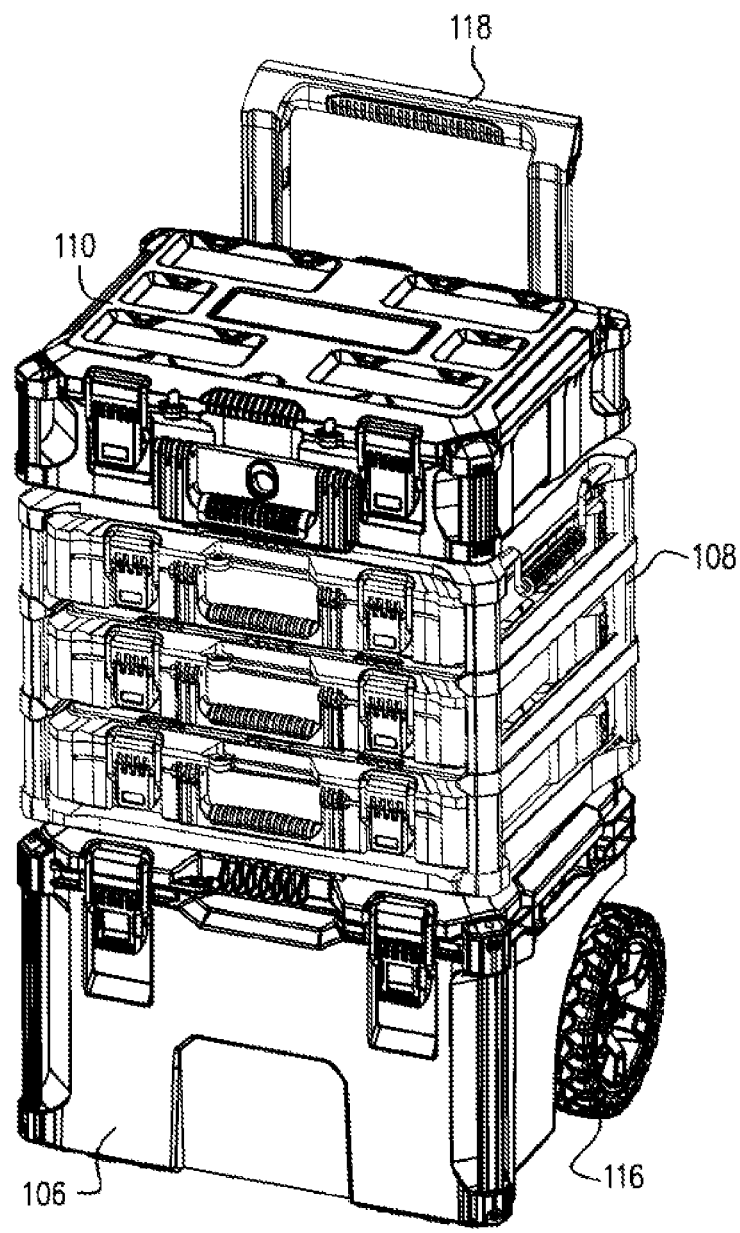

As can be appreciated from FIGS. 6B through 6D, various container assemblies are illustrated, the arrangement is such that in practice any module can constitute either a first container or a second container, as defined hereinabove (though it is more likely that base container 106 serves as a first container).

Figure 6E:
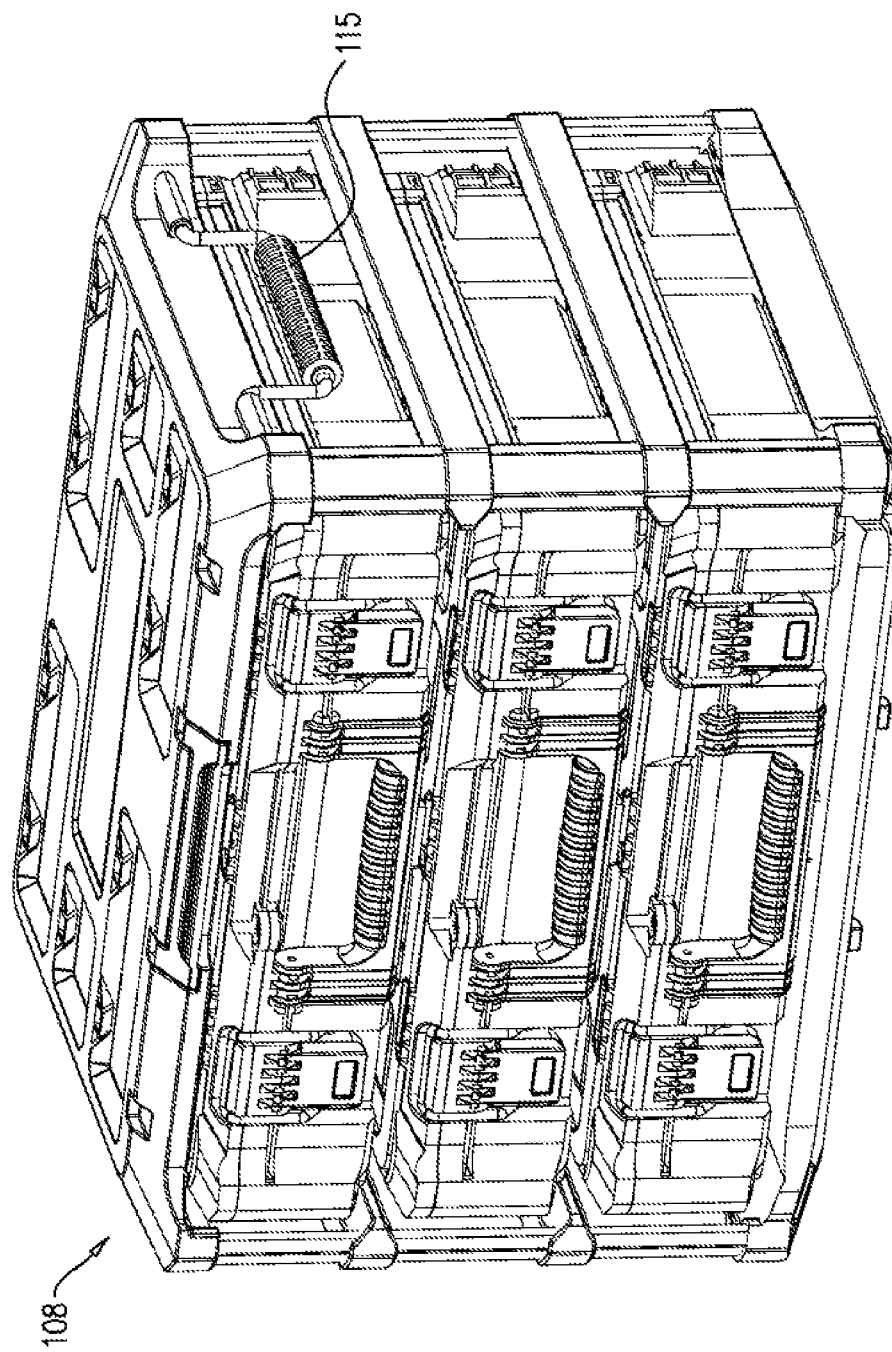
Figure 6F:
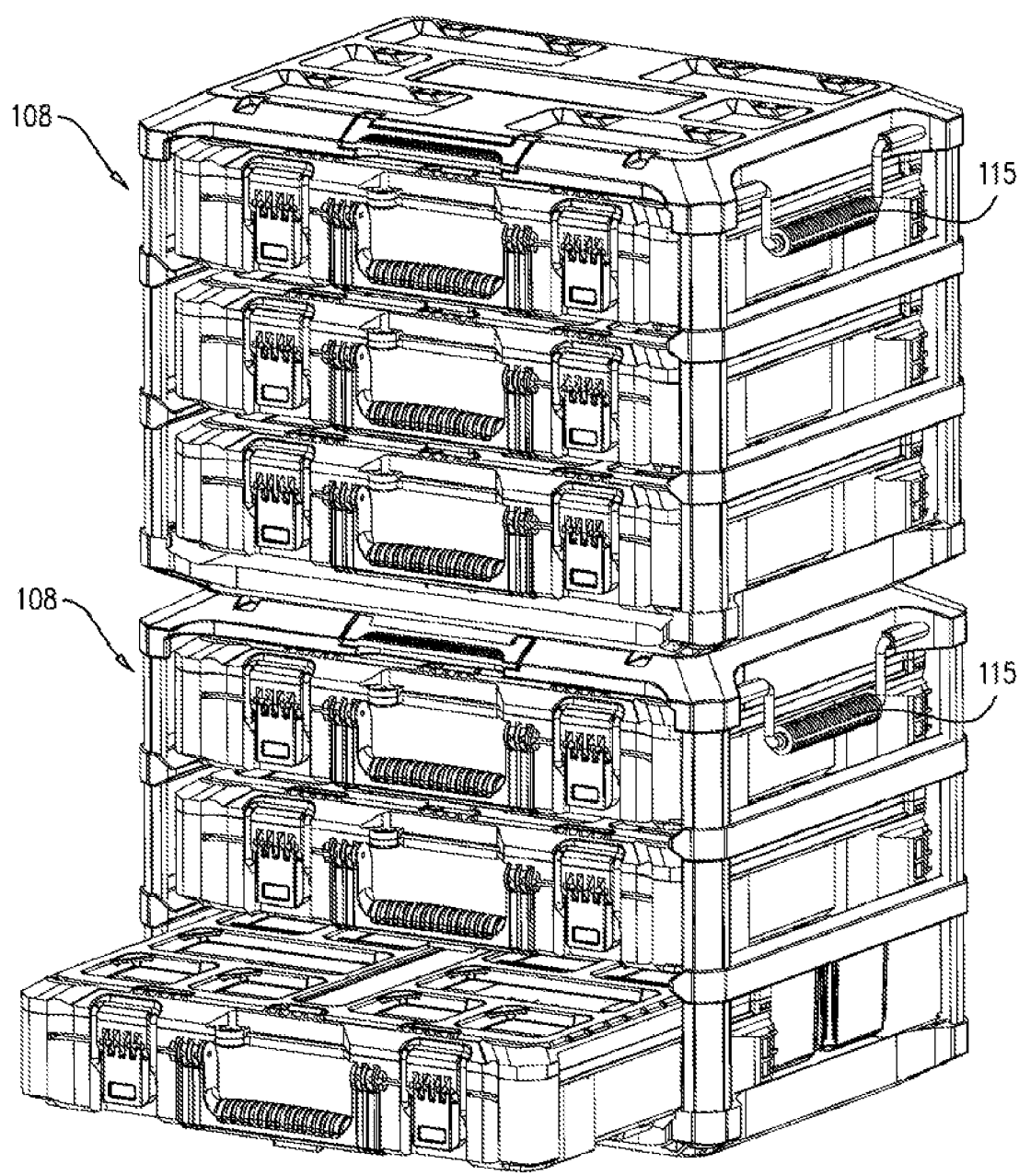

FIGS. 6E and 6F illustrate a chest of drawers module 108, illustrated separately in FIG. 6E and mounted over a similar drawer module 108 in FIG. 6F. It is appreciated that the drawers of each module can be locked at their closed position to prevent spontaneous opening thereof whilst carrying a module. Furthermore, each module 108 is configured with a pair of carrying handles 115 disposed at top side wall portions thereof, to facilitate carrying of the module.

In FIG. 6G there is illustrated a subassembly comprising a first container in the form of a tool caddy module 110 and second container in the form of a compartmented storage module 112 attached thereto, whilst the lid 119 of the first container is open facilitating access to the contents thereof.

Further attention is now directed to FIGS. 7A to 16B, showing a third aspect of the disclosure, namely a utility module being a mobile carrier unit and comprising at least one carrier engagement surface, compatible for interlocking engagement in a detachable manner with a first engagement surface of a second utility module. For sake of example only, the second utility module exemplified in the annexed drawings is in the form of a utility container. It is however appreciated that the utility modules can be of any type, shape or size, as discussed hereinabove and as will be exemplified below. Accordingly, the term container unit as used in the following description denotes any type of a utility module, as discussed herein the specification.

Figure 7A:
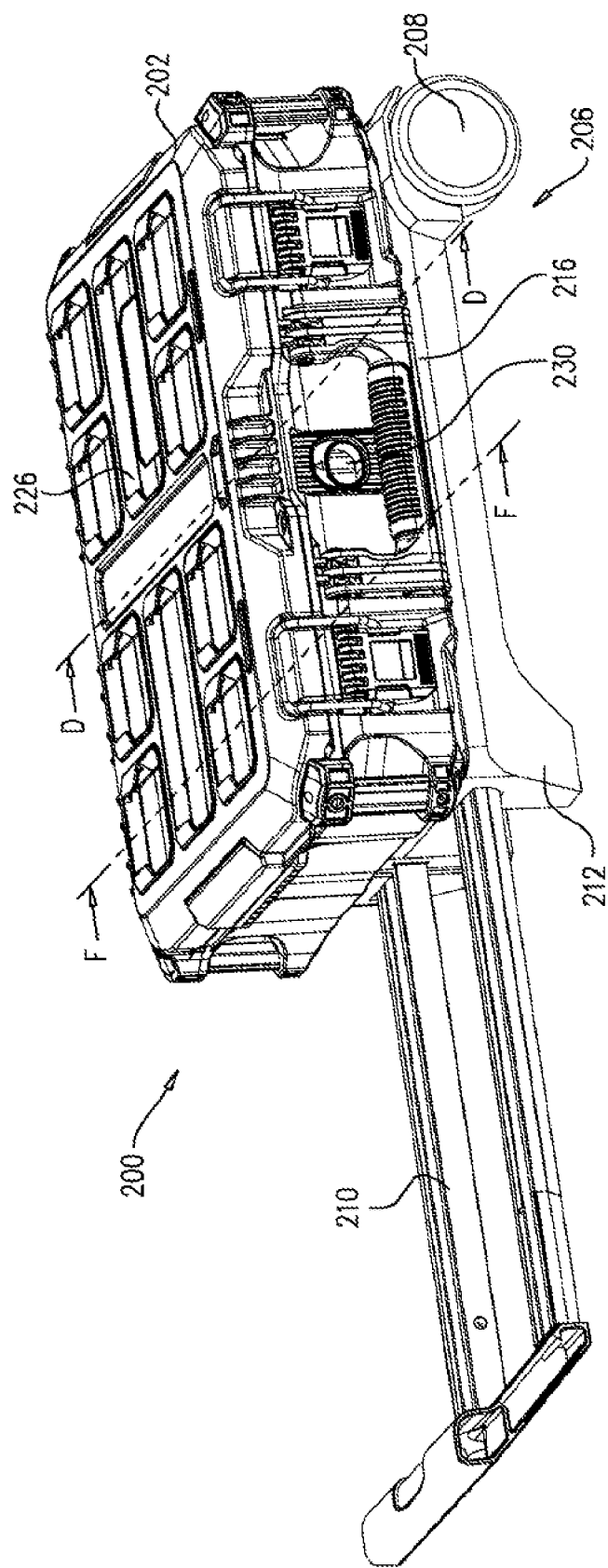

Attention is first directed to FIG. 7A, illustrating a container carrier assembly generally designated 200 comprising a container unit 202 (utility module) mounted on top of a carrier unit 206. The carrier unit 206 is equipped with a telescopic manipulating handle 210, a pair of rear wheels 208 and a set of horizontally stabilizing support legs 212 at a front portion of the carrier unit 206. The carrier unit 206 and the container unit 202 are engaged in an interlocking engagement via their engagement surfaces, i.e. a carrier engagement surface 216 at a top face of the a carrier unit 206 (best seen in FIG. 8A), and the container unit's first engagement surface 220 (namely its bottom face; best seen in FIGS. 8B and 8C). The container unit 202 is configured with yet a second engagement surface 226 (namely the container's top face), simulating the carrier engagement surface 216. The container unit 202 further comprises a locking mechanism 230 configured for arresting within a respective notch 231 at the carrier engagement surface 216, to thereby to prevent displacement and separation of the engagement surfaces 216 and 220 once they are interlocked, as later will be explained.

The carrier engagement surface 216 seen in greater detail in FIG. 8A, illustrates a top perspective view of a carrier unit 206 with the telescopic handle 210 in a retracted position. The carrier engagement surface 216 comprises multiple carrier engaging elements 236, depressed from the surface, and designated for interlockingly receiving respective container unit's first engaging elements 240, projecting from the first engagement surface (bottom face) 220 of the container unit 202.

Each carrier engaging element 236, is a so-called female coupler and has a depressed locking location configured with at least one locking rib extending above a depressed surface and along a sliding path and having an open edge facing in a first sense. As seen in the drawings, it is generally constituted by a receiving recessed depression 244 in the carrier engagement surface 216, configured with a pair of facing locking ribs 248, forming the aforementioned recess. The locking ribs 248 extend substantially parallel to sliding path of the container unit 202 with respect to the carrier unit 206, said path (designated Pin FIGS. 7A and 10B). Further noted, side walls 250 of depressions 244 are sloped in order to allow directing of a container unit's first engaging element 240, mounted upon it, to its interlocking position.

A corresponding coupler configured at the container unit is a so-called male coupler comprising a projecting locking location disposed in register with said depressed locking location and configured with at least one locking tongue extending along said engaging sliding path at a second sense, opposite to said first sense, and configured for arresting engagement at a space between said locking rib and depressed surface. As seen, a single container unit's engaging element 240 is generally constituted a downwardly projecting outwards protrusion 258, projecting from the bottom face 220 of the container 202.

Figure 9A:
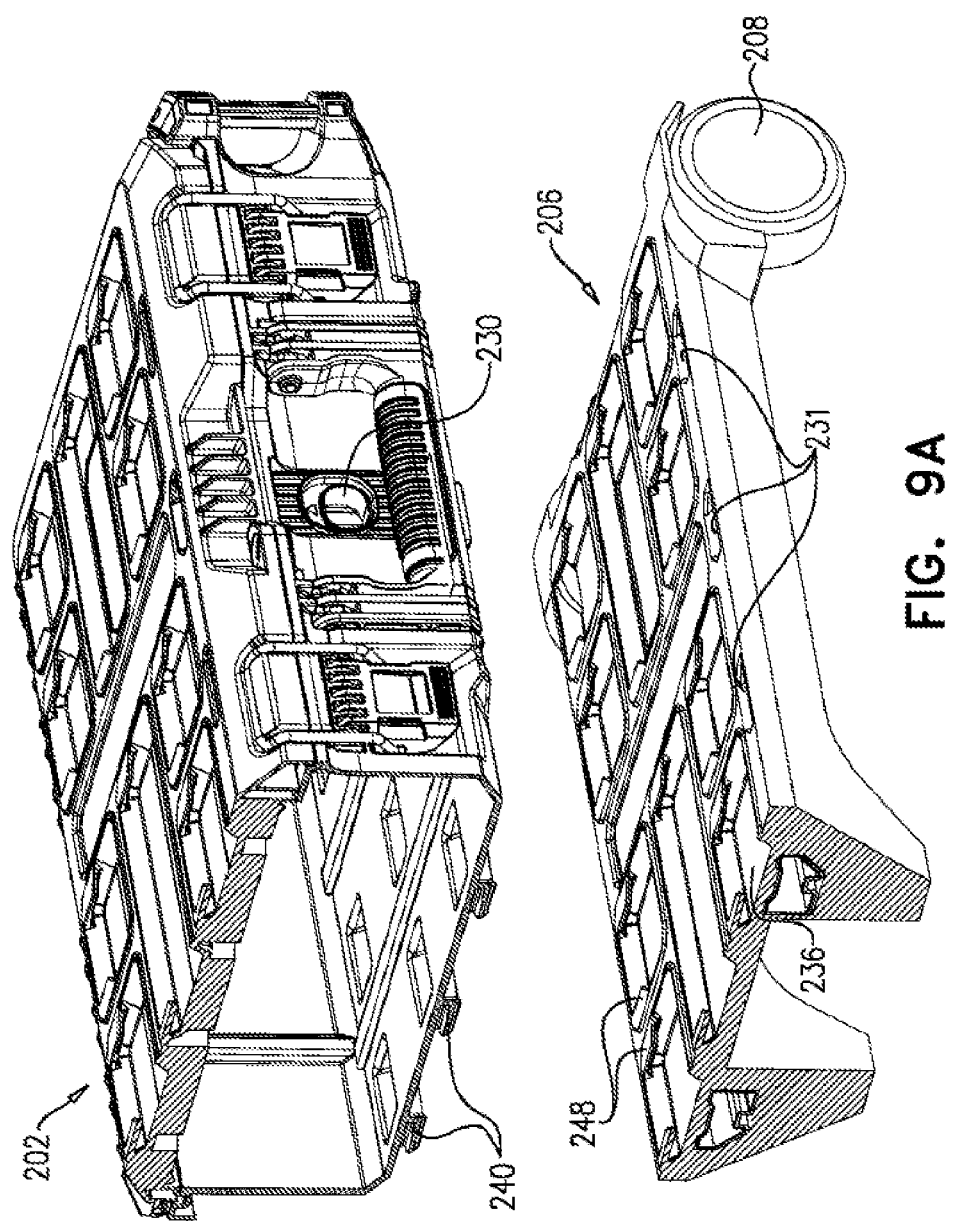
FIG. 9A is a side section along line F-F in FIG. 7A, illustrating the container unit and the carrier unit unattached.
Figure 9B:
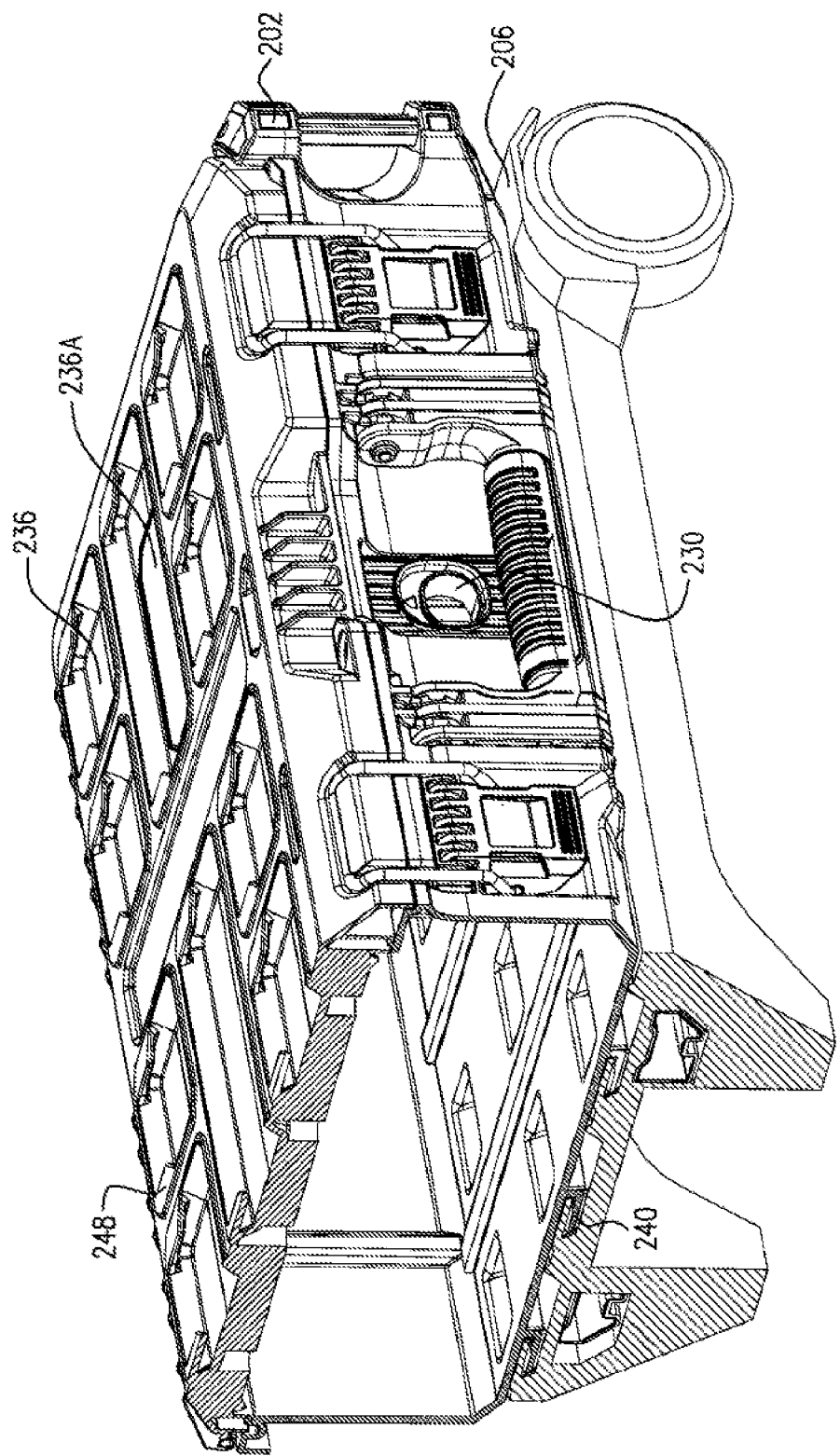
FIG. 9B is a side section along line F-F in FIG. 7A illustrating the container unit and the carrier unit attached.
Figure 9D:
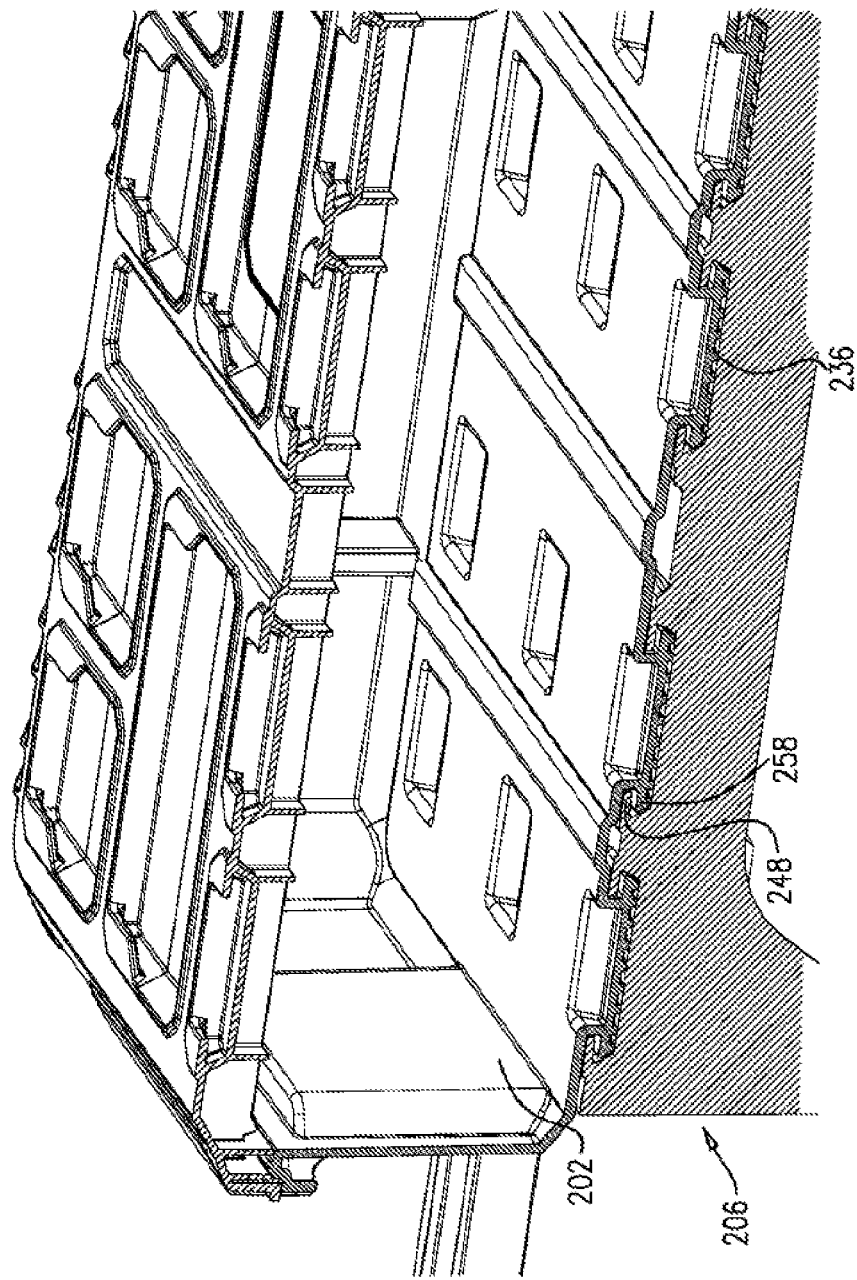
FIG. 9D is a sectioned view along line F-F in FIG. 7A illustrating the interlocking engagement of the carrier engaging elements together with the container unit's first engaging elements.

In order to lock the container 202 over the carrier unit 206, upon placing the container 202 over the carrier engagement surface 216 of carrier unit 206 one must mount the container unit's first engaging elements 240 into the depressions 244 and then slide the container 202 along the sliding path P (i.e. towards the locking ribs 248) so that the engaging elements 240 engage below said projecting ribs/shoulders 248 and the engaging elements 240 are thus arrested at a space between said locking ribs and the depressed surface, as seen in FIG. 9C. Interlocking engagement of the container (or any other utility module) can be facilitated by a single male-female locking mechanism of the aforementioned type, or by a plurality of such locking mechanism, at any location over the carrier unit 206.

The shape and size of the locking members is modular as far as the depression 244 in the carrier engagement surface 216, can be single or double in size (e.g. 236 and 236A in FIG. 8A, respectively), so it is large enough to accommodate two container unit's first engaging elements 240, or two neighboring container unit's first engaging elements.

Locking/engaging and detaching of this configuration is similar to a single locking module.

The engagement and locking mechanism is modular in the sense that any first article can be easily and readily articulated to a surface of any second article, wherein the articulation is strong and firm (i.e. substantially motionless).

Figure 7B:
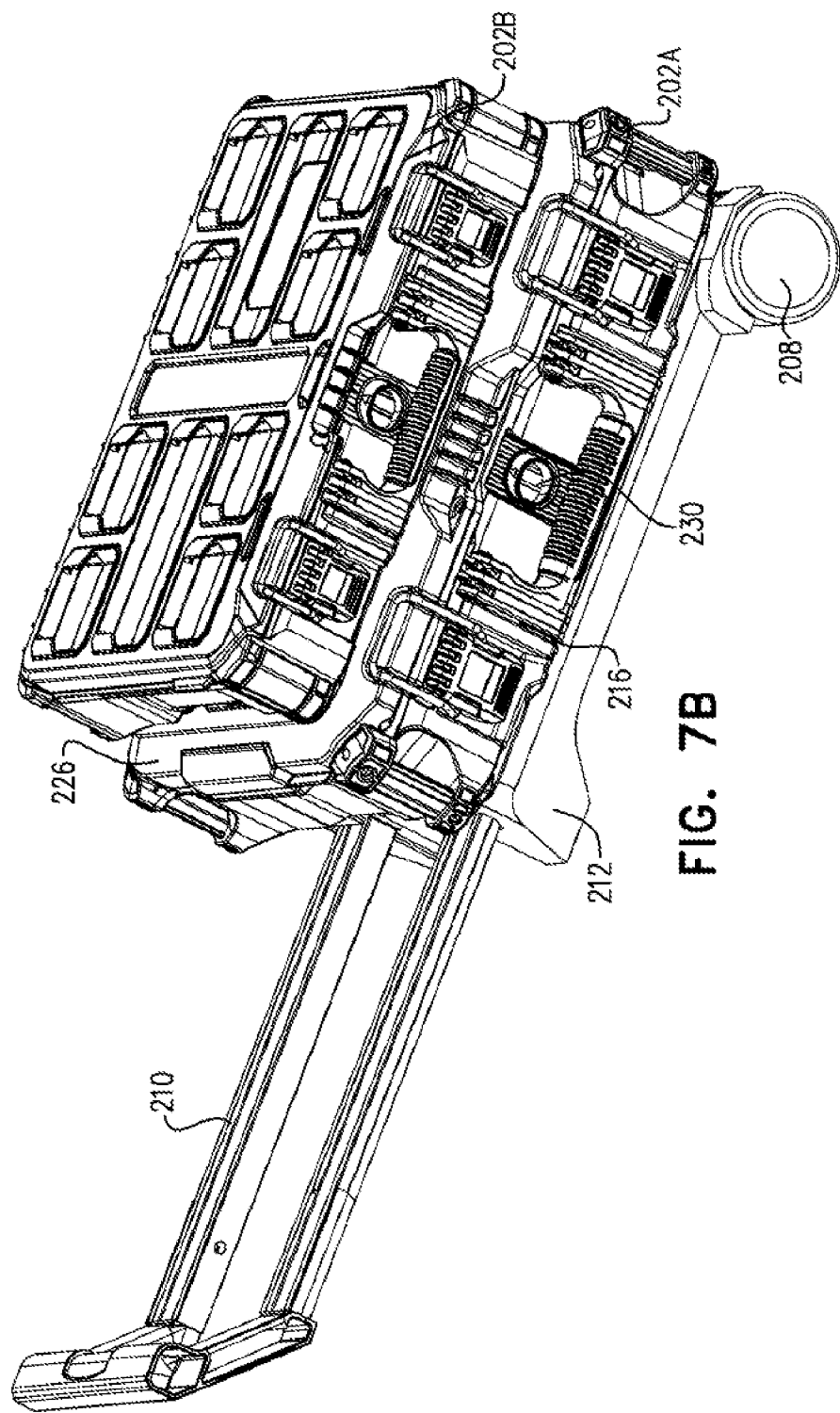
FIG. 7B is a top, left perspective view of a second container unit, mounted on top of a first container unit, which in turn is mounted on top of a carrier unit according to an example of the present disclosure.
Figure 8B:
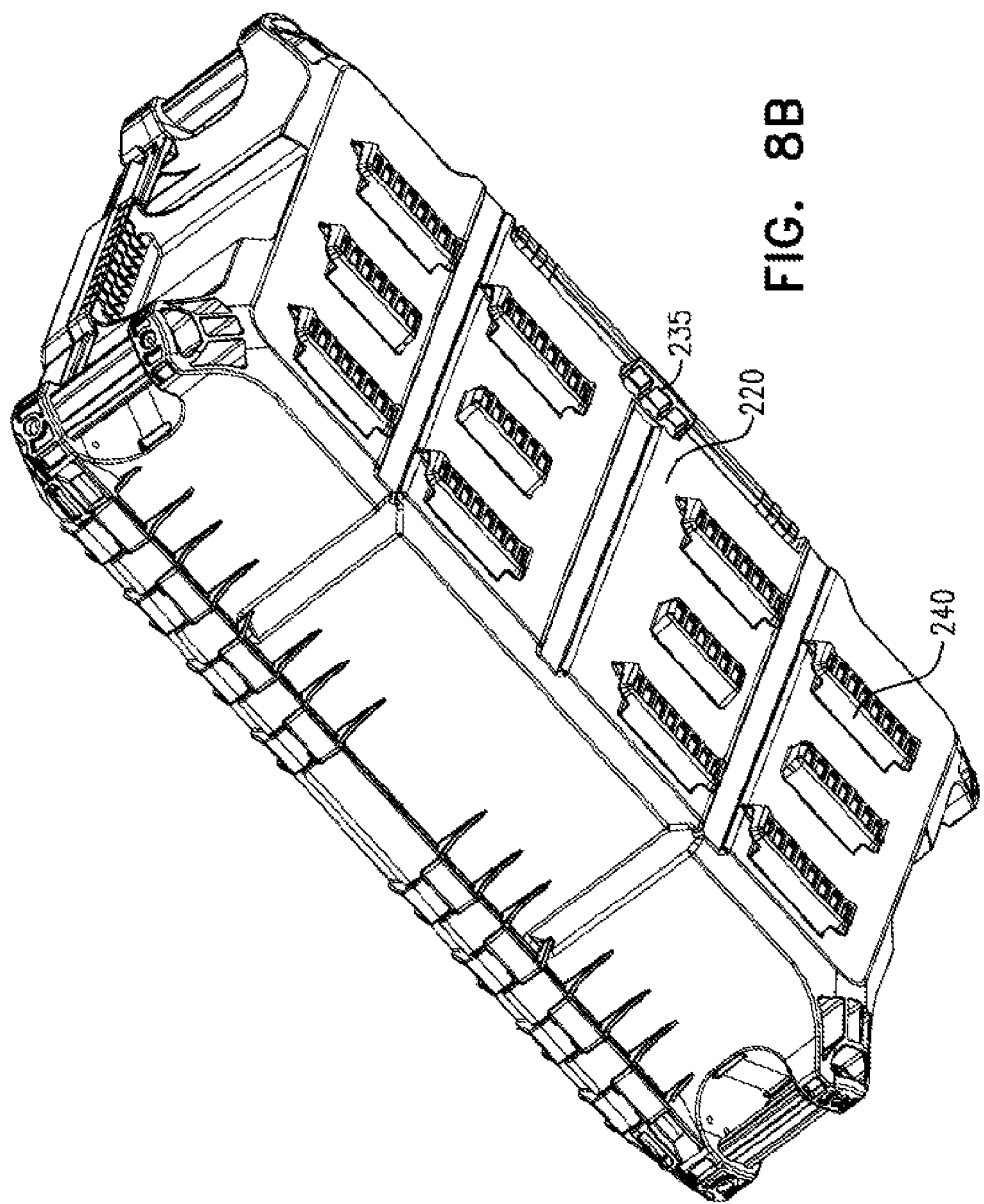
FIGS. 8B and 8C are a top and a bottom perspective view of a carrier unit, illustrating the container unit's first engagement surface in further detail.
Figure 8C:
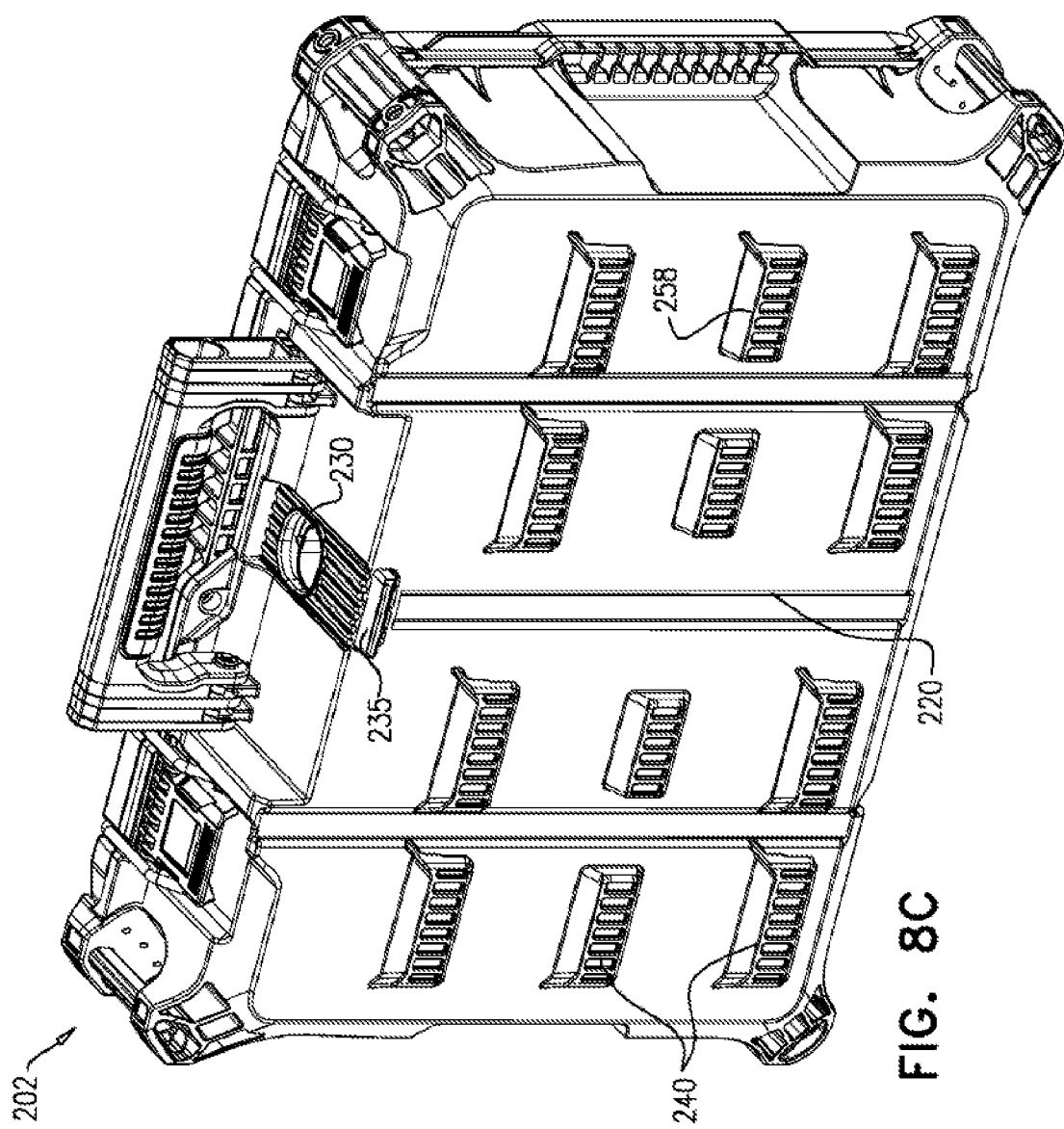

With further reference to FIG. 7B, there are illustrated two containers 202A and 202B articulated over one another, the arrangement being such that the bottom face of the intermediate container 202A serves for engaging with the top face of the carrier unit 206 and likewise, the top face of the intermediate container 202A serves for engaging with the bottom face of the top container 202B, as discussed herein above. The arrangement is such that each stage is lockingly secured by the locking mechanism 230, wherein each stage can be detached from the stage below upon releasing locking engagement of the respective locking mechanism 230.

Figure 10A:
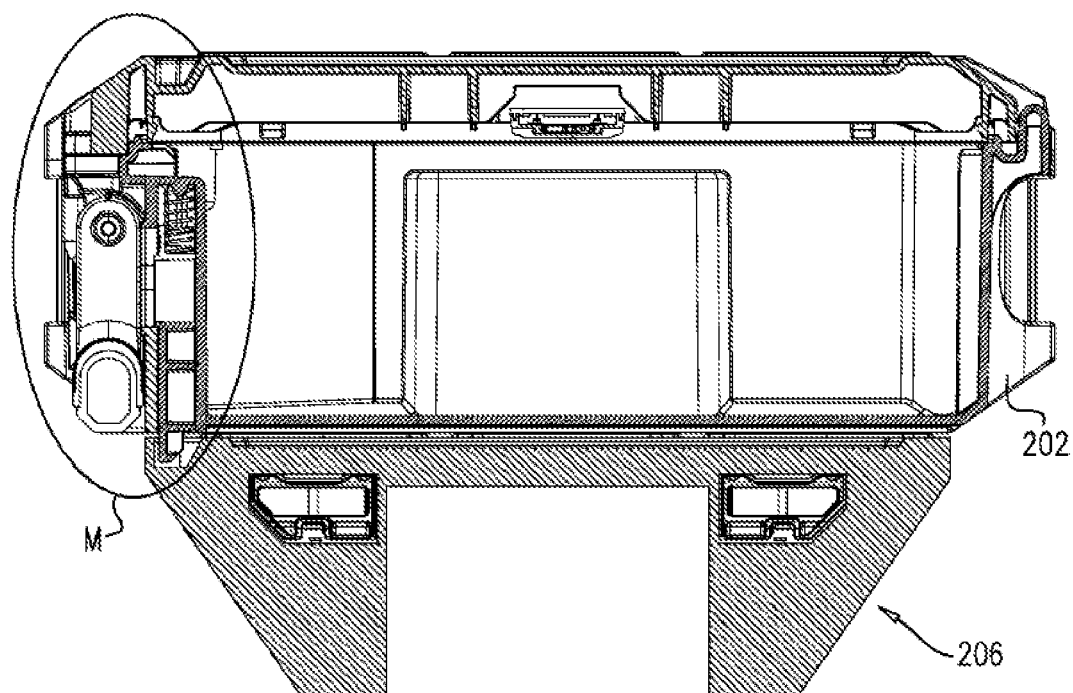
FIG. 10A is a sectioned view along line D-D in FIG. 7A, illustrating the locking mechanism.
Figure 10B:
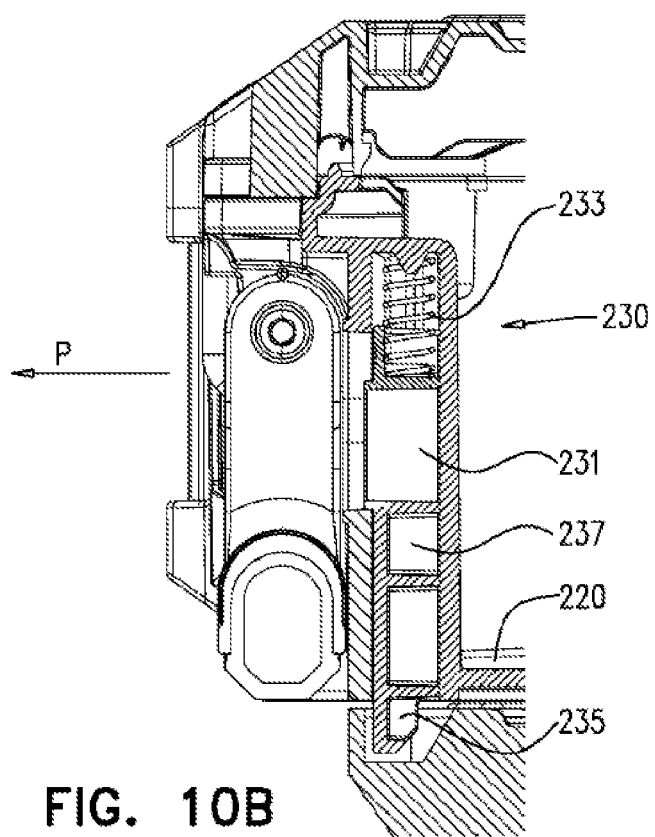
FIG. 10B is an enlarged image of the portion marked M in FIG. 10A.
Figure 11A:
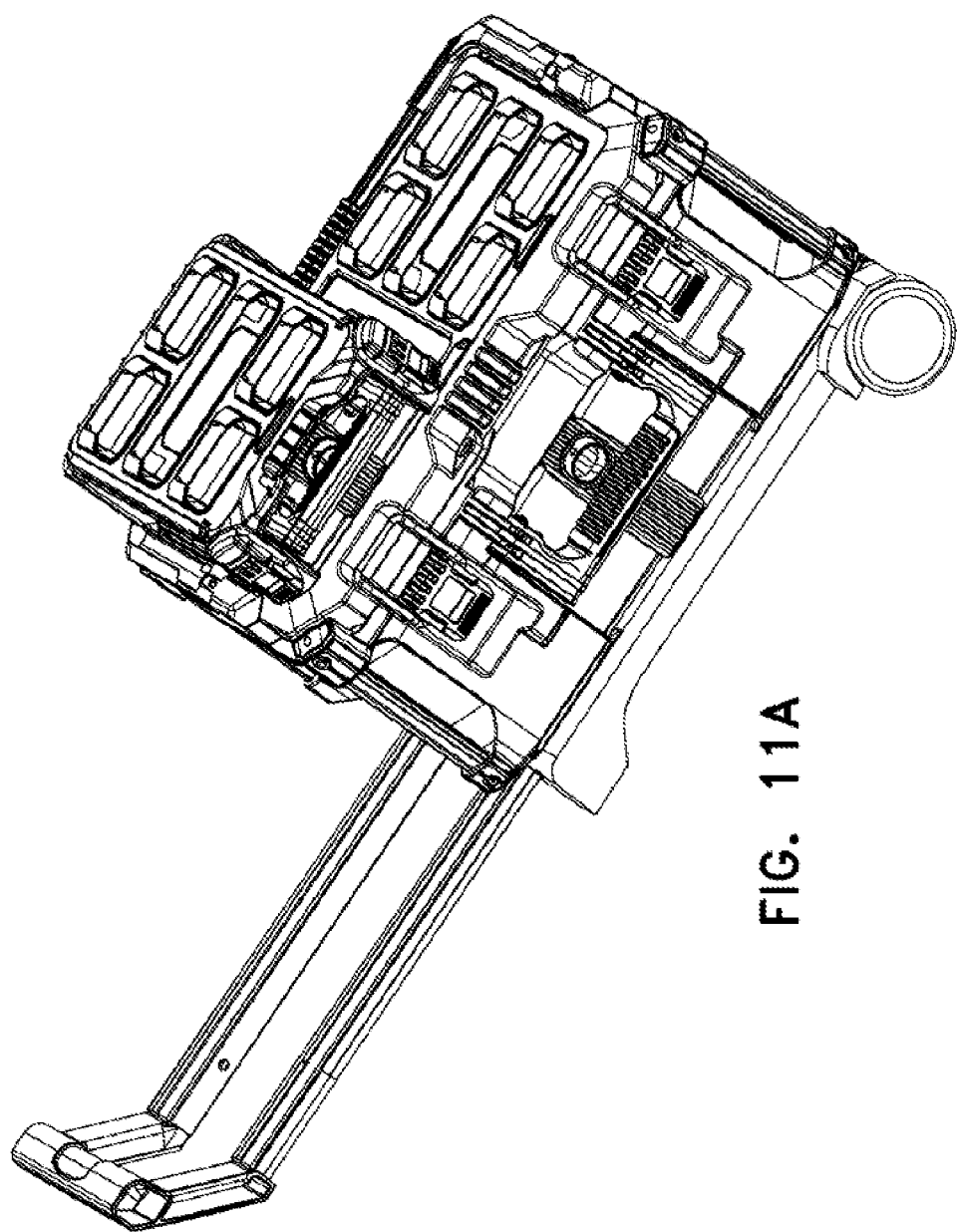
FIG. 11A illustrates different sizes of container units forming an assembly, at a tilted orientation.
Figure 11B:
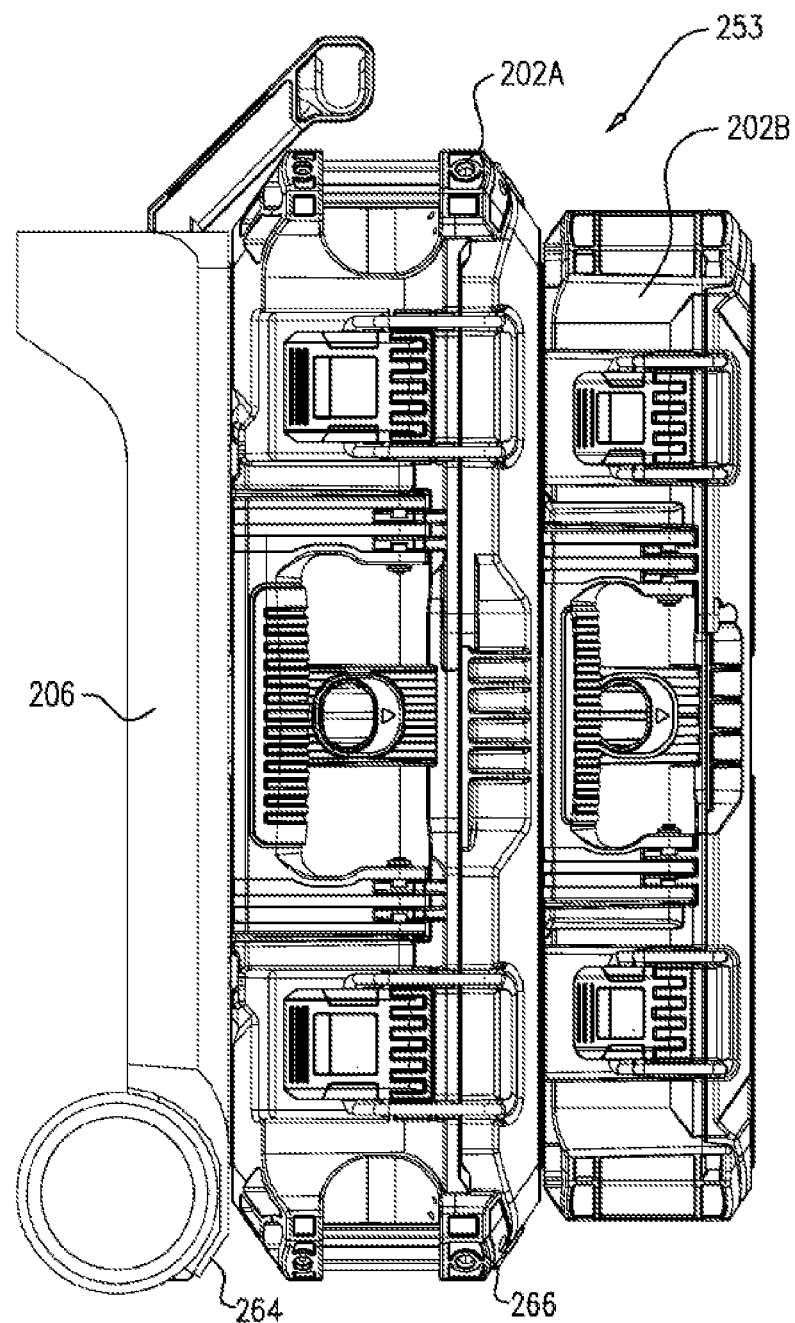
FIG. 11B illustrates an assembled configuration balanced vertically relatively to the ground.

The locking mechanism 230 is shown in further detail in FIGS. 10A and 10B. The locking mechanism comprises a locking pin 231 normally biased by spring 233 such that a tip 235 projects from a bottom surface of the container 202 (see also FIG. 8B) and is configured for snap arresting within a respective notch 231 configured at the engagement surface 216 of the carrier unit 206 (seen also in FIG. 8A). The locking pin 231 is slidable within a race at the side wall of the container, and comprises a finger manipulating portion at 237 (accessible through an opening at the side wall of the container), for displacing the locking pin, against the biasing effect of spring 233, into its disengaged position, thus facilitating sliding the container along the path P into disengagement from the carrier unit (or respective other container or utility module). The carrier unit 206 is further configured at a bottom end, with a pair of stability supports 264 (FIGS. 8A, 11B), configured for supporting the carrier unit, with or without a container attached thereto, at an upright, i.e. vertical position, thus preventing it from tipping over, in particular with containers or any other utility module articulated thereto. Stability supports 264 can be, according to a particular configuration, an extension of the telescopic handle 210, whereby the stability supports are functional as such only when the handle is fully contracted. However, in the illustration of FIGS. 16A-16B the utility assembly 253 is maintained at its upright position owing to said stability supports 264 and further bearing over a side face 266 of the intermediate container 202A, being substantially flush with a bottom face of the stability supports 264.

Figure 12A:
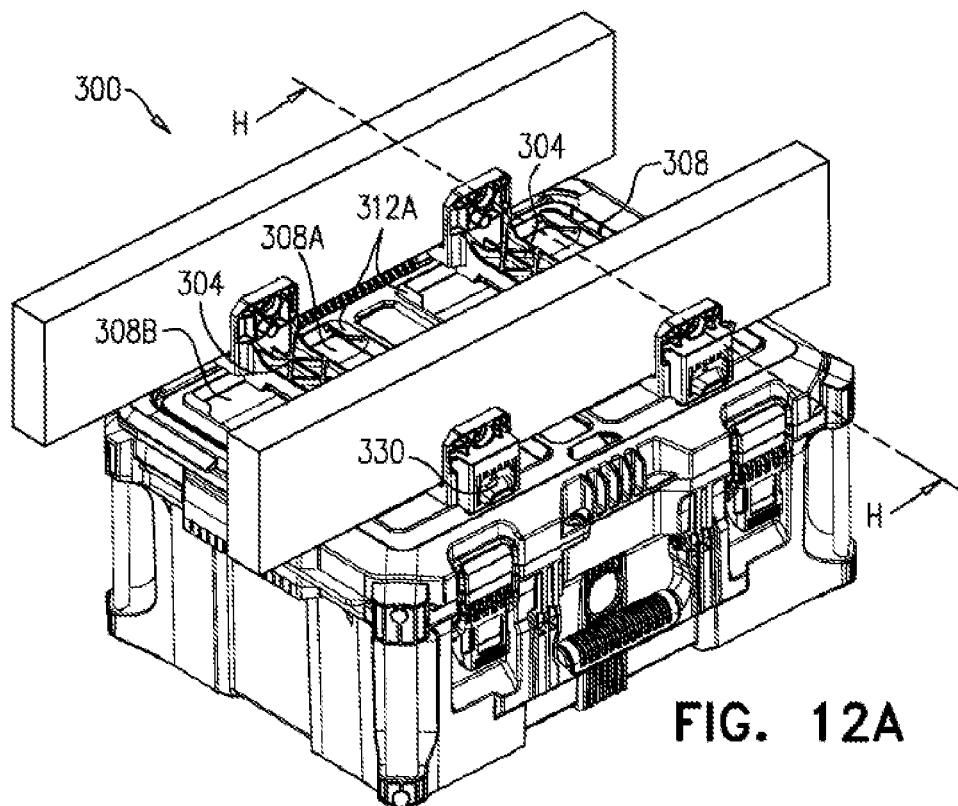
FIG. 12A shows a container assembly wherein the female coupler comprises two locking ribs extending at respective side edges of two neighboring depressed locking locations.
Figure 12B:
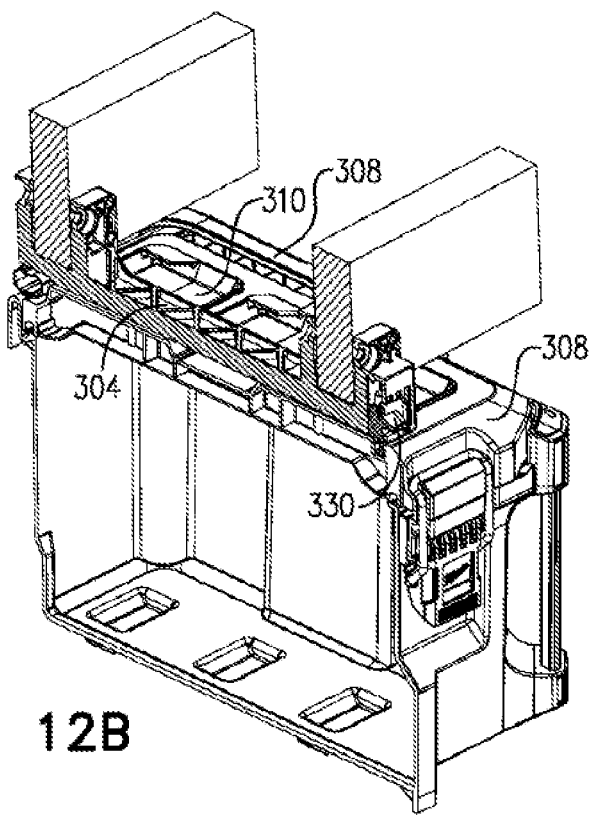
FIG. 12B is a section along line H-H in FIG. 12A.
Figure 12C:
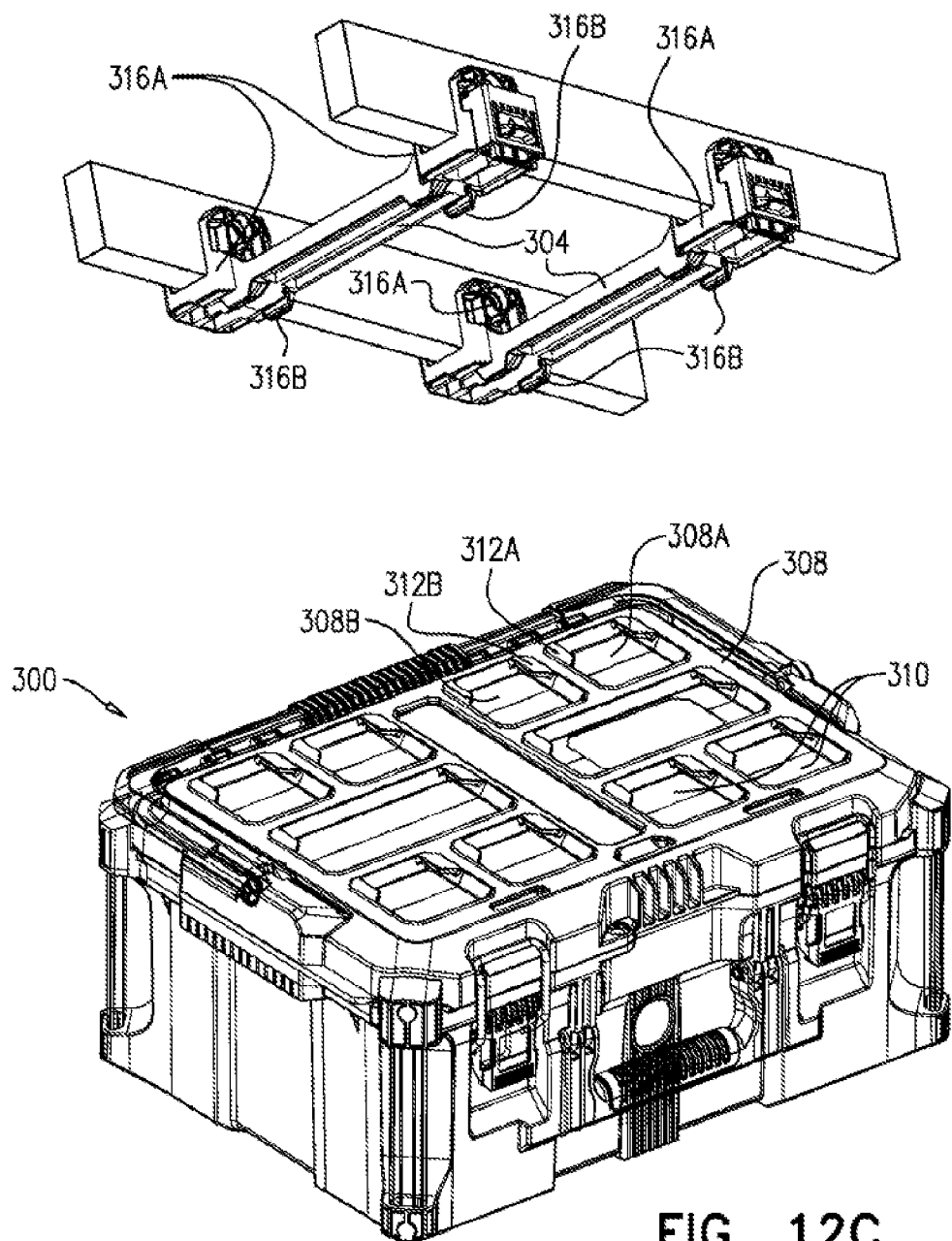

With further reference to FIGS. 12A to 12C there is illustrated a modification of articulation between a first utility module (container 300 in the particular example) and a second utility module (two work-piece supports 304 in the particular example). The container 300 is substantially similar to that illustrated in the previous examples, wherein the cover/lid 308 is configured with a plurality of female coupler members 310, each configured with a depressed locking location and a pair of locking ribs extending above the depressed surface and along a sliding path. The opposing locking ribs 312A and 312B have an open edge facing in a first sense (the introducing direction).

In the examples hereinbefore, engagement with a corresponding male coupler took place within the vicinity of a single coupling element, i.e. over two engaging ribs 312A and 312B of a single depressed locking location facing each other. However, in the example of FIGS. 12A-12C engagement of the work-piece supports 304 takes place over two engaging ribs 312A and 312B of two neighboring depressed locking locations 308A and 308B. Accordingly, the male coupler of the two work-piece supports 304 is configured for arresting with the two engaging ribs 312A and 312B by two individual (separate) male couplers 316A and 316B, each configured for arresting one of the respective engaging ribs 312A and 312B. Arresting of the male projections 316 takes place as discussed before, by arresting below the respective engaging ribs, within the space at the depressed locking location. In spite of the relative narrow body structure of the work-piece supports 304, they are each configured with a locking mechanism 330, similar to locking mechanism 230 discussed hereinbefore.

Turning now to FIGS. 13A-13D, 14A-14C, 15A-15B, 16A-16B, 17, 18A-18C, and 19-24, there are illustrated various examples of utility modules, utility assemblies and various configurations according to the disclosure.

Figure 13B:
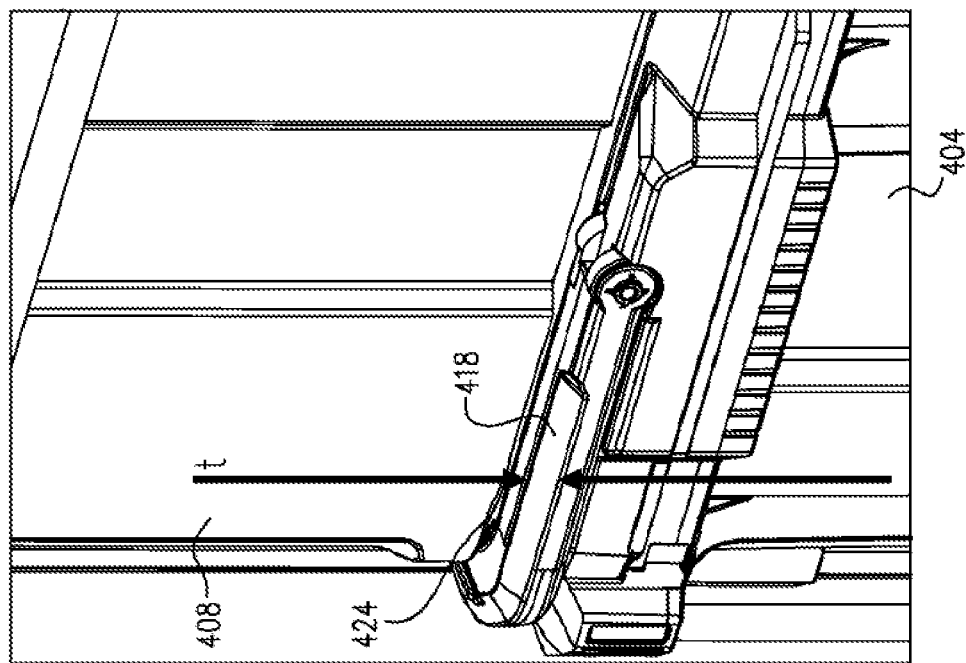
Figure 13A:
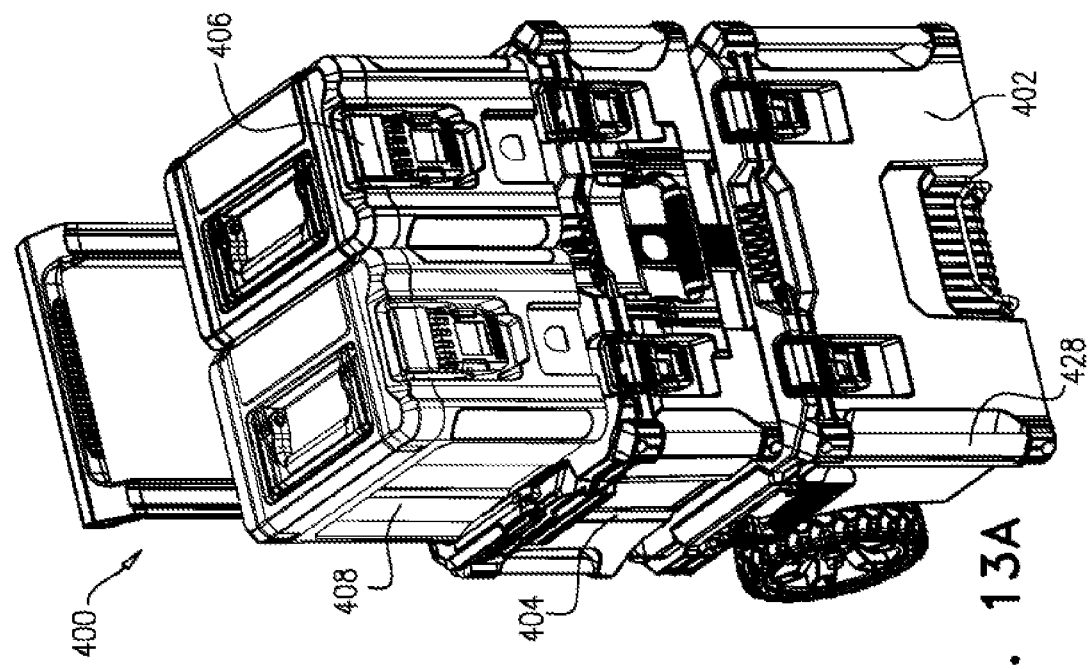

FIG. 13A illustrates a utility module assembly generally designated 400, comprising a wheeled base container 402 supporting an intermediate container 404, bearing in turn a cooler box 406 and a power unit 408 disposed side by side over the intermediate container. At least the intermediate container 404 is configured at a bottom face thereof with a male-type coupling arrangement, for attachment over the cover of the base container, said cover configured with a respective female coupling arrangement. The cover of the intermediate container 404 is configured with a similar female coupling arrangement, and can thus engage with one the utility modules 406 and 408, each configured at its bottom face with a respective male-type coupling arrangement.

Figure 13D:
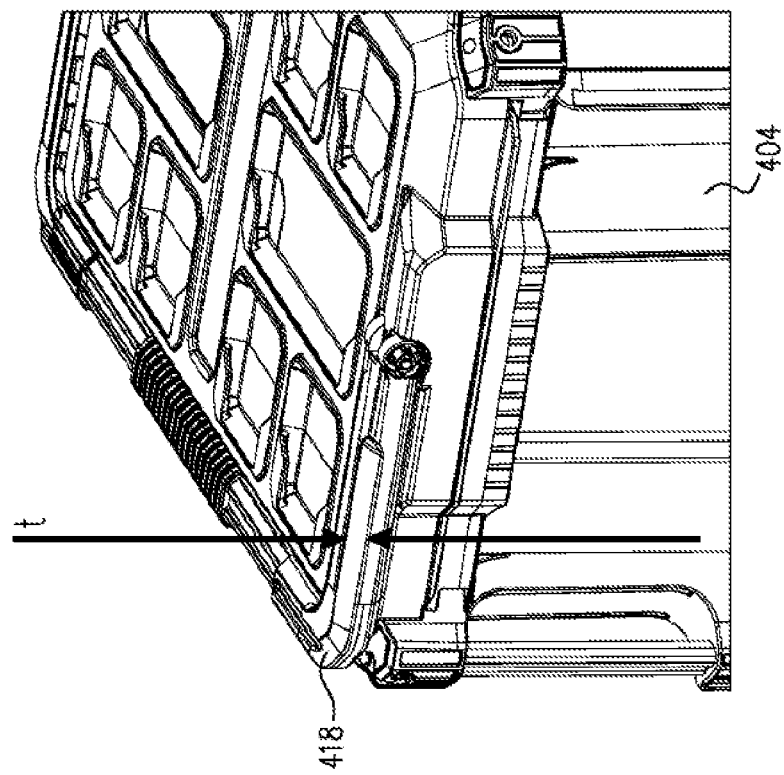
Figure 13C:
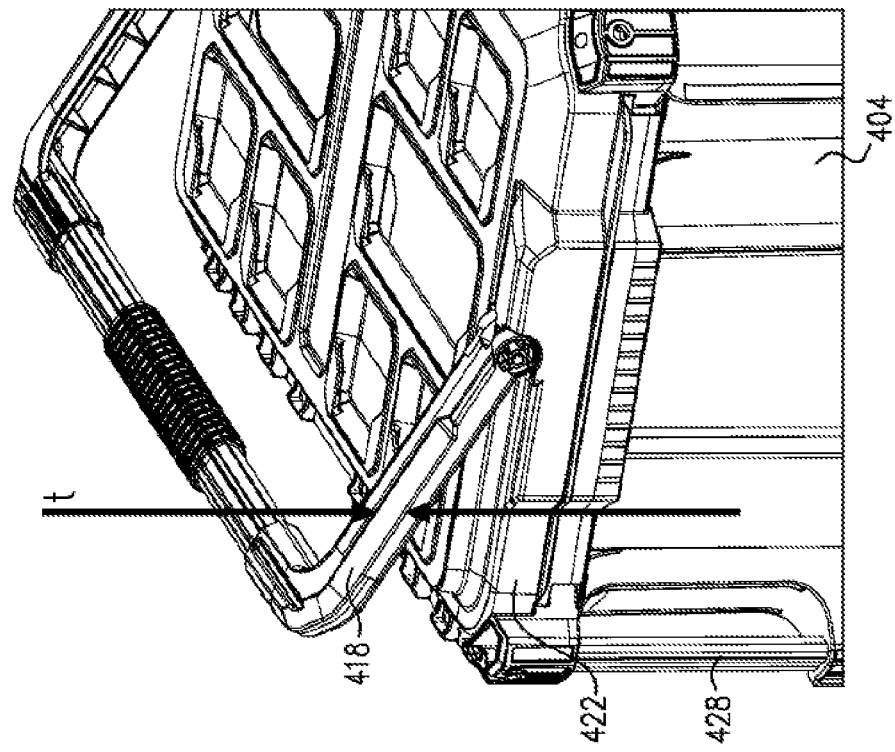

It is seen in FIGS. 13B through 13D that the intermediate container 404 is fitted with a pivotal carrying handle 418 articulated at the top side walls thereof. The carrying handle has a thickness t and the arrangement is such that at the stowed/folded position (FIGS. 13B, 13D) the handle 418 is received within a peripheral groove 422 extending over a top edge of the intermediate container 404 and a peripheral groove 424 extending at a bottom edge of the utility modules 408 and 406 (cooler box 406 and a power unit 408), such that the handle 418 does not constitute an obstacle in mounting and interlocking a utility module over another utility module. It is also seen that at least some of the utility modules are configured with side handles 428 serving both as carrying handles and as bumpers.

Figure 14B:
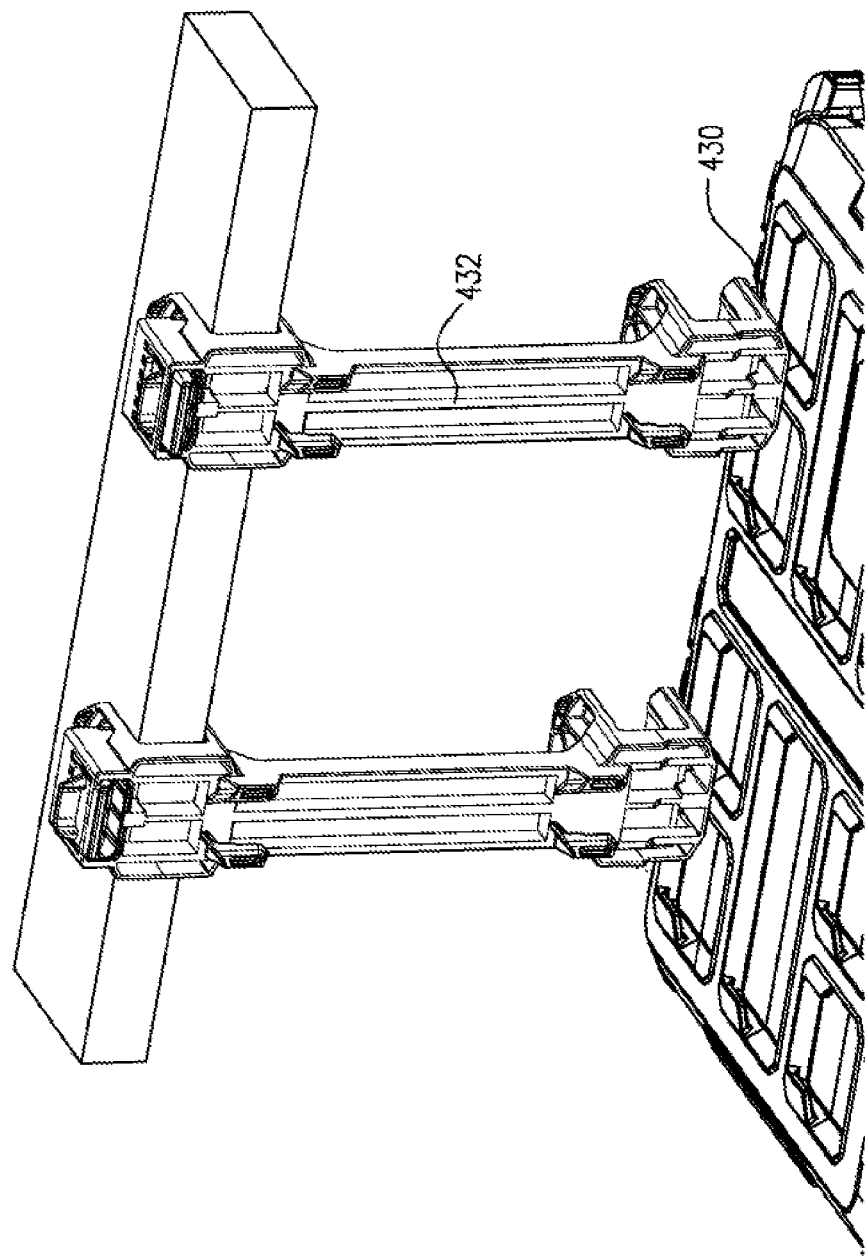
Figure 14C:
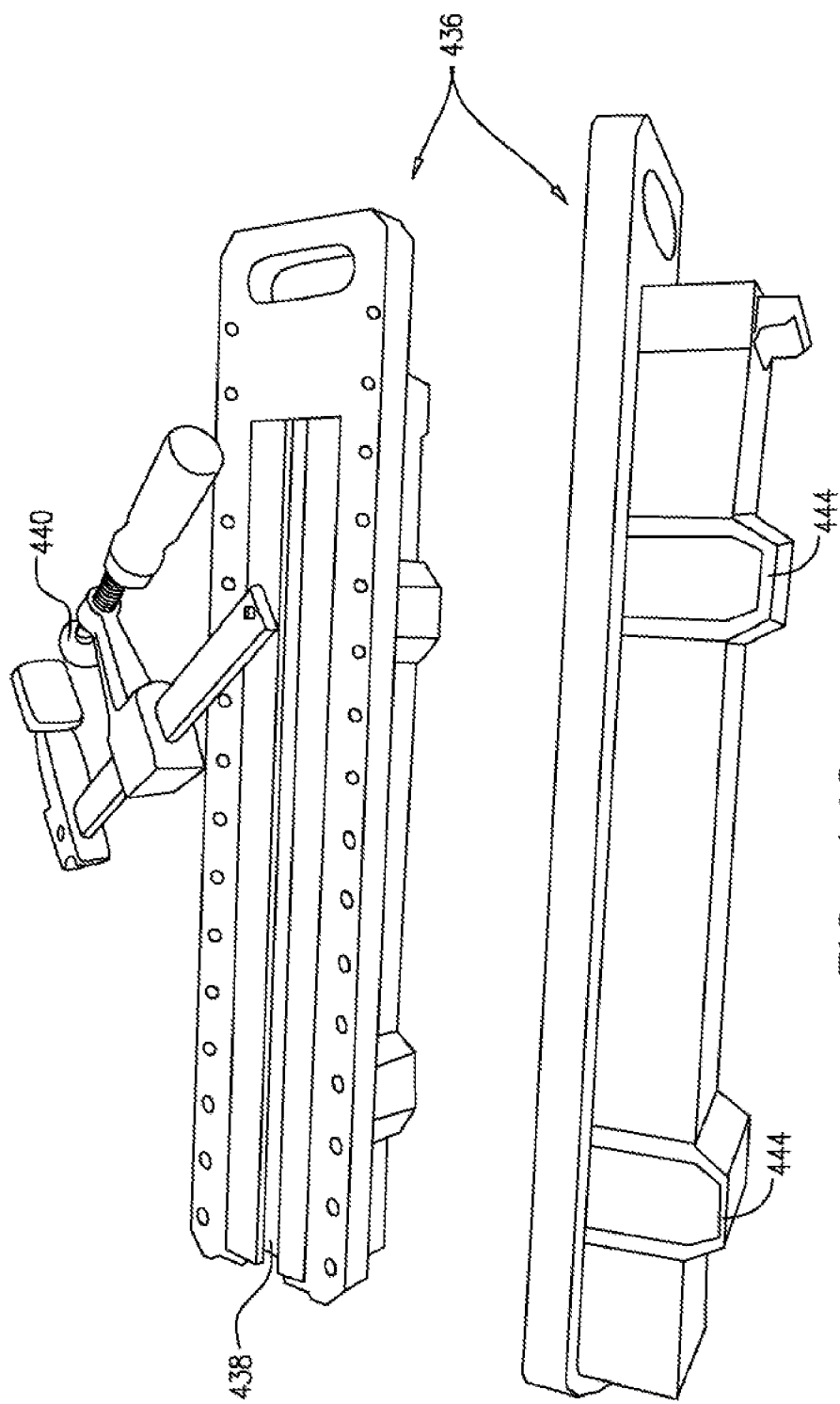

FIGS. 14A to 14C illustrate a first utility module in the form of a container 430 supporting two detachable work-piece-piece supports 432 (attached as discussed herein before with reference to FIGS. 12A-12C). FIG. 14C illustrates a utility module in the form of a work surface 436 configured with a vice race 438, so that a vice 440, or other workshop tools can be used. The workpiece-piece supports 432 are configured with a male type coupling having projecting locking locations 444 for engaging with respective female couplers.

Figure 15A:
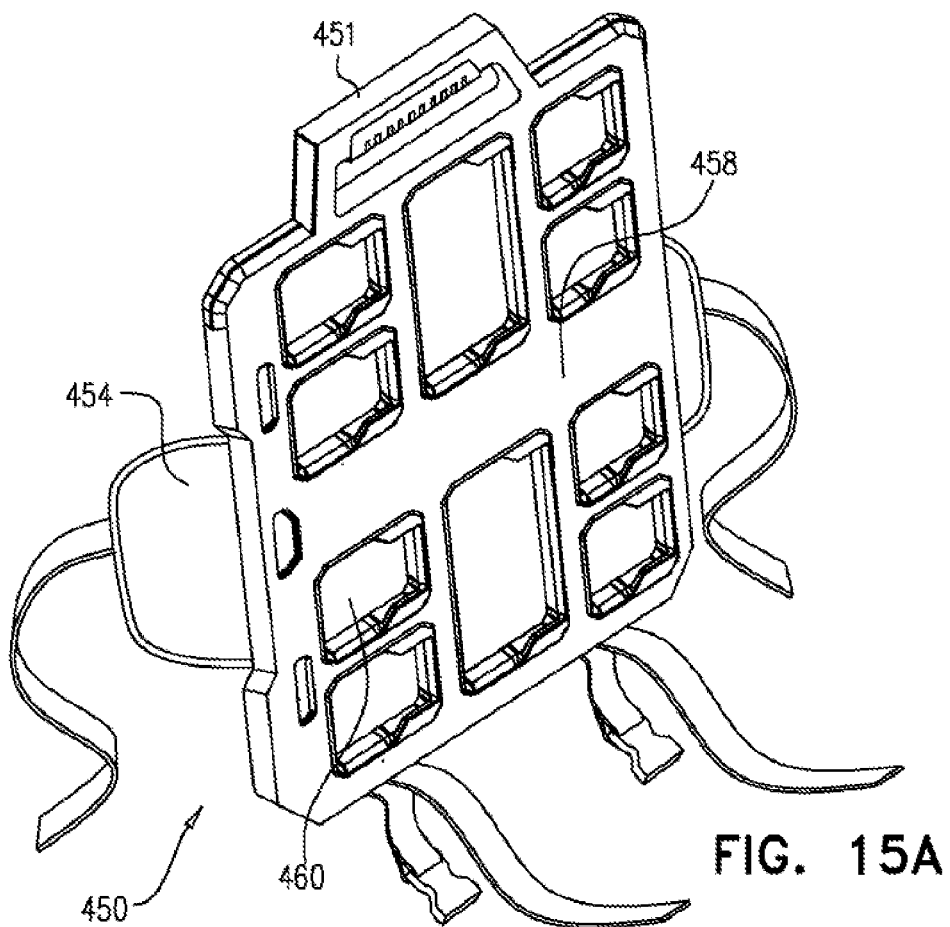
Figure 15B:
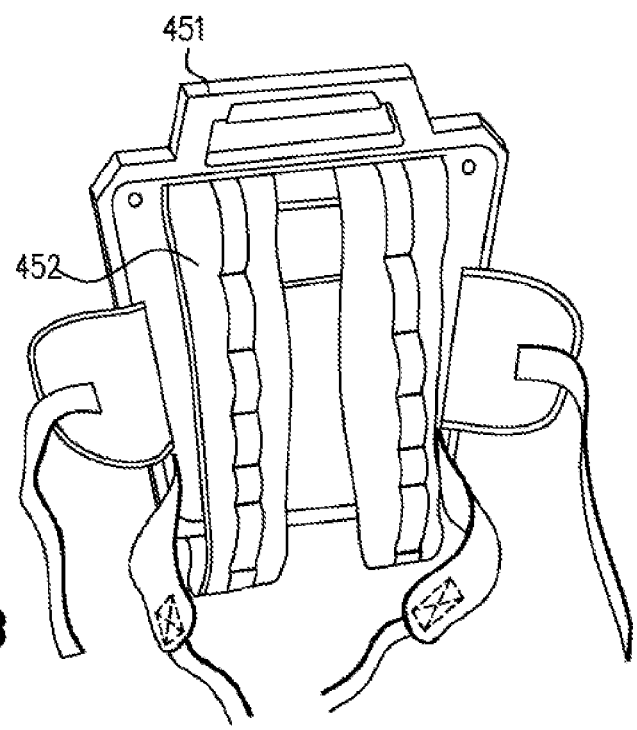

In FIGS. 15A and 15B there is illustrated a back-rack 450 being a substantially rigid platform having a carrying handle 451 and configured at one side thereof with a pair of adjustable shoulder harnesses 452, and an adjustable waist harness 454. The other side of the back-rack is configured as a universal utility mounting platform 458, configured with a plurality of attachment locations 460. In the illustrated example all attachment locations 460 are so-called female attachments (as discussed hereinabove in detail), however it is appreciated that the attachment locations can just as well be male-type attachments, or a combination of male and female attachments. According to yet an example (not shown), one side of the carrying platform can be configured with male-type attachments, and an opposite side of the platform be configured with female-type attachments, wherein a used has the choice of attaching the platform to the harness system at an orientation of choice.

Figure 16A:
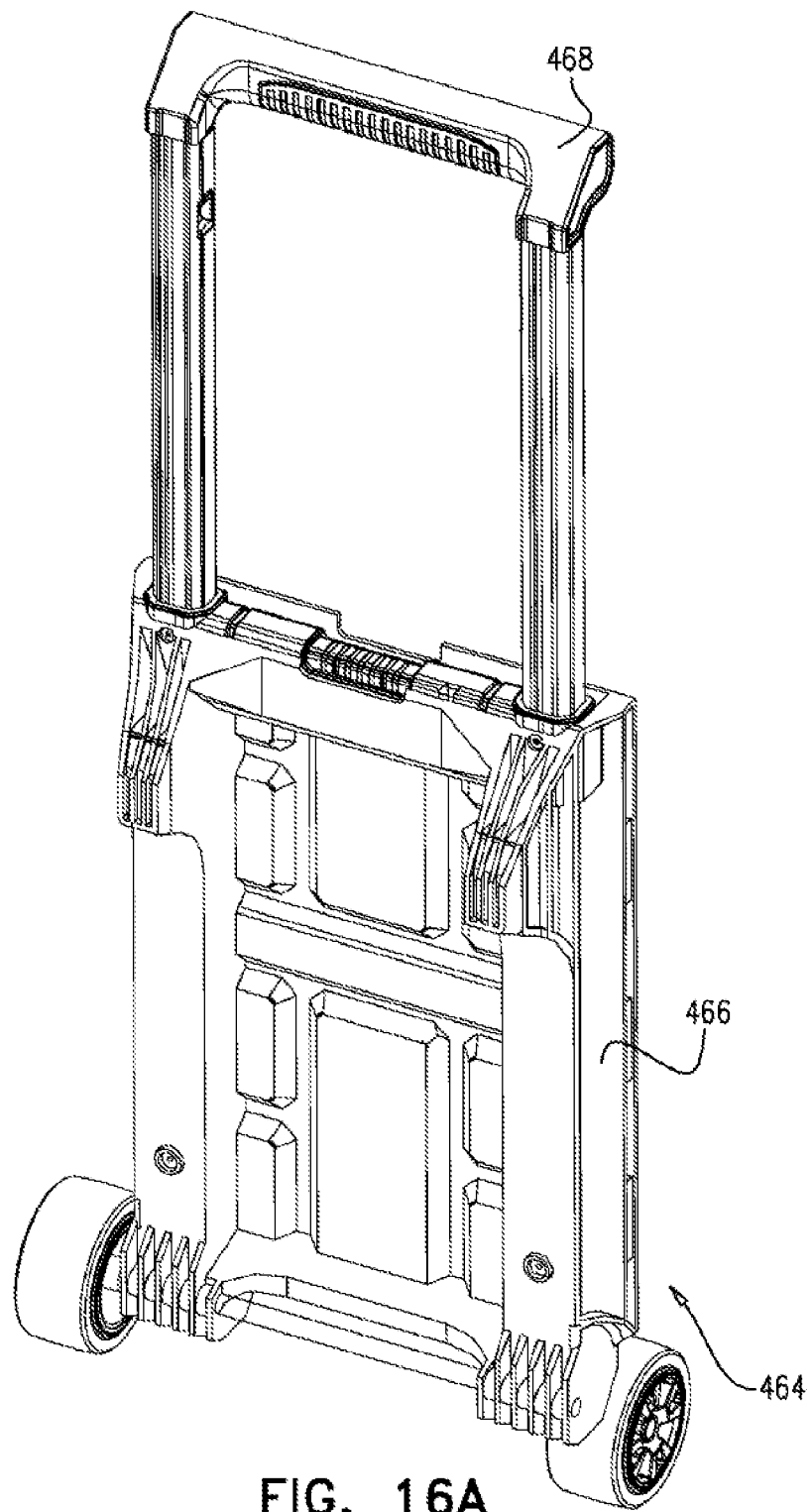

In FIG. 16A there is illustrated a utility module in the form of a wheeled carrying unit 464 (shown from a bottom side), similar to that disclosed in connection with FIGS. 7A to 11B. The carrying unit 464 comprises a rigid platform 466 fitted at a top face thereof with a female/male attaching arrangement in accordance with the disclosure, such that any utility module according to the disclosure can be detachably attached thereto. Also provided is a telescopic manipulating handle 468 and a pair of wheels 466. The carrying unit can be fitted with a collapsible support plate configuring it into a pushcart (not shown).

Figure 16B:
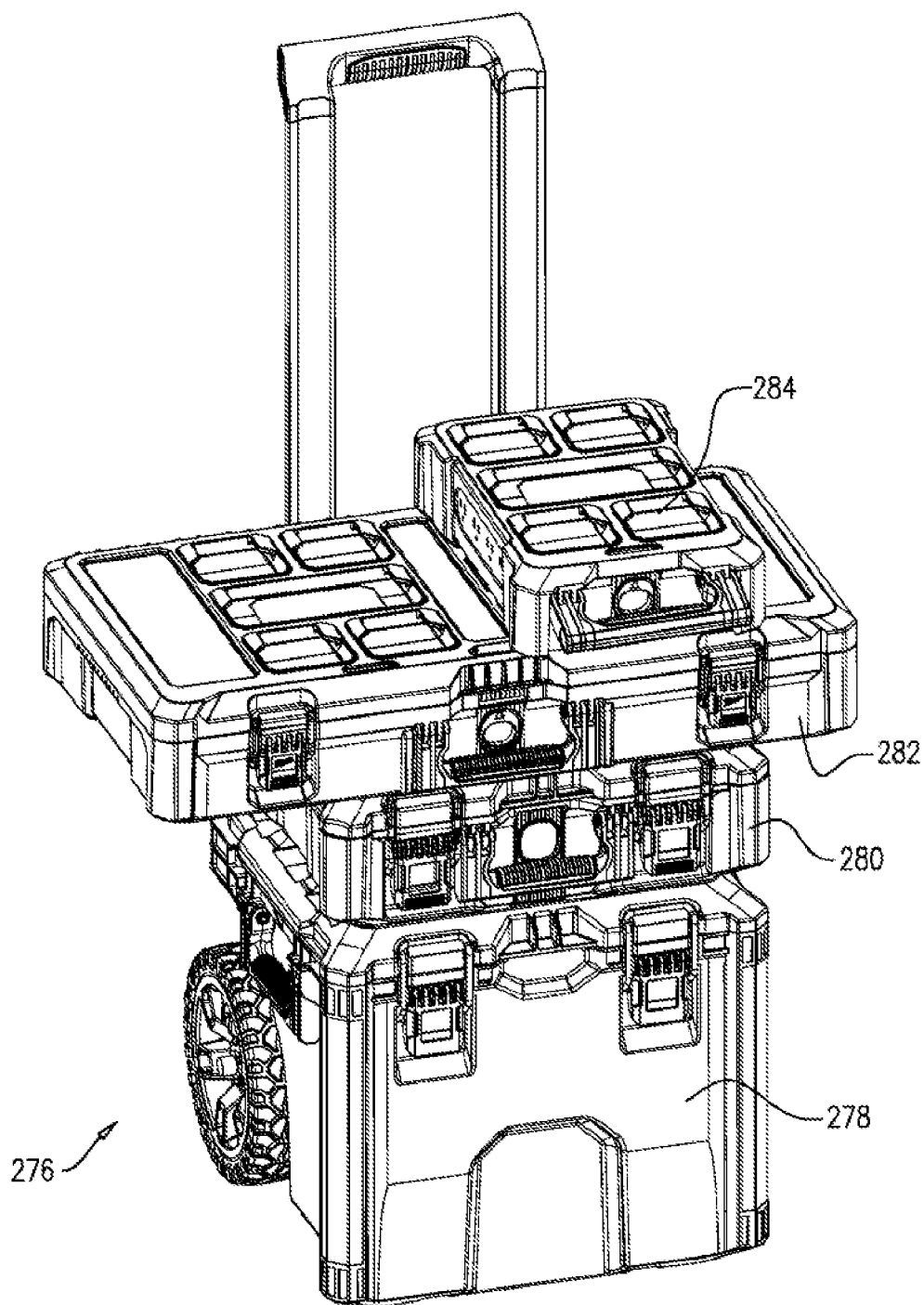

FIG. 16B shows a utility assembly 276 comprising a wheeled base container 278 interlocked with a first intermediate container 280 mounted thereover (constituting a second stage of the assembly), and a second intermediate container 282 mounted thereover (constituting a third stage of the assembly 276), there being yet a fourth stage utility module container 284 mounted over the second intermediate container 282.

Whilst the second intermediate container 282 has a wider footprint than the first intermediate container 280, this does not constitute any difficulty as far as attaching it over the second intermediate container 282, and further, the top face of the second intermediate container 282 has a great surface suited for articulation thereof of several fourth stage utility modules (only one shown).

Figure 17:
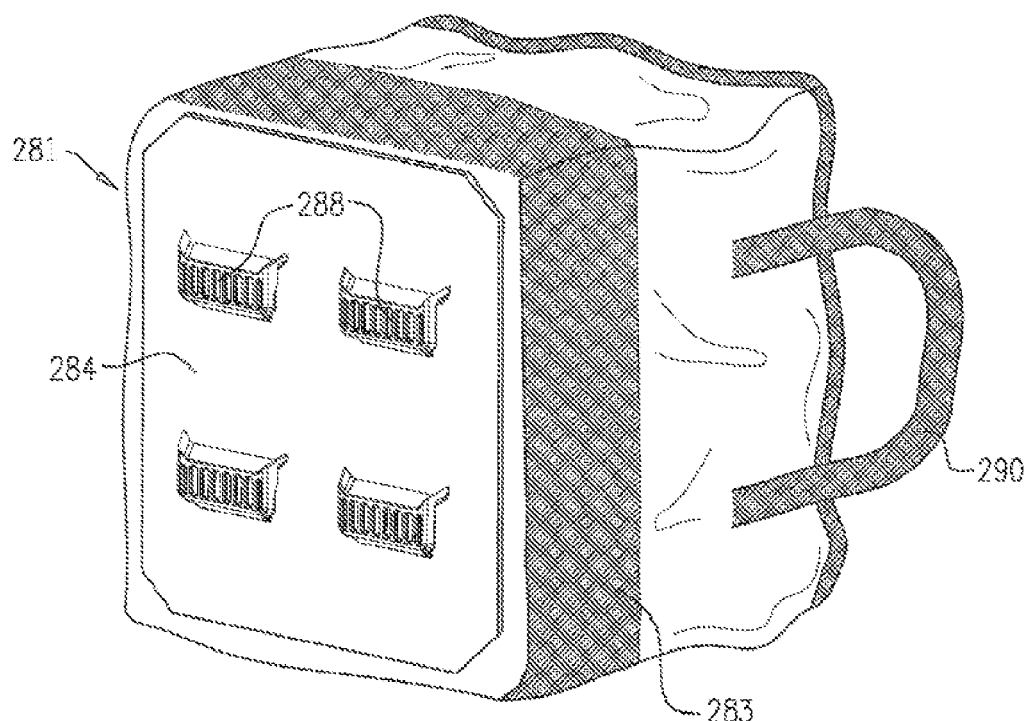

FIG. 17 shows a carrying bag 281 having soft side walls 283 (in the example illustrated made of fabric), however fitted with (integrally or detachable) an articulation platform base 284, said articulation platform made of a firm rigid material and is configured with four male-type coupling locations 288 of the type disclosed hereinabove. The carrying bag 281 has a carrying strap 290 useful for hand held or shoulder carrying of the bag.

Figure 18A:
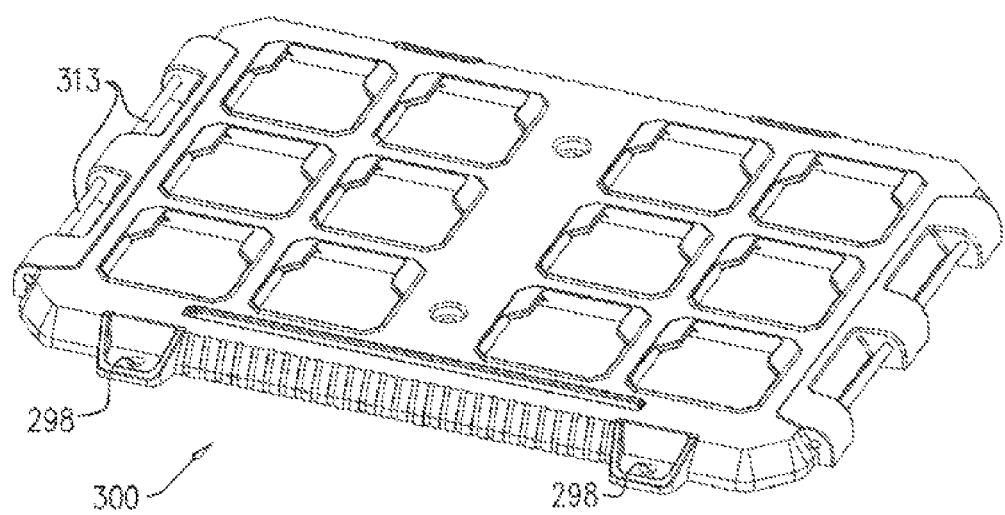
Figure 18B:
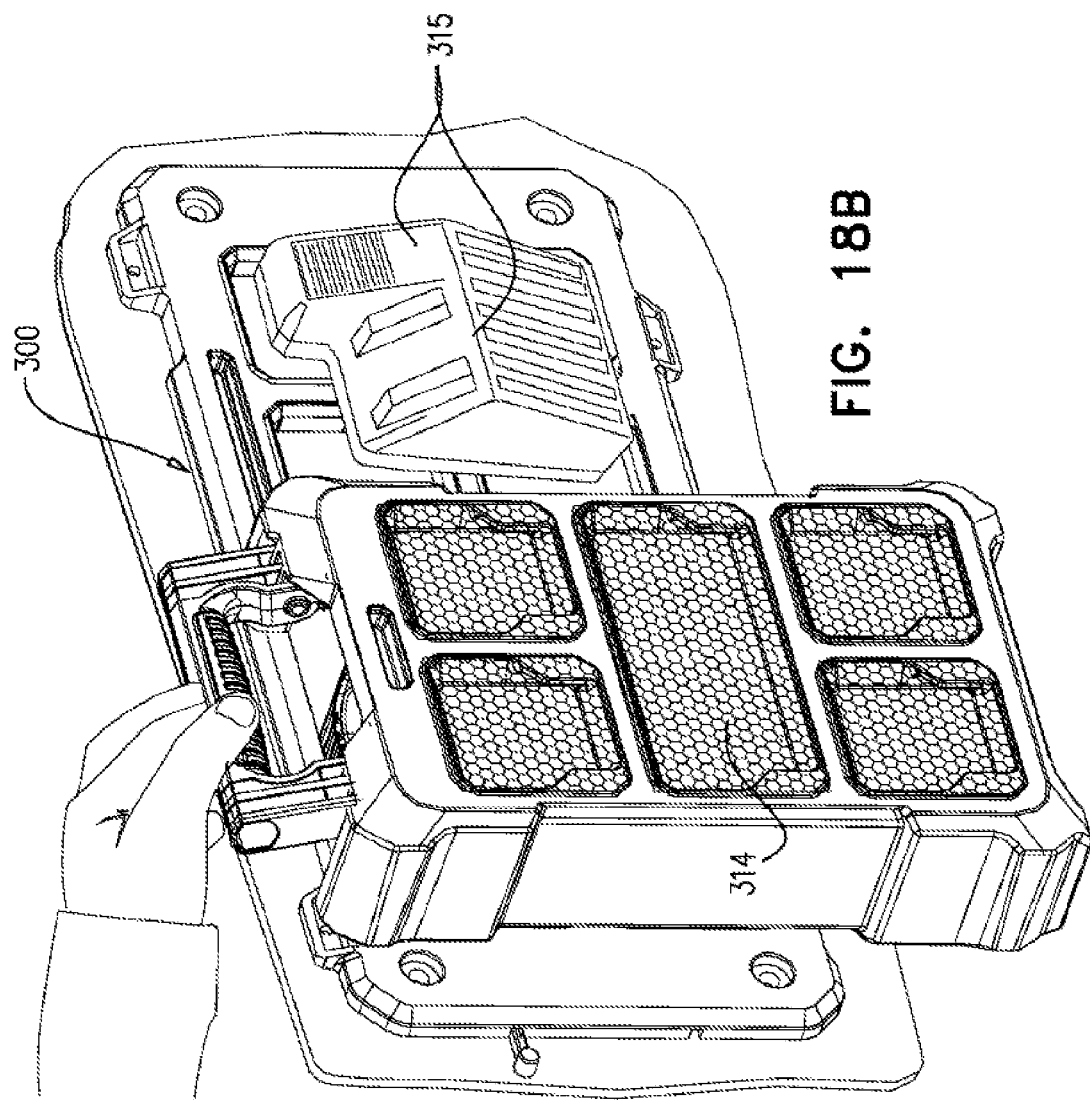
Figure 18C:
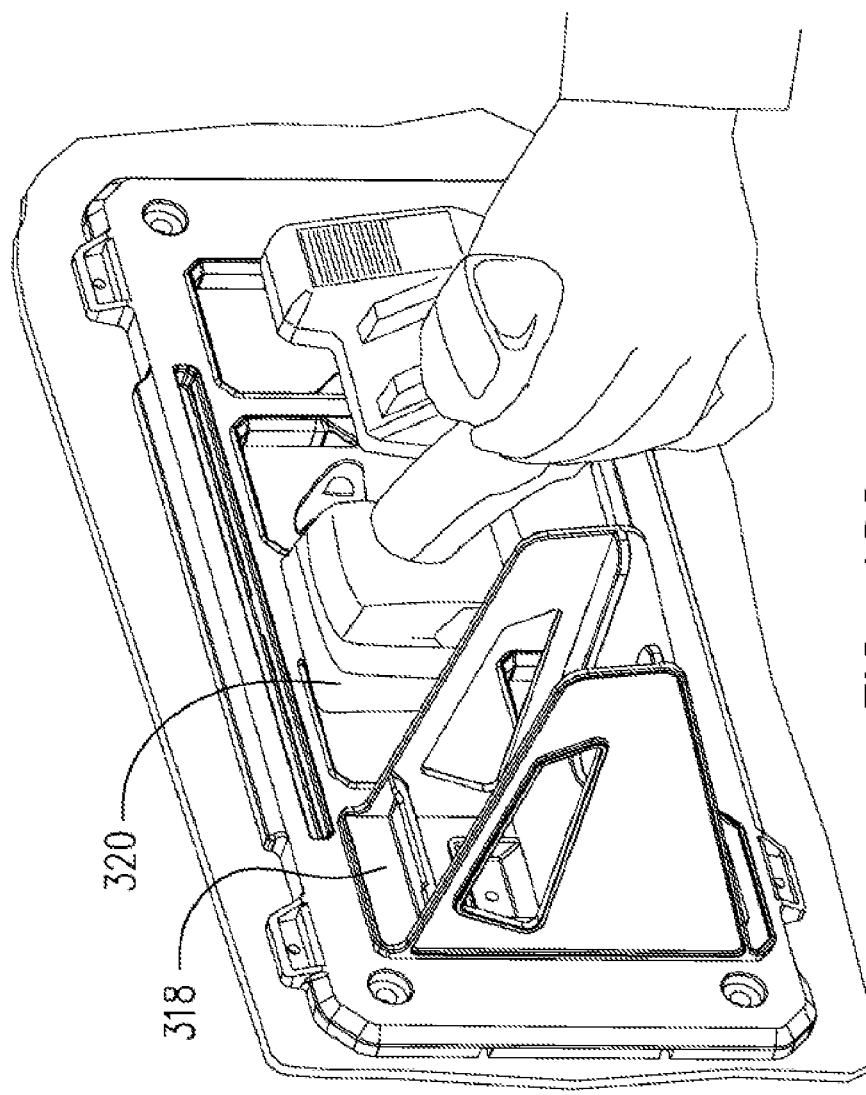

FIG. 18A shows a rigid coupling platform 300, configured with a plurality of female coupling locations (of the type disclosed herein) and further configured with bolt eyes 298 for securing to any desired surface, and carrying bars 313.

The coupling platform 300 can be attached for example to a truck bed 306 (FIG. 20), directly over the truck bed or over a cargo container attached to the truck. The coupling platform 300 can be attached to a wall, as in FIG. 18B, wherein a plurality of various utility modules can be articulated thereto. For example, utility modules can be an electric charger 315 of a power tool, a wall mounted sorting container 314, a hand tool rack 318 (FIG. 18C), a tool coupling adaptor 320 (FIG. 18C), etc.

Figure 19:
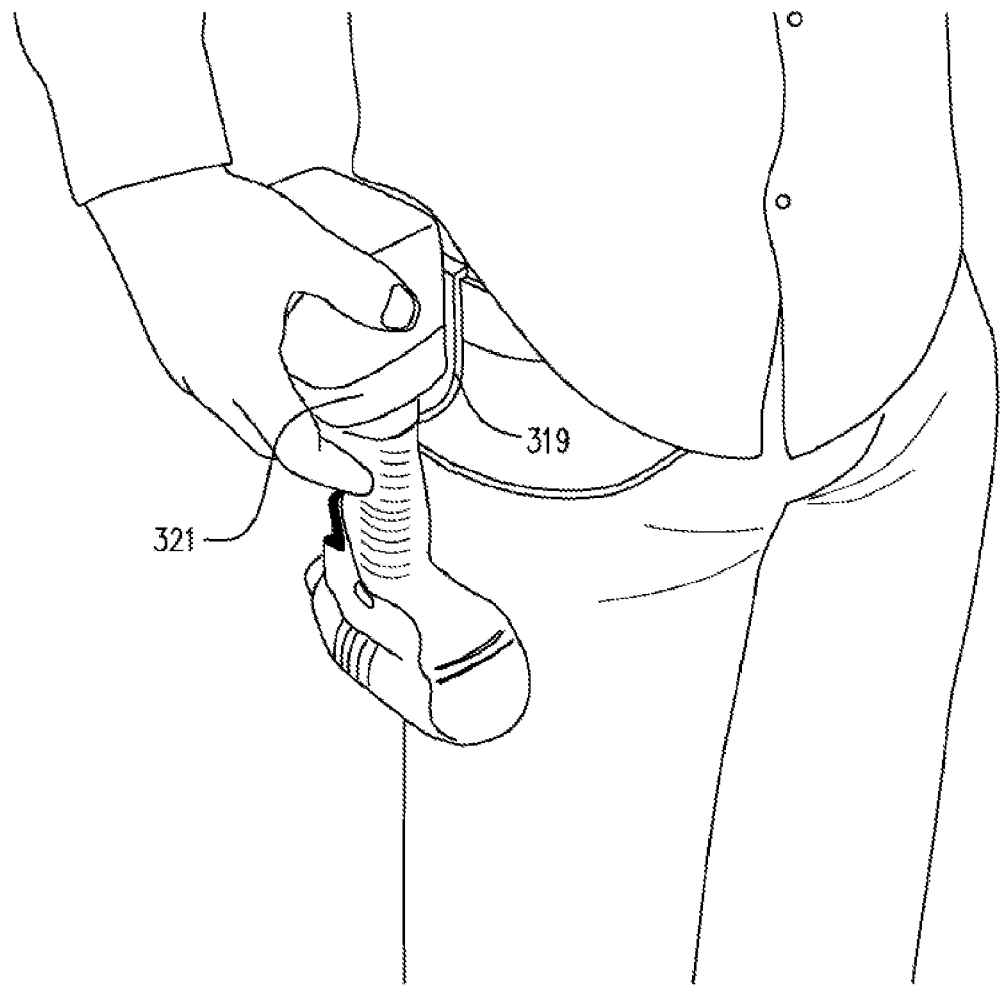
Figure 20:
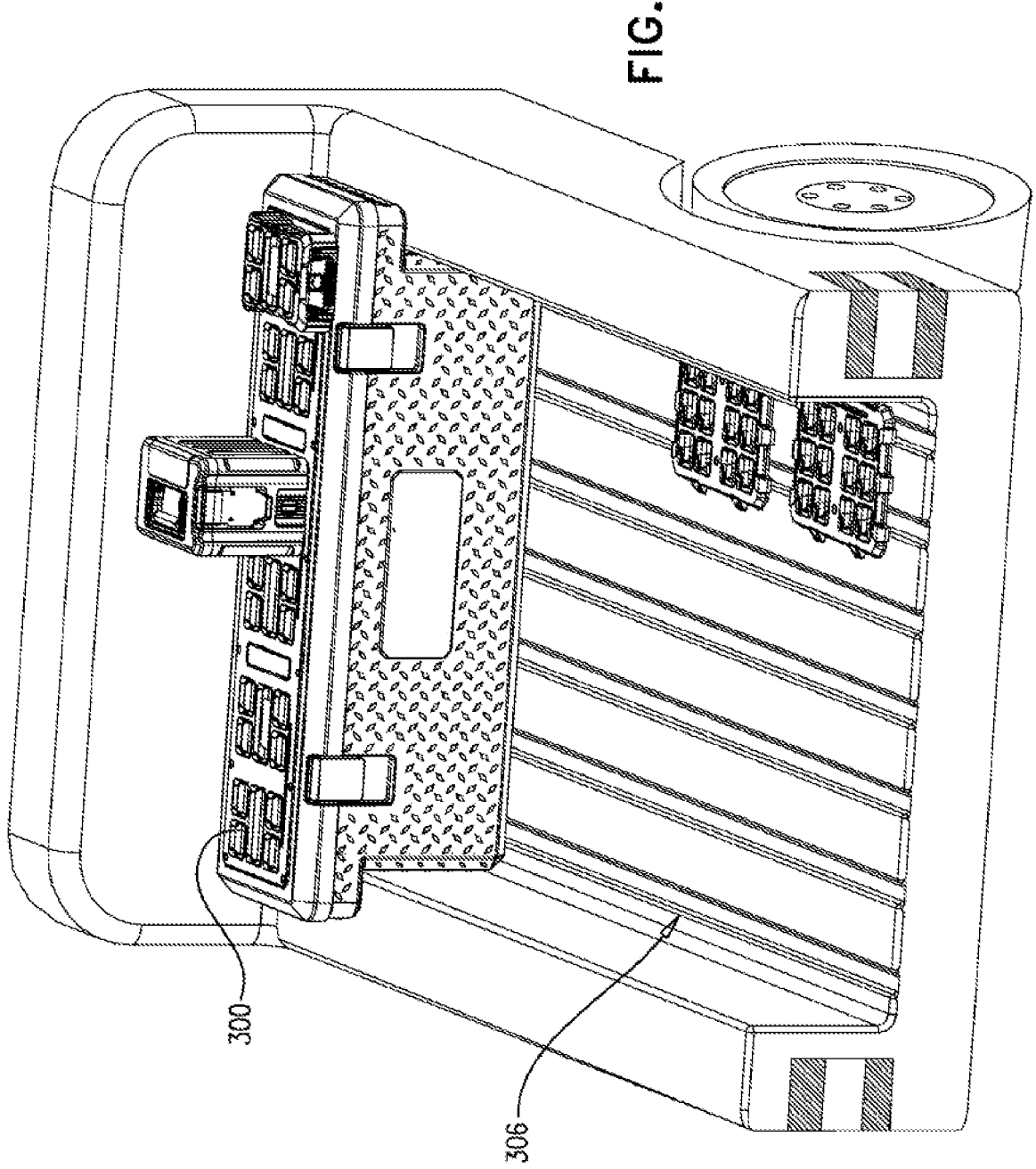

In FIG. 19 there is illustrated a belt-mount 319 configured as a female coupler according to the disclosure, wherein a tool 321 or a bag/pouch configured with a male coupler can be detachably attached thereto.

Figure 21:
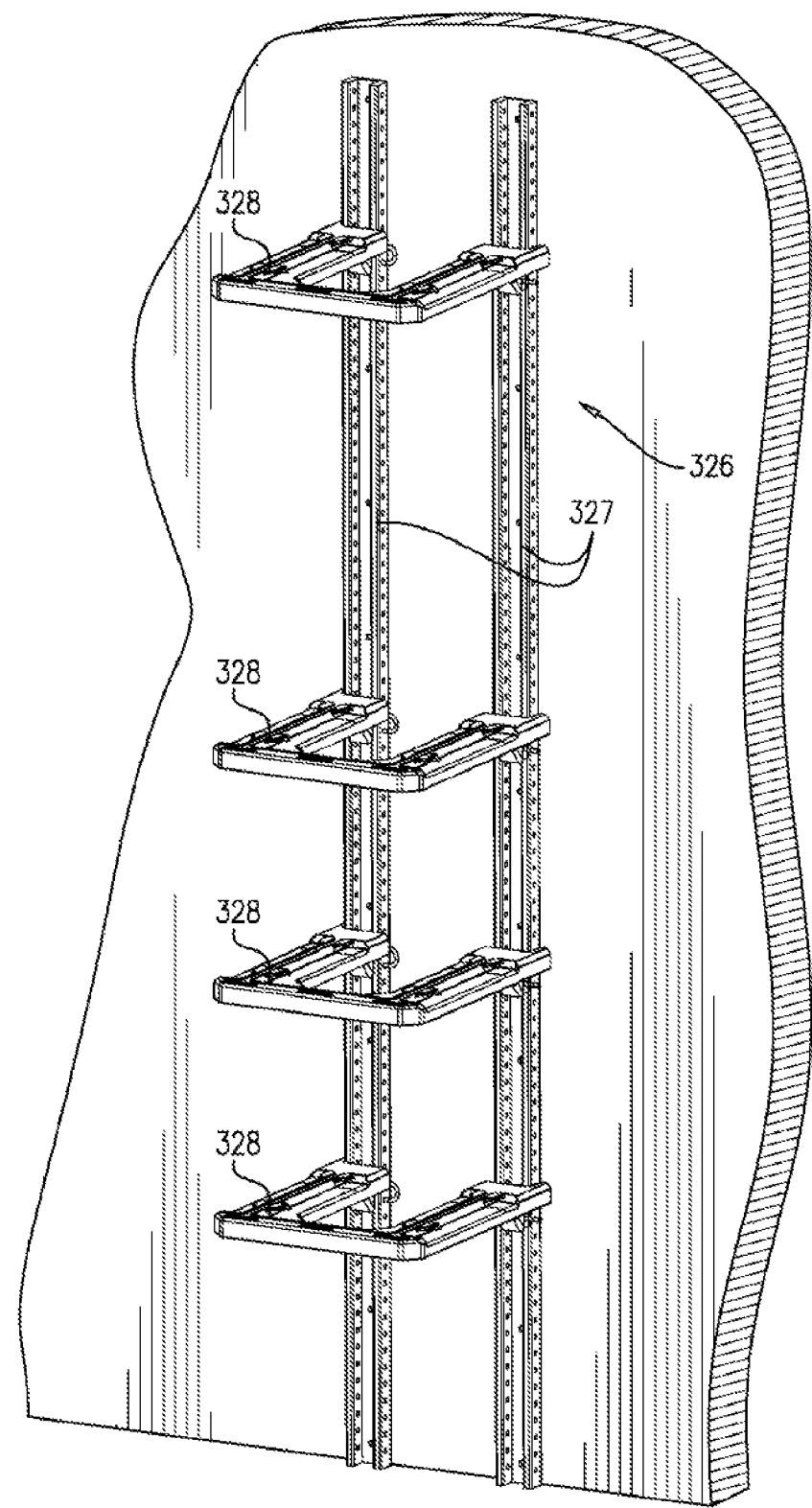

In FIG. 21 there is illustrated a wall rack 326 comprising four utility modules in the form of articulation platforms 328 (mountable at different elevations about the wall supports 327) each configured for bearing and attaching thereto any utility module in accordance with the disclosure.

Figure 22:
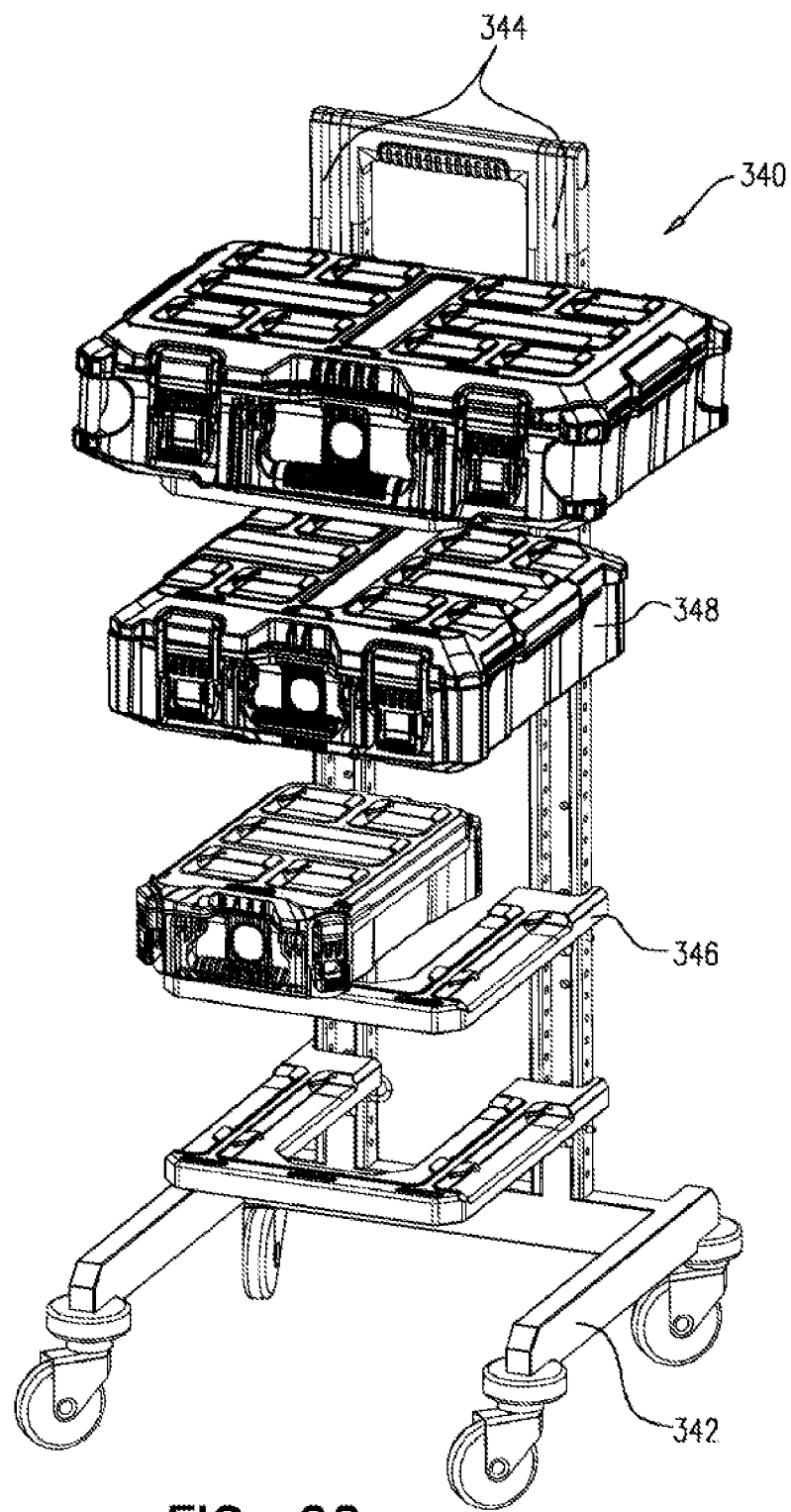

In FIG. 22 there is illustrated a mobile work stand 340 comprising a wheeled base 342 supporting two racks 344 with four utility modules in the form of articulation platforms 346 (mountable at different elevations about the wall supports 327) each configured for bearing and attaching thereto any utility module (e.g. containers 348) in accordance with the disclosure.

Figure 23:
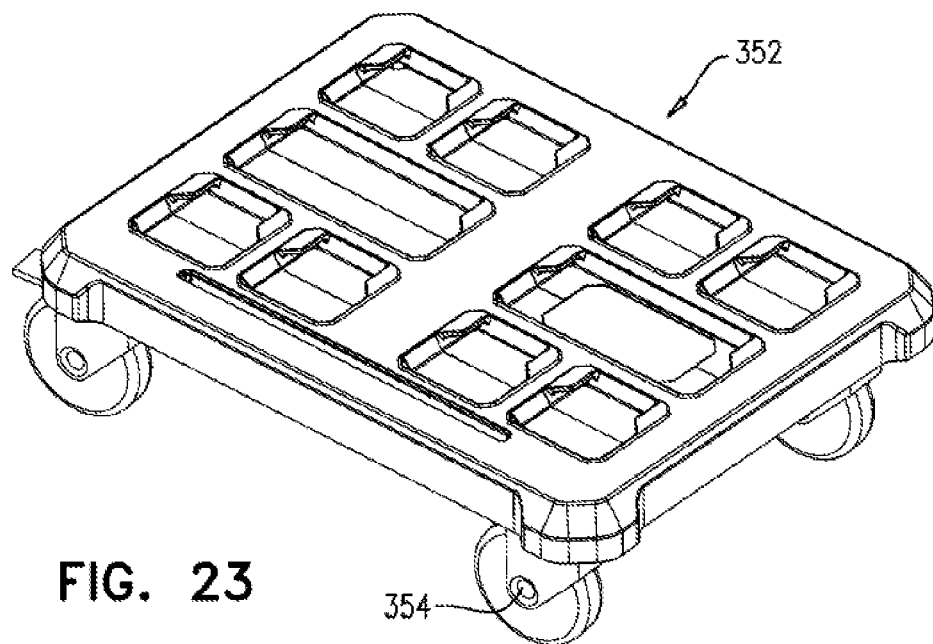

In FIG. 23 the utility module is in the form of a dolly 352 configured with wheels 354 and having a top surface configured with an array of female type couplings, as discussed.

Figure 24:
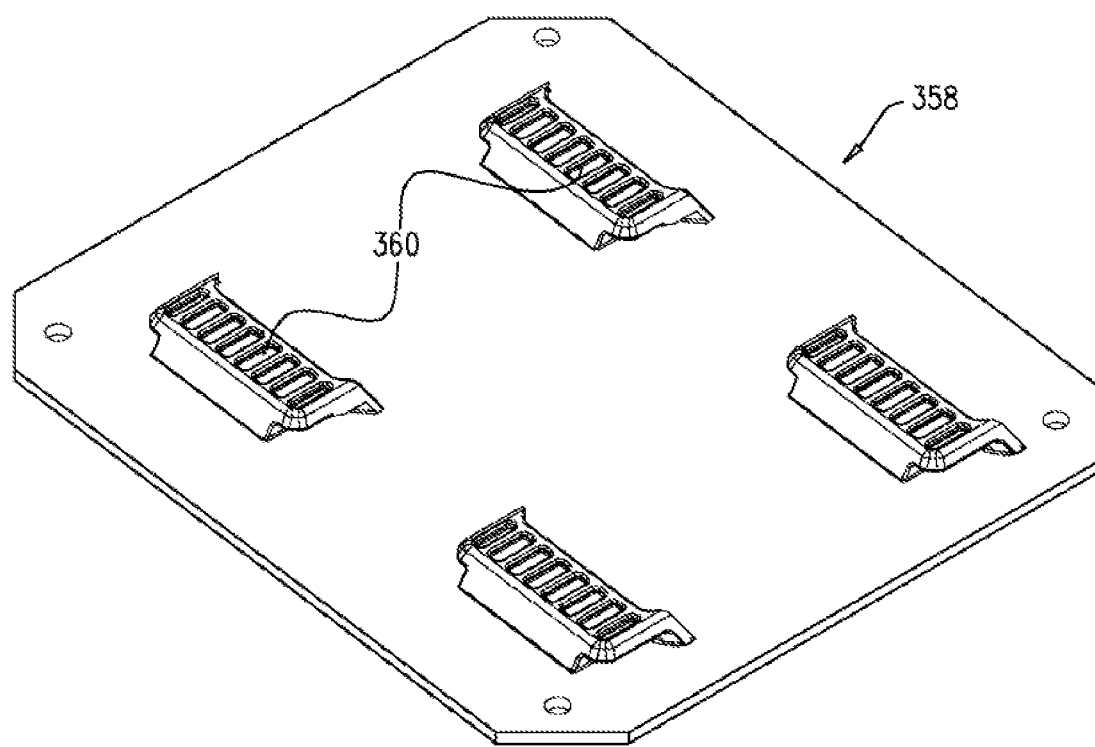

In FIG. 24 there is illustrated a utility coupling platform 358 suited for articulation to any desired article (e.g. a bag, a tool, etc.). The utility coupling platform is configured at least at one face thereof with a male coupling locations 360 mimicking the coupling arrangement of the disclosure, rendering it suitable for articulation with a coupling system according to the disclosure.

What is claimed is:

1. A container assembly comprising:
 a first container comprising:
   a bottom wall defining a bottom face of the first container;
   a first lid pivotally attached to the first container opposite the bottom wall;
   a first female coupler at a top face of the first lid;
   a first front wall, a first side wall, a second side wall opposite the first side wall, the bottom wall, the first front wall, the first side wall, the second side wall, and the first lid collectively partially defining a storage compartment;
   a first corner bumper extending outward from the first front wall and the first side wall, wherein the first corner bumper defines an outer surface that extends past and faces away from each of the first front wall and the first side wall, and wherein no portion of the first corner bumper is located above the top face or below the bottom face;
   a second corner bumper extending outward from the first front wall and the second side wall, wherein the second corner bumper defines an outer surface that extends past and faces away from each of the first front wall and the second side wall, and wherein no portion of the second corner bumper is located above the top face or below the bottom face; and
   a first locking latch arresting location; and
 a second container comprising:
   a male coupler extending from a bottom face of the second container, the male coupler configured to attachingly engage with the first female coupler of the first container, wherein attaching engagement between the second container and first container takes place when the male coupler and first female coupler are engaged, thereby restricting separation between the second container and the first container;
   a second lid pivotally attached to the second container; and
   a locking latch positionable in a locked position engaging the first locking latch arresting location, wherein disengaging the second container from the first container can be performed only after disengaging the locking latch from the first locking latch arresting location.

2. The container assembly of claim 1, the first container comprising:
 a first rear wall opposite the first front wall;
 a pair of rear wheels extending past the first rear wall; and
 a telescoping handle extending upwards from the first rear wall of the first container.

3. The container assembly of claim 1, wherein the first female coupler of the first container and the male coupler of the second container engage each other when the first and second containers are slid with respect to each other along a sliding path defined by the first female coupler and the male coupler.

4. The container assembly of claim 3, the first container comprising a first rear wall opposite the first front wall, wherein the sliding path is perpendicular to the first front wall and the first rear wall.

5. The container assembly of claim 4, wherein the first lid comprises a chamfered surface in front of the first locking latch arresting location that faces upward and forward, and wherein the chamfered surface interfaces with the locking latch to bias the locking latch upward when the second container is being slid into engagement with the first container.

6. The container assembly of claim 1, the second container comprising:
 a second front wall, a third side wall, and a fourth side wall opposite the third side wall;
 a third corner extending between the second front wall and the third side wall;
 a fourth corner extending between the second front wall and the fourth side wall;
 a third corner bumper extending outward from the third corner, wherein the third corner bumper defines an outer surface that extends past and faces away from each of the second front wall and the third side wall, wherein no portion of the third corner bumper is located above a top face of the second container or below the bottom face of the second container; and
 a fourth corner bumper extending outward from the fourth corner, wherein the fourth corner bumper defines an outer surface that extends past and faces away from each of the second front wall and the fourth side wall, wherein no portion of the fourth corner bumper is located above the top face of the second container or below the bottom face of the second container.

7. The container assembly of claim 1, wherein the first locking latch arresting location is defined by the first lid of the first container, and wherein the first locking latch arresting location defines a primary longitudinal axis that extends parallel to the first front wall of the first container.

8. The container assembly of claim 1, the first container comprising a plurality of female couplers including the first female coupler, each of the plurality of female couplers at the top face of the first lid, wherein the plurality of female couplers comprise four female couplers comprising a front row of at least two female couplers aligned with each other in a direction parallel to the first front wall of the first container and a rear row of at least two female couplers aligned with each other in the direction parallel to the first front wall of the first container.

9. The container assembly of claim 8, wherein each of the plurality of female couplers comprises two sidewalls, a back wall, and a first rib, the back wall located between the two sidewalls, the two sidewalls and the back wall projecting above a depressed surface of the top face of the first lid, and the first rib extending away from the back wall in a first direction towards the first front wall of the first container, and wherein each of the first ribs of the plurality of female couplers defines a primary longitudinal axis that extends parallel to each of the front row and the rear row.

10. The container assembly of claim 1, the first container comprising a first toggle locking latch and a second toggle locking latch, the first and second toggle locking latches configured to latch the first lid of the first container in a closed position, and the second container comprising a third toggle locking latch and a fourth toggle locking latch, the third and fourth toggle locking latches configured to latch the second lid of the second container in a closed position.

11. The container assembly of claim 10, wherein the locking latch is coupled to the second container between the third toggle locking latch and the fourth toggle locking latch.

12. The container assembly of claim 1, wherein the first locking latch arresting location is defined by the first lid of the first container, and wherein the first locking latch arresting location defines a primary longitudinal axis that extends parallel to the first front wall of the first container.

13. The container assembly of claim 1, wherein the locking latch is spring biased to engage with the first locking latch arresting location.

14. The container assembly of claim 1, the first container comprising a first tiltable carrying handle coupled to the first side wall, and the second container comprising a second tiltable carrying handle coupled to a side wall of the second container.

15. The container assembly of claim 1,
wherein the first female coupler comprises two sidewalls, a back wall, and a first rib, the back wall located between the two sidewalls, the two sidewalls and the back wall projecting above a depressed surface of the top face of the first lid, and the first rib extending away from the back wall in a first direction towards the first front wall of the first container;
wherein the second container comprises a second female coupler at a top face of the second lid, the second female coupler comprising two sidewalls, a back wall, and a second rib, the back wall located between the two sidewalls, the two sidewalls and the back wall projecting above a depressed surface of the top face of the second lid, and the second rib extending away from the back wall towards a front wall of the second container and the first front wall of the first container; and
wherein the first container defines a width axis parallel to the first front wall of the first container and the second container defines a width axis parallel to the first front wall of the first container, wherein the width axis of the second container is approximately one-half the width axis of the first container.

16. The container assembly of claim 1,
the first container comprising a plurality of female couplers including the first female coupler, the plurality of female couplers at the top face of the first lid, the first container comprising a second locking latch arresting location; and
the container assembly comprising a third container comprising:
a second male coupler extending from a bottom face of the third container, the second male coupler configured to attachingly engage with one of the plurality of female couplers of the first container, wherein attaching engagement between the third container and first container takes place when the second male coupler and one of the plurality of female couplers are engaged, thereby restricting separation between the third container and the first container;
a third lid pivotally attached to the third container;
a third female coupler at a top face of the third lid, the third female coupler comprising two sidewalls, a back wall, and a first rib, the back wall located between the two sidewalls, the two sidewalls and the back wall projecting above a depressed surface of the top face of the third lid, and the first rib extending away from the back wall towards a front wall of the third container and the front wall of the first container; and
a second locking latch positionable in a locked position engaging the second locking latch arresting location, wherein disengaging the third container from the first container can be performed only after disengaging the second locking latch from the second locking latch arresting location.

17. The container assembly of claim 16, wherein the first container defines a width axis parallel to the first front wall of the first container, the second container defines a width axis parallel to the first front wall of the first container, and the third container defines a width axis parallel to the first front wall of the first container, wherein the width axis of the second container is approximately one-half the width axis of the first container, and the width axis of the third container is approximately one-half the width axis of the first container.

18. The container assembly of claim 1, wherein the first locking latch arresting location is a recess defined in an upward facing surface of the top face of the first lid.

19. The container assembly of claim 1, the first front wall comprising a first aperture and the first lid comprising a second aperture, wherein the first aperture and the second aperture are aligned when the first lid is in a closed position.

20. The container assembly of claim 19, wherein when the first aperture and the second aperture are aligned the first aperture and the second aperture are collectively configured to receive a locking element extending through the first aperture and the second aperture to secure the first lid in the closed position.

* * * * *